(12) United States Patent
Hadani et al.

(10) Patent No.: US 10,666,314 B2
(45) Date of Patent: May 26, 2020

(54) REFERENCE SIGNAL PACKING FOR WIRELESS COMMUNICATIONS

(71) Applicant: Cohere Technologies, Inc., Santa Clara, CA (US)

(72) Inventors: Ronny Hadani, Santa Clara, CA (US); Shlomo Selim Rakib, Santa Clara, CA (US); Anton Monk, Santa Clara, CA (US); Michail Tsatsanis, Santa Clara, CA (US); Yoav Hebron, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/079,509

(22) PCT Filed: Feb. 24, 2017

(86) PCT No.: PCT/US2017/019376
§ 371 (c)(1),
(2) Date: Aug. 23, 2018

(87) PCT Pub. No.: WO2017/147439
PCT Pub. Date: Aug. 31, 2017

(65) Prior Publication Data
US 2019/0379422 A1 Dec. 12, 2019

Related U.S. Application Data

(60) Provisional application No. 62/299,985, filed on Feb. 25, 2016, provisional application No. 62/303,318, filed on Mar. 3, 2016.

(51) Int. Cl.
| | |
|---|---|
| H04B 1/69 | (2011.01) |
| H04L 5/00 | (2006.01) |
| H04L 27/26 | (2006.01) |

(52) U.S. Cl.
CPC ............... H04B 1/69 (2013.01); H04L 5/006 (2013.01); H04L 5/0007 (2013.01);
(Continued)

(58) Field of Classification Search
CPC ... H04B 1/69; H04B 2001/6912; H04L 5/006; H04L 27/2695; H04L 5/0048; H04L 5/0007
See application file for complete search history.

(56) References Cited

U.S. PATENT DOCUMENTS

| | | |
|---|---|---|
| 4,754,493 A | 6/1988 | Coates |
| 5,083,135 A | 1/1992 | Nagy et al. |
| (Continued) | | |

FOREIGN PATENT DOCUMENTS

| | | |
|---|---|---|
| CN | 1235720 A | 11/1999 |
| CN | 101682316 A | 3/2010 |
| (Continued) | | |

OTHER PUBLICATIONS

International Search Report and Written Opinion for International Application No. PCT/US2017/025797, dated Jun. 21, 2017, 6 pages.

(Continued)

Primary Examiner — Kenneth T Lam
(74) Attorney, Agent, or Firm — Perkins Coie LLP

(57) ABSTRACT

In a wireless communication network, pilot signals are transmitted over a wireless communication channel by determining a maximum delay spread for a transmission channel, determining a maximum Doppler frequency spread for the transmission channel, and allocating a set of transmission resources in a time-frequency domain to a number of pilot signals based on the maximum delay spread and the maximum Doppler frequency spread.

24 Claims, 36 Drawing Sheets

(52) U.S. Cl.
CPC ........ *H04L 5/0048* (2013.01); *H04L 27/2695* (2013.01); *H04B 2001/6912* (2013.01)

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,194,768 B1 | 6/2012 | Lee et al. |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0072254 A1* | 4/2003 | Ma .................. H04B 7/04 370/208 |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0131110 A1* | 7/2004 | Alard .................. H04L 1/0007 375/149 |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsket et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2006/0133381 A1* | 6/2006 | Wang .................. H04L 5/0048 370/394 |
| 2006/0276143 A1* | 12/2006 | Anglin, Jr. .......... H04B 1/71632 455/81 |
| 2007/0014272 A1 | 1/2007 | Palanki et al. |
| 2007/0036066 A1* | 2/2007 | Thomas ................ H04B 7/0678 370/208 |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2007/0285308 A1 | 12/2007 | Bauregger et al. |
| 2008/0043857 A1 | 2/2008 | Dias et al. |
| 2008/0117999 A1 | 5/2008 | Kadous et al. |
| 2008/0137788 A1 | 6/2008 | Bang |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0257520 A1 | 10/2009 | Lin et al. |
| 2009/0262844 A1* | 10/2009 | Honta ................... H04L 5/0007 375/260 |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0150225 A1 | 6/2010 | Wredenhagen |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216682 A1 | 9/2011 | Xu et al. |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0269232 A1* | 10/2012 | Hiscock ............... H04B 1/713 375/139 |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |

(56) References Cited

U.S. PATENT DOCUMENTS

| | | | |
|---|---|---|---|
| 2013/0156124 | A1 | 6/2013 | Wang et al. |
| 2013/0230010 | A1 | 9/2013 | Kim et al. |
| 2013/0260787 | A1 | 10/2013 | Hashimoto |
| 2013/0279627 | A1 | 10/2013 | Wu et al. |
| 2013/0315133 | A1 | 11/2013 | Wang et al. |
| 2014/0143639 | A1 | 5/2014 | Loghin et al. |
| 2014/0161154 | A1 | 6/2014 | Hadani et al. |
| 2014/0169385 | A1 | 6/2014 | Hadani et al. |
| 2014/0169406 | A1 | 6/2014 | Hadani et al. |
| 2014/0169433 | A1 | 6/2014 | Hadani et al. |
| 2014/0169436 | A1 | 6/2014 | Hadani et al. |
| 2014/0169437 | A1 | 6/2014 | Hadani et al. |
| 2014/0169441 | A1 | 6/2014 | Hadani et al. |
| 2014/0247803 | A1 | 9/2014 | Arambepola et al. |
| 2014/0269357 | A1* | 9/2014 | Dhakal ............... H04L 5/0048 370/252 |
| 2014/0348252 | A1 | 11/2014 | Siohan et al. |
| 2014/0364128 | A1 | 12/2014 | Lee et al. |
| 2015/0117395 | A1 | 4/2015 | Hadani et al. |
| 2015/0326273 | A1 | 11/2015 | Rakib et al. |
| 2015/0327085 | A1 | 11/2015 | Hadani et al. |
| 2015/0382231 | A1 | 12/2015 | Jabbar et al. |
| 2016/0043835 | A1 | 2/2016 | Hadani et al. |
| 2016/0135132 | A1 | 5/2016 | Donepudi et al. |
| 2016/0182269 | A1 | 6/2016 | Hadani et al. |
| 2016/0191217 | A1 | 6/2016 | Hadani et al. |
| 2016/0191280 | A1 | 6/2016 | Hadani et al. |
| 2016/0254889 | A1 | 9/2016 | Shattil |
| 2016/0277225 | A1 | 9/2016 | Frenne et al. |
| 2016/0309345 | A1 | 10/2016 | Tehrani et al. |
| 2016/0380743 | A1 | 12/2016 | Rakib |
| 2016/0381576 | A1 | 12/2016 | Hadani et al. |
| 2017/0012749 | A1 | 1/2017 | Rakib et al. |
| 2017/0012810 | A1 | 1/2017 | Rakib et al. |
| 2017/0019297 | A1 | 1/2017 | Rakib |
| 2017/0033899 | A1 | 2/2017 | Rakib et al. |
| 2017/0040711 | A1 | 2/2017 | Rakib et al. |
| 2017/0078054 | A1 | 3/2017 | Hadani et al. |
| 2017/0099122 | A1 | 4/2017 | Hadani et al. |
| 2017/0099607 | A1 | 4/2017 | Hadani et al. |
| 2017/0149594 | A1 | 5/2017 | Rakib |
| 2017/0149595 | A1 | 5/2017 | Rakib et al. |
| 2017/0201354 | A1 | 7/2017 | Hadani et al. |
| 2017/0207817 | A1 | 7/2017 | Hadani et al. |
| 2017/0222700 | A1 | 8/2017 | Hadani et al. |
| 2017/0230215 | A1 | 8/2017 | Rakib et al. |
| 2017/0244524 | A1 | 8/2017 | Hadani et al. |
| 2018/0013592 | A1* | 1/2018 | Liu ..................... H04B 17/391 |

FOREIGN PATENT DOCUMENTS

| | | |
|---|---|---|
| CN | 101939935 A | 1/2011 |
| EP | 1432168 A1 | 6/2004 |
| JP | 2011127910 | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016183240 A1 | 11/2016 |
| WO | 2016209848 | 12/2016 |
| WO | 2017003952 | 1/2017 |
| WO | 2017011478 | 1/2017 |

OTHER PUBLICATIONS

International Search Report and Written Opinion for International Application No. PCT/US2016/030259, dated Aug. 4, 2016, 13 pages.

Office Action for U.S. Appl. No. 15/152,464, dated Apr. 6, 2017, 10 pages.

Examination Report No. 1 for Australian Application No. 2013280487, dated May 2, 2016, 3 pages.

International Search Report and Written Opinion for International Application No. PCT/US2016/031928, dated Oct. 7, 2016, 10 pages.

Office Action for U.S. Appl. No. 15/188,946, dated May 8, 2017, 14 pages.

International Search Report and Written Opinion for International Application No. PCT/US2016/038584, dated Sep. 26, 2016, 8 pages.

Office Action for U.S. Appl. No. 15/187,668, dated Feb. 16, 2017, 6 pages.

International Search Report and Written Opinion for International Application No. PCT/US2016/031909, dated Aug. 11, 2016, 13 pages.

Office Action for U.S. Appl. No. 15/194,494, dated May 5, 2017, 16 pages.

International Search Report and Written Opinion for International Application No. PCT/US2016/039662, dated Nov. 29, 2016, 14 pages.

Office Action for U.S. Appl. No. 15/436,653, dated Jun. 2, 2017, 10 pages.

Office Action for U.S. Appl. No. 15/208,545, dated Aug. 21, 2017, 15 pages.

International Search Report and Written Opinion for International Application No. PCT/US2016/041940, dated Oct. 20, 2016, 8 pages.

Supplementary European Search Report for European Application No. 13768150.8, dated Oct. 30, 2015, 7 pages.

International Search Report and Written Opinion for International Application No. PCT/US2013/033652, dated Jun. 12, 2013, 8 pages.

International Search Report and Written Opinion for International Application No. PCT/US2015/041417, dated Oct. 1, 2015, 7 pages.

Office Action for U.S. Appl. No. 14/805,407, dated Dec. 14, 2016, 7 pages.

International Search Report and Written Opinion for International Application No. PCT/US2015/041420, dated Oct. 1, 2015, 6 pages.

International Search Report and Written Opinion for PCT Application No. PCT/US2016/065961, dated Feb. 24, 2017, 10 pages.

International Search Report and Written Opinion for PCT Application No. PCT/US2017/019376, dated May 5, 2017, 11 pages.

Office Action for U.S. Appl. No. 13/117,119, dated Aug. 5, 2013, 5 pages.

Notice of Allowance for U.S. Appl. No. 13/117,119, dated Feb. 28, 2014, 13 pages.

Banelli, P. et al., "Modulation Formats and Waveforms for 5G Networks: Who Will Be the Heir of OFDM?," IEEE Signal Processing Magazine, vol. 81, pp. 80-93, Nov. 2014.

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Supplementary European Search Report for European Application No. 11787483.4, dated Sep. 9, 2014, 6 pages.

International Search Report and Written Opinion for International Application No. PCT/US2011/038302, dated Nov. 15, 2011, 8 pages.

International Preliminary Report on Patentability for International Application No. PCT/US2011/038302, dated Dec. 4, 2012, 7 pages.

Office Action for U.S. Appl. No. 13/117,124, dated Feb. 22, 2013, 7 pages.

Notice of Allowance for U.S. Appl. No. 13/117,124, dated Aug. 8, 2013, 10 pages.

Office Action for U.S. Appl. No. 14/605,957, dated Jun. 22, 2017, 6 pages.

(56) References Cited

OTHER PUBLICATIONS

Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network_html>, 5 pages.
CATT, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
Extended European Search Report dated Sep. 9, 2019 for Application No. 16873982.9, 8 pages.

\* cited by examiner

US 10,666,314 B2

REFERENCE SIGNAL PACKING FOR WIRELESS COMMUNICATIONS

CROSS-REFERENCE TO RELATED APPLICATION(S)

This patent document is a 371 National Phase Application of PCT Application No. PCT/US2017/019376, filed on Feb. 24, 2017, which claims the benefit of priority from U.S. Provisional Patent Applications 62/303,318, filed Mar. 3, 2016, and 62/299,985, filed Feb. 25, 2016. All of the aforementioned patent applications are incorporated by reference herein in their entirety.

TECHNICAL FIELD

This document relates to the field of telecommunications, in particular, estimation and compensation of impairments in telecommunications data channels.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

Various techniques for pilot packing, e.g., assigning transmission resources to a number of pilot signals for transmission, are disclosed. The disclosed techniques provide various operational advantages, including, for example, pilot packing by staggering pilots to achieve improved separation among the pilots, providing a number of pilot that is commensurate with the target delay-Doppler spread to be combated in the wireless channel, thereby optimally using the available transmission bandwidth, and so on.

In one example aspect, a wireless communication method is disclosed. Using the method, pilot signals are transmitted over a wireless communication channel by determining a maximum delay spread for a transmission channel, determining a maximum Doppler frequency spread for the transmission channel, and allocating a set of transmission resources in a time-frequency domain to a number of pilot signals based on the maximum delay spread and the maximum Doppler frequency spread.

In another aspect, a method of wireless communication includes determining a maximum delay spread for a transmission channel, determining a maximum Doppler frequency spread for the transmission channel, determining a number of pilot signals that can be transmitted using a set of two-dimensional transmission resources at least based on the maximum delay spread and the maximum Doppler frequency spread, allocating the set of transmission resources from a two-dimensional set of resources to the number of pilot, and transmitting the pilot signals over a wireless communication channel using transmission resources.

In yet another aspect, a wireless communication apparatus comprising a memory, a processor and a transmitter is disclosed. The wireless communication apparatus may implement any of the above-described methods and other associated techniques described in the present document.

These, and other aspects, are described in greater detail in the present document.

Figure 19:
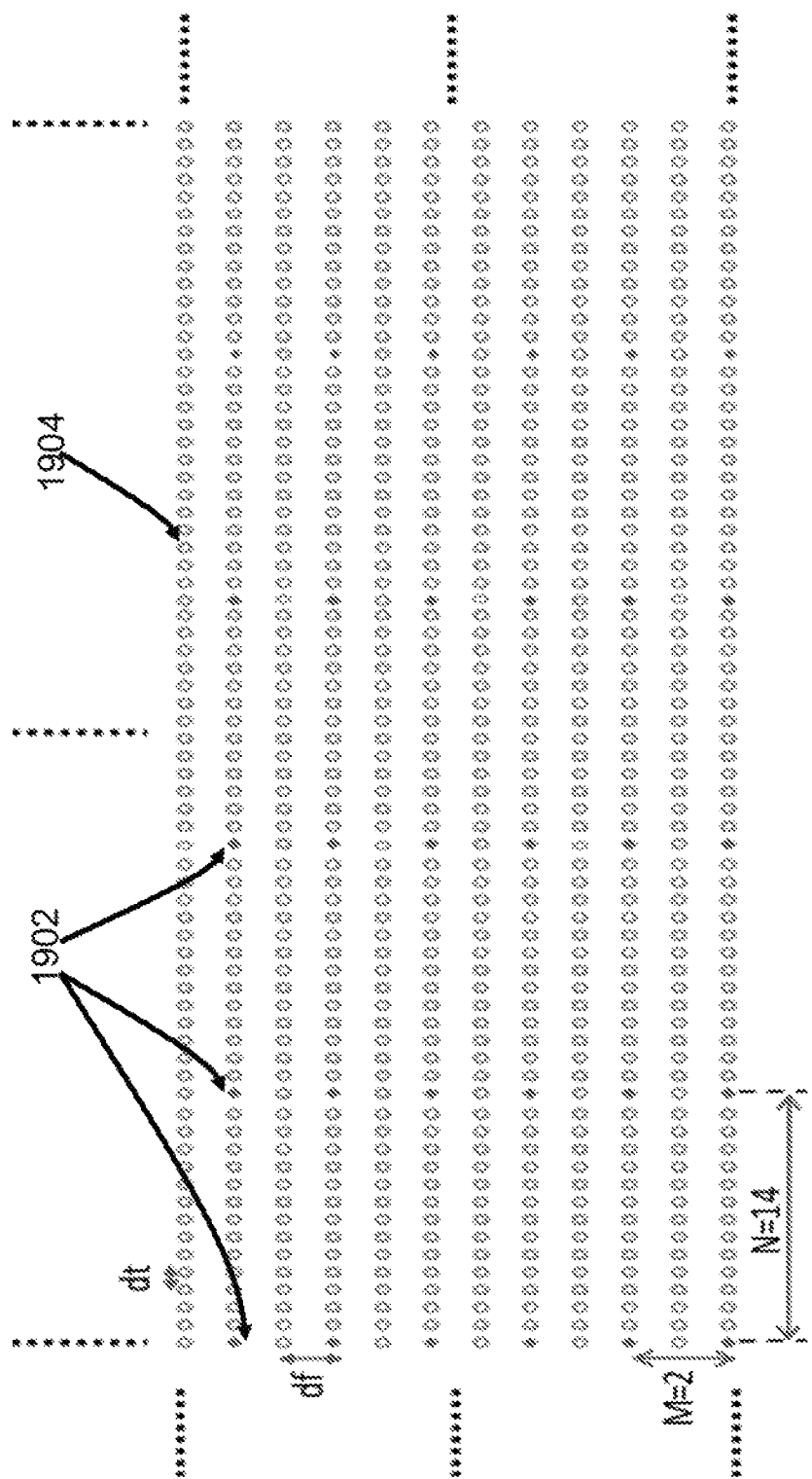
FIG. 19 shows an example of a t-f pilot lattice (1902) superimposed on a data lattice (1904) when N=14, M=2.

on the t-f data lattice of FIG. 19, [c] shows the representation of the same 10 pilots on the Delay-Doppler plane associated with the coarser pilot lattice of FIG. 19 (N=14, M=2), and d shows the samples of the real portion of P3 on the t-f pilot lattice.

Figure 21:
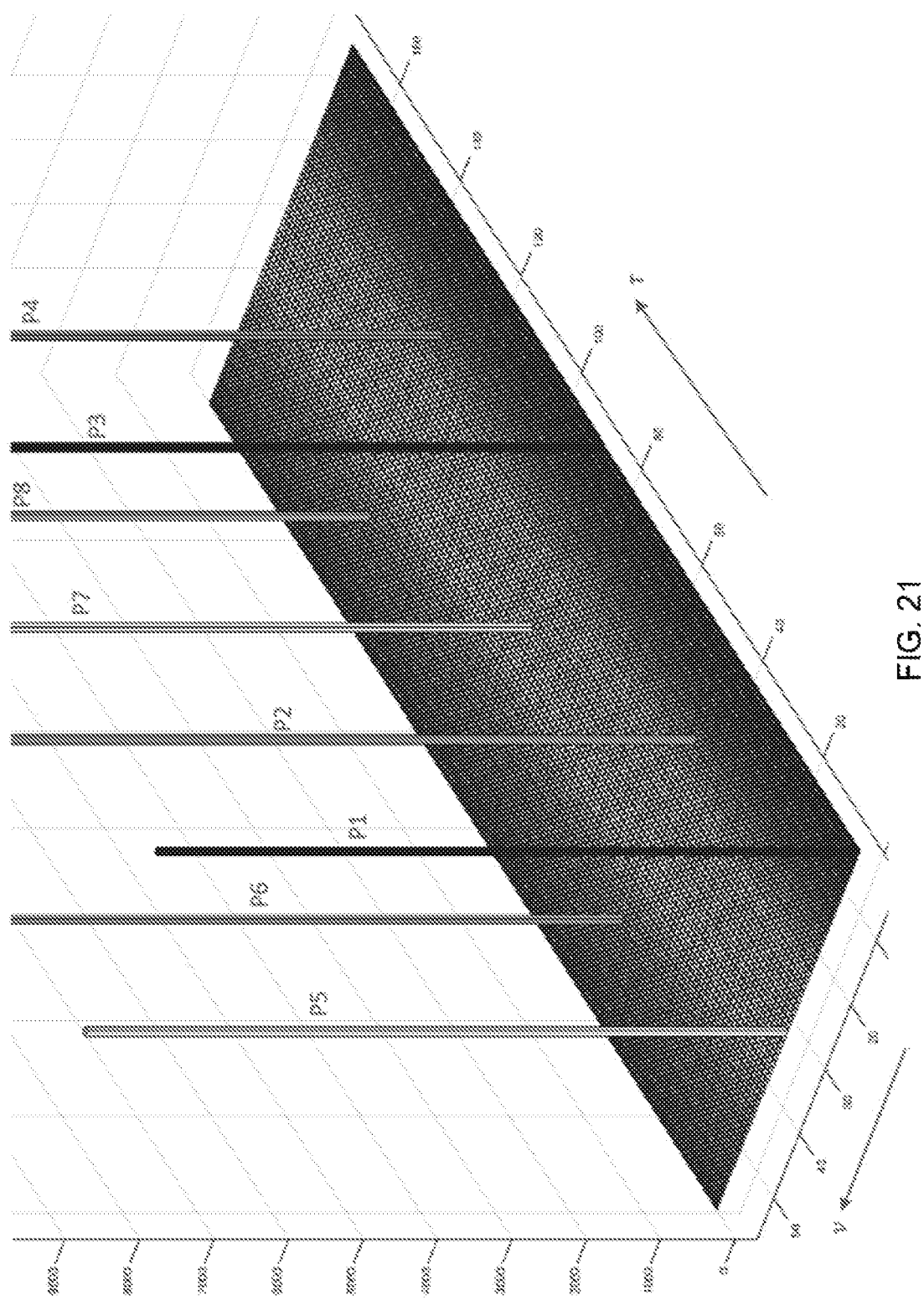

FIG. 21 shows an example of 4×2 pilots in a staggered structure on Delay Doppler plane.

Figure 22:
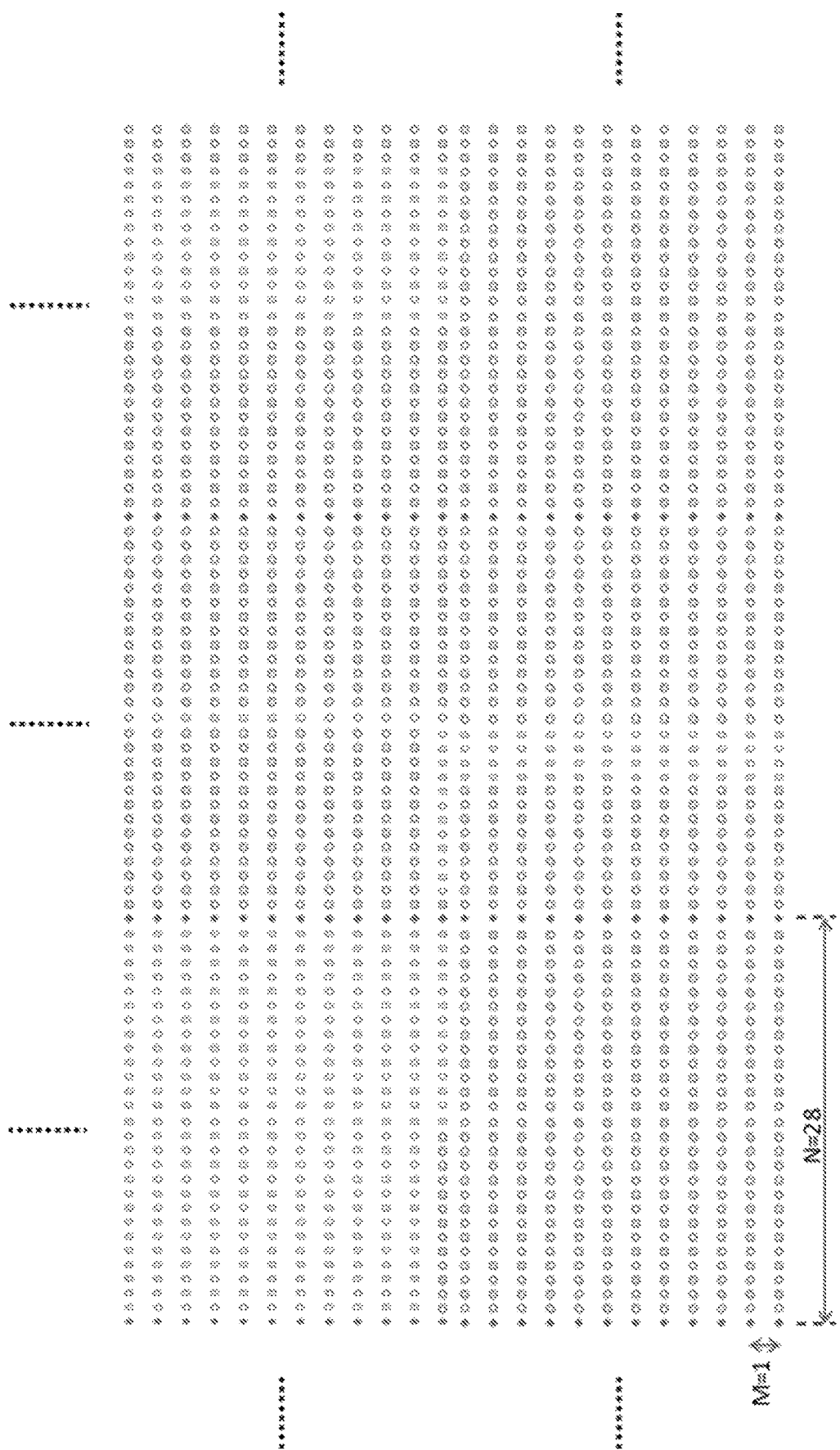

FIG. 22 shows an example of a pilot lattice with N=28 and M=1 superimposed on the data lattice.

Figure 23:
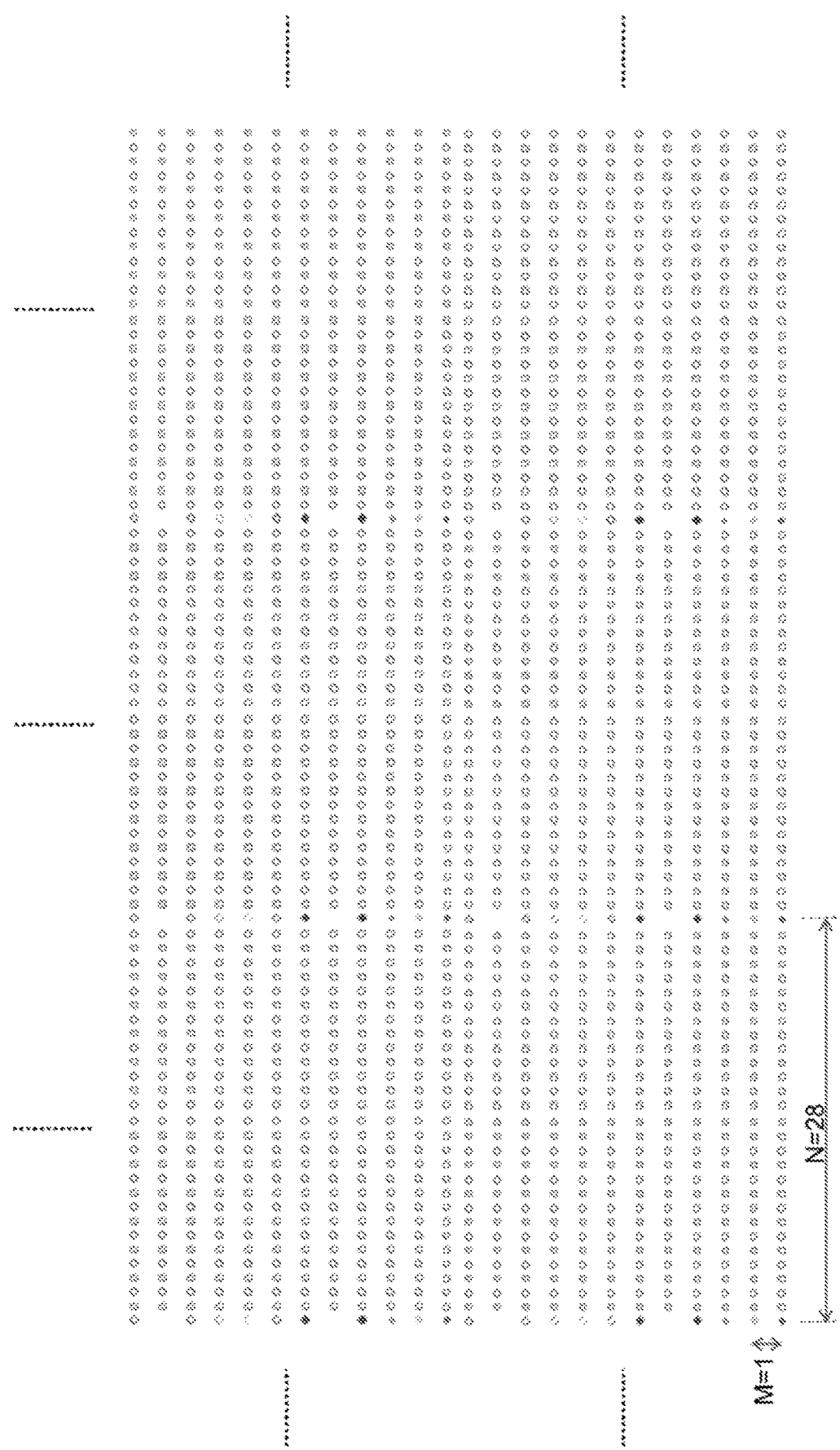

FIG. 23 shows an example embodiment with 12 pilot lattices with N=28, M=12 each, superimposed on the data lattice.

Figure 24:
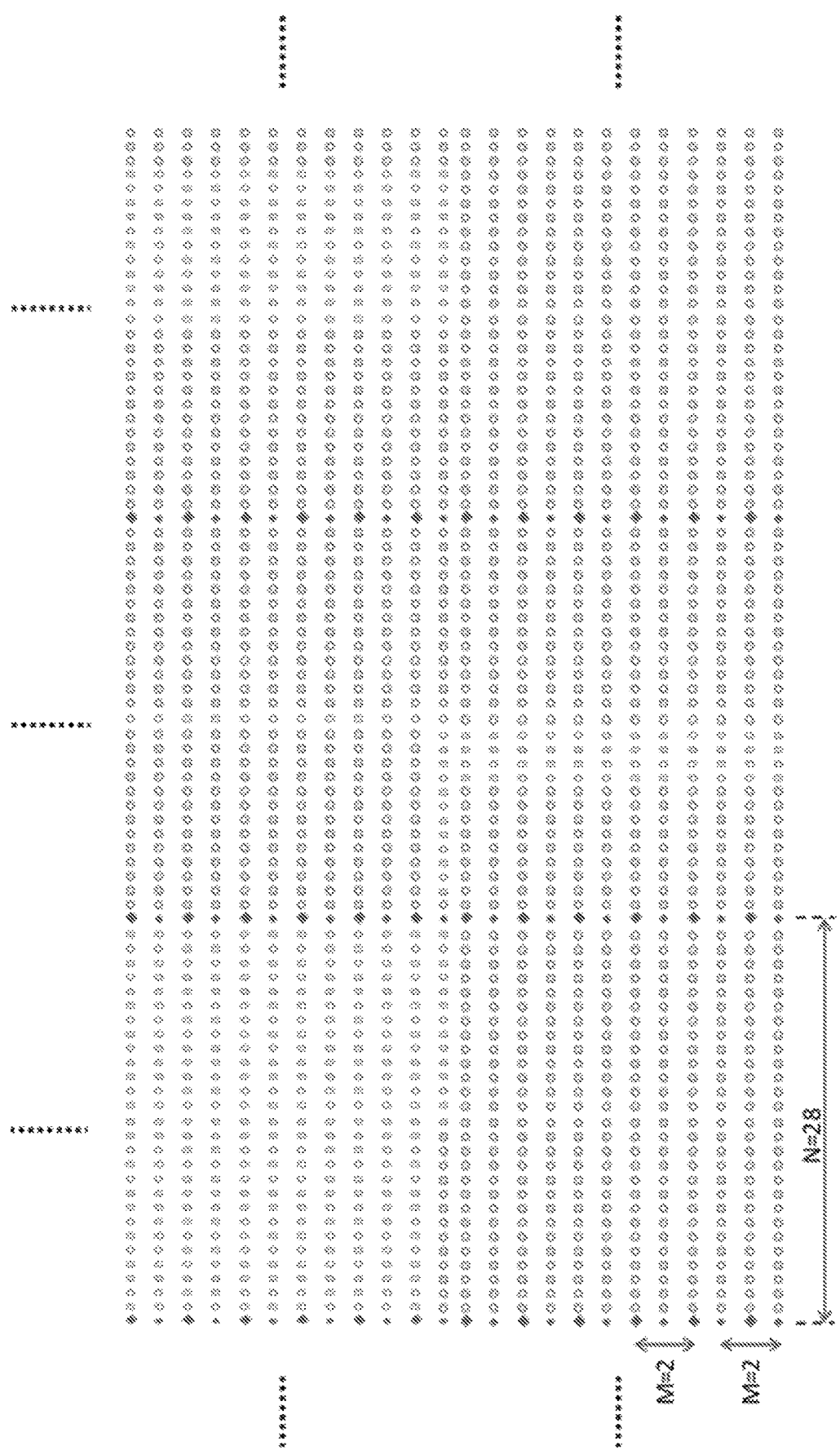

FIG. 24 shows an example embodiment with 2 pilot lattices with N=28 and M=2 superimposed on the data lattice.

Figure 25:
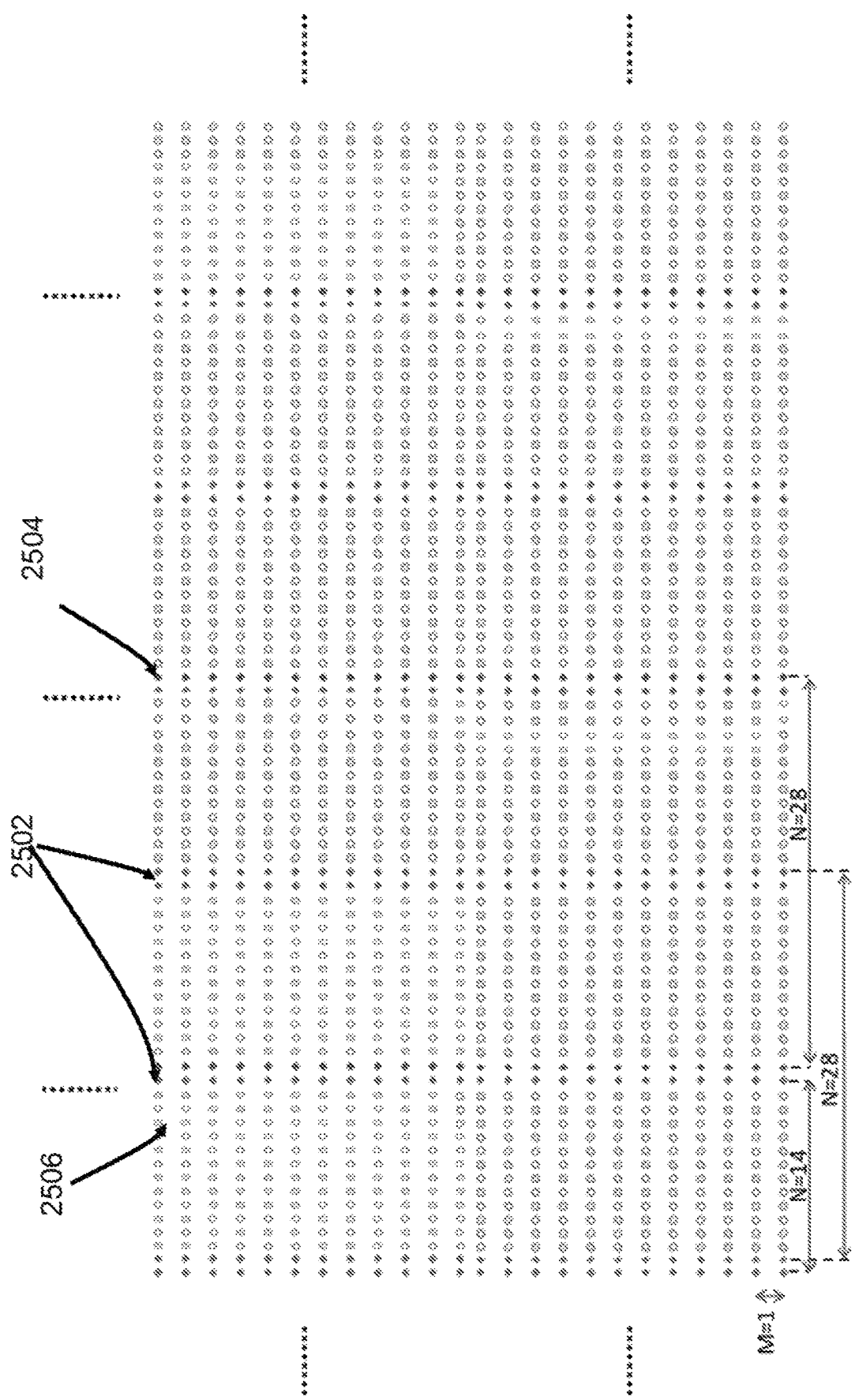

FIG. 25 shows an example of UL (2502) and DL (2504) pilot sample points on a data lattice (2506).

Figure 26:
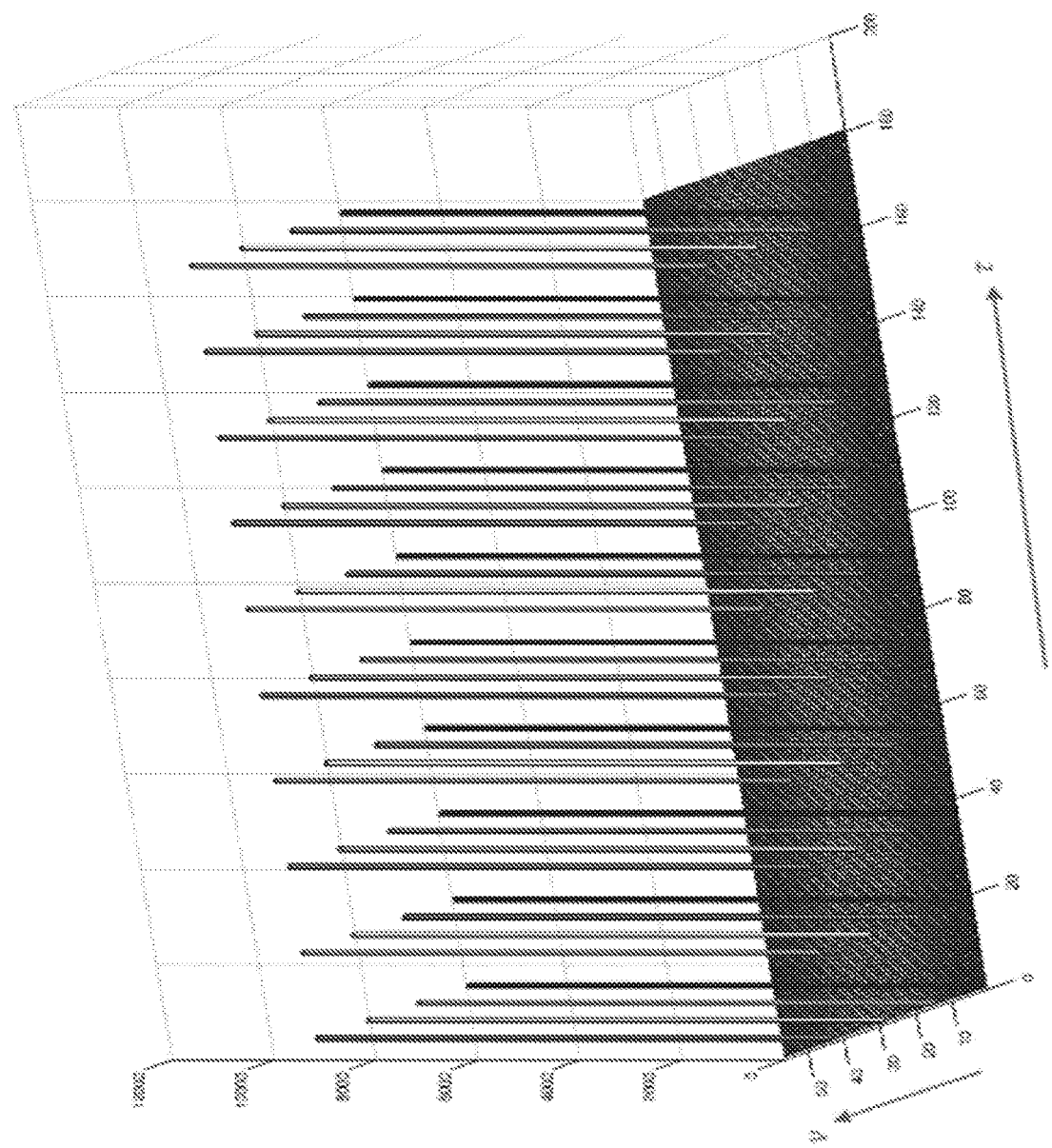

FIG. 26 shows an example of packing 10×4=40 pilots on the Delay-Doppler plane associated with the pilot lattice of N=28, M=1 (2504 points of the lattice of FIG. 25)

Figure 27:
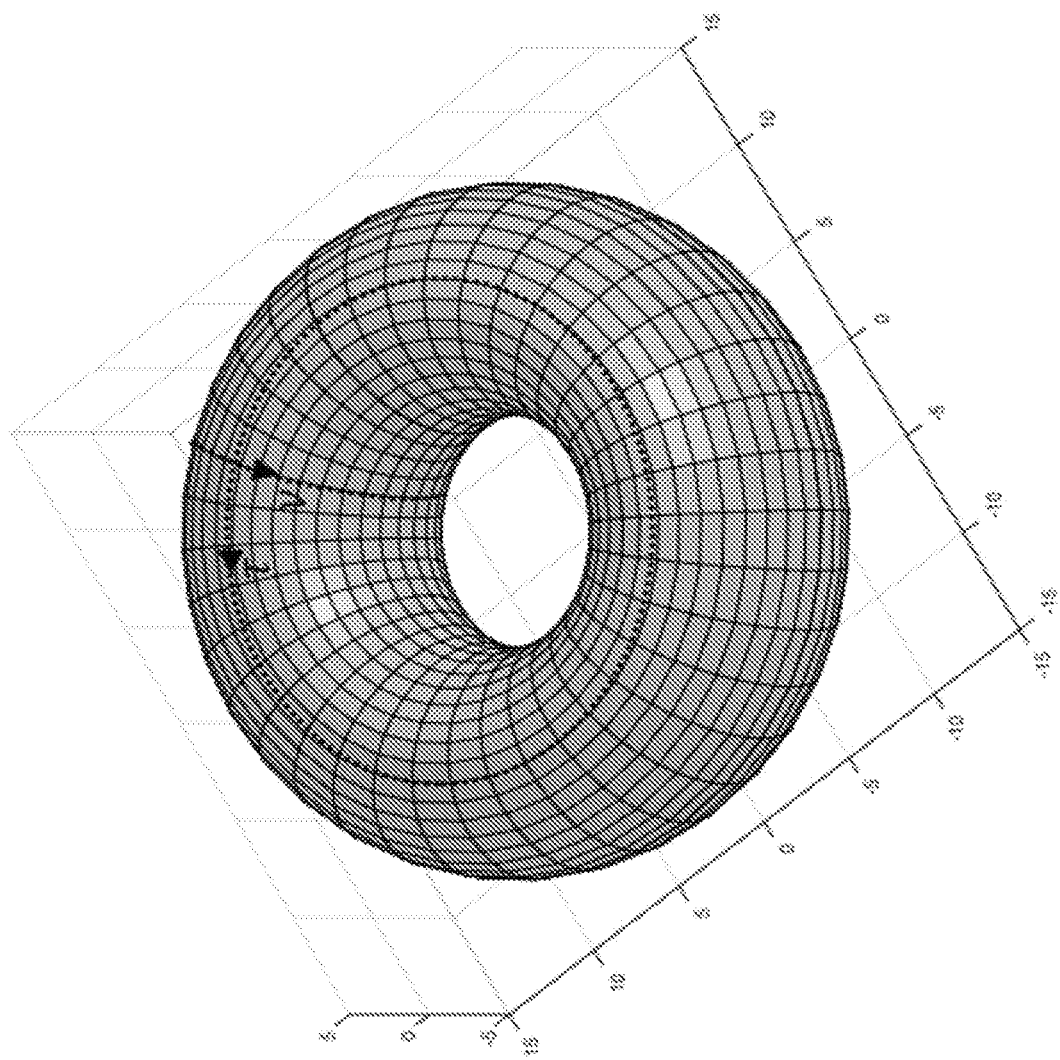

FIG. 27 shows an example of a torus.

Figure 28:
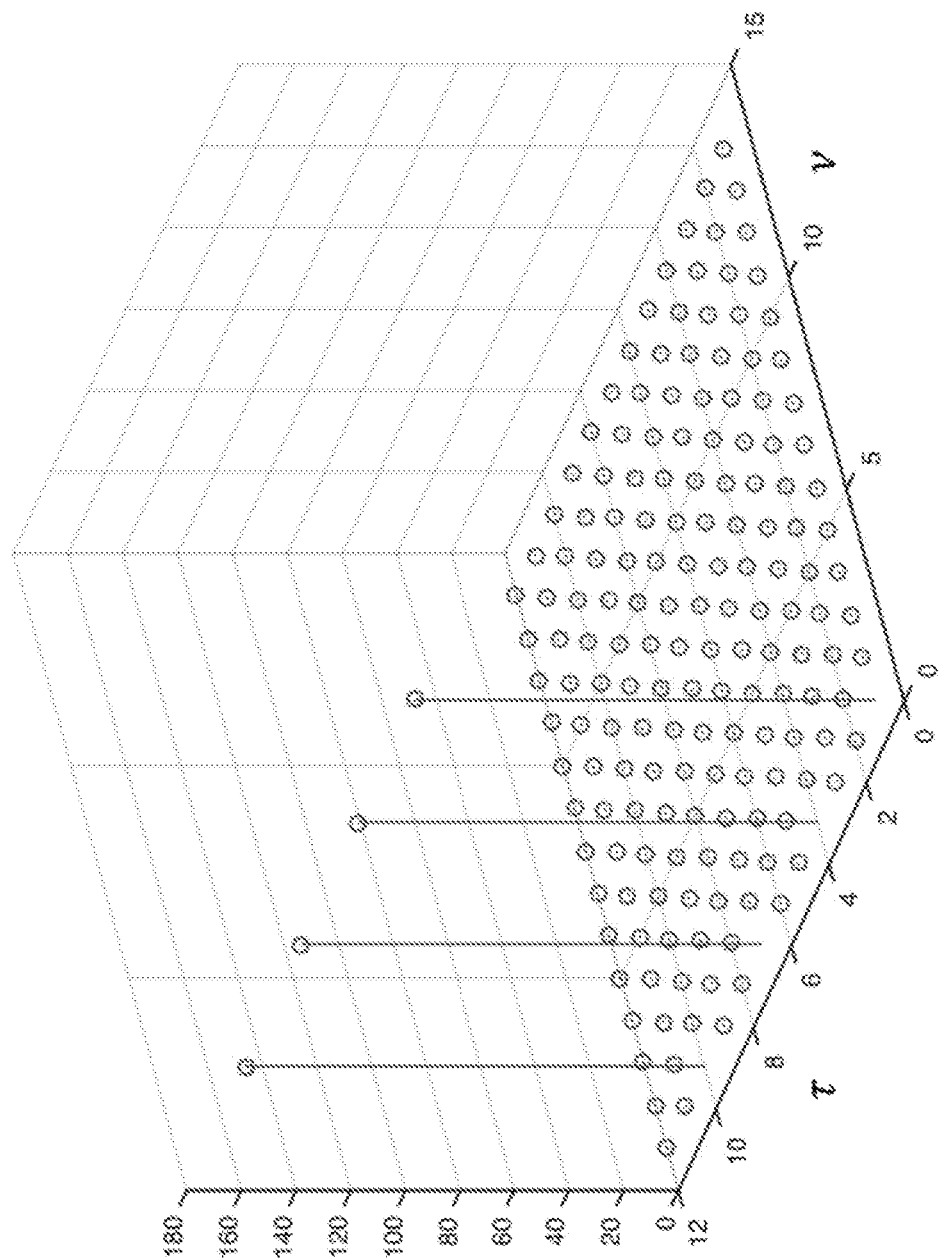

FIG. 28 shows an example of a sampled Delay-Doppler data plane showing the absolute value of an instantiation of the time-domain cyclic shift portion of the 4 LTE UL DM RSs.

Figure 29:
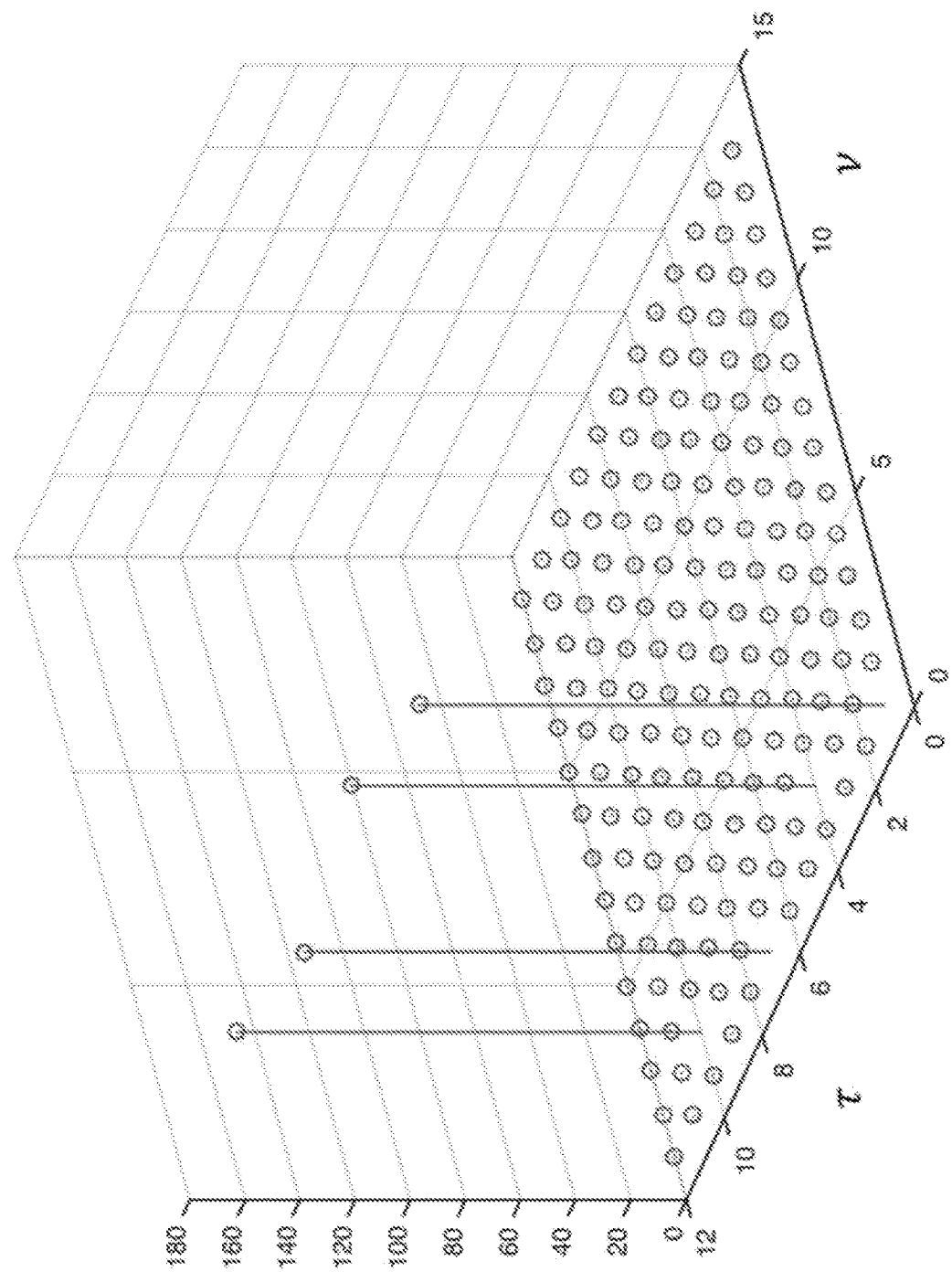

FIG. 29 shows an example staggered version of the 4 LTE DM RSs shown in FIG. 28.

Figure 30:
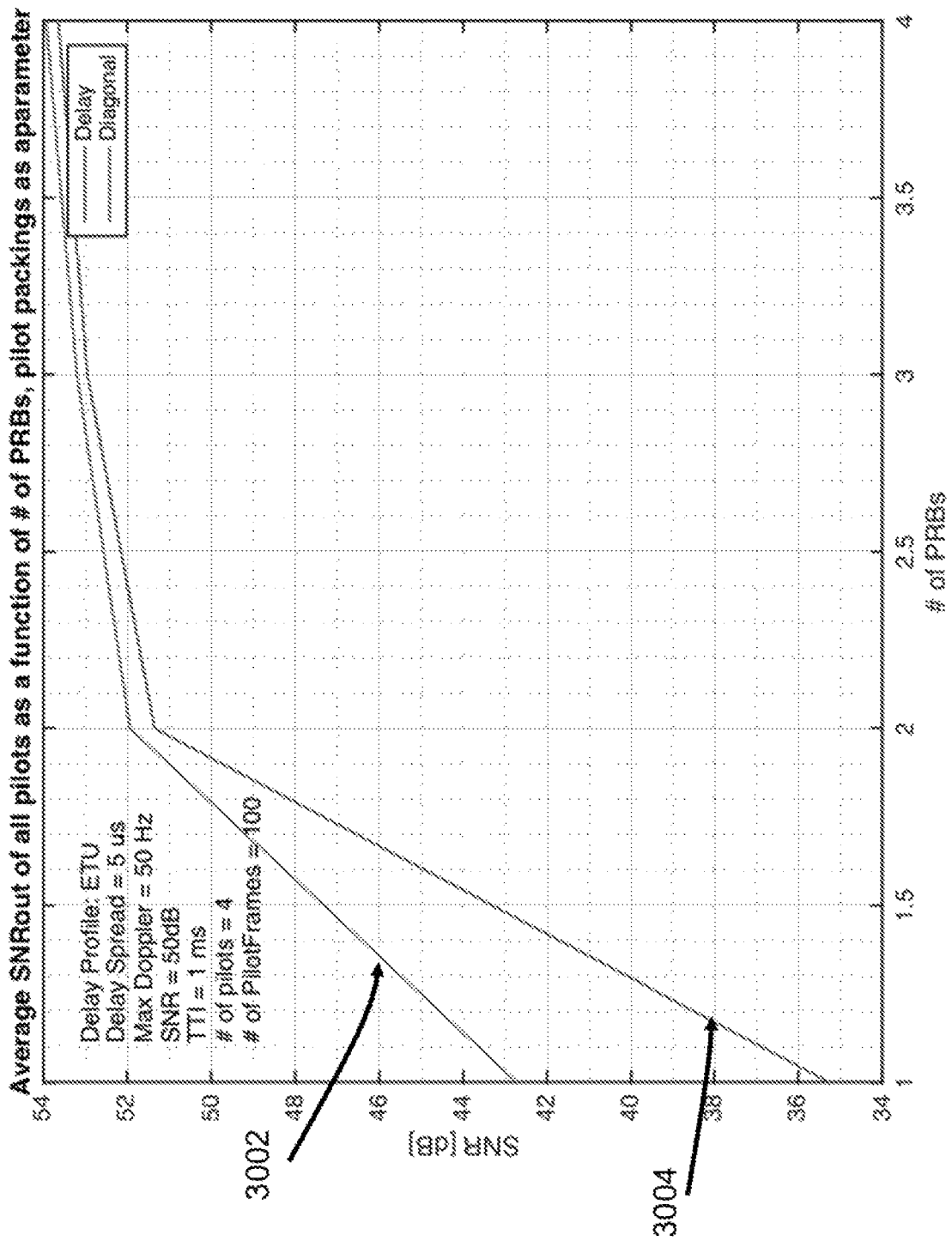

FIG. 30 shows a graphical depiction of an example of average SNR of estimated 4 ETU-50 channels (using MMSE interpolation) for the 4 DM RSs of FIG. 28 (3004) and FIG. 29 (3002) when receiver input SNR is 50 dB.

Figure 31:
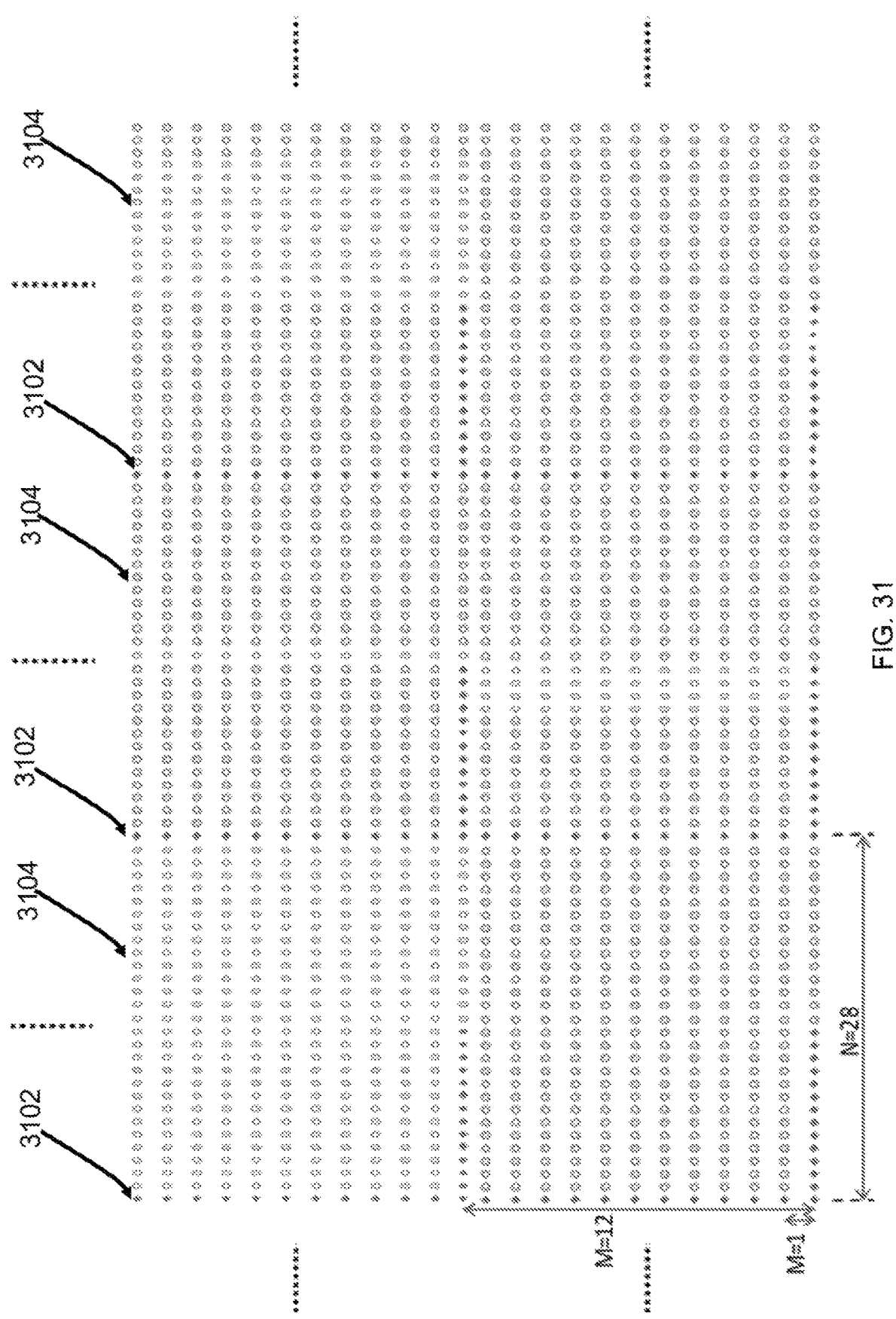

FIG. 31 shows an example of pilots' sample points (3102) on a data lattice (3104).

Figure 32:
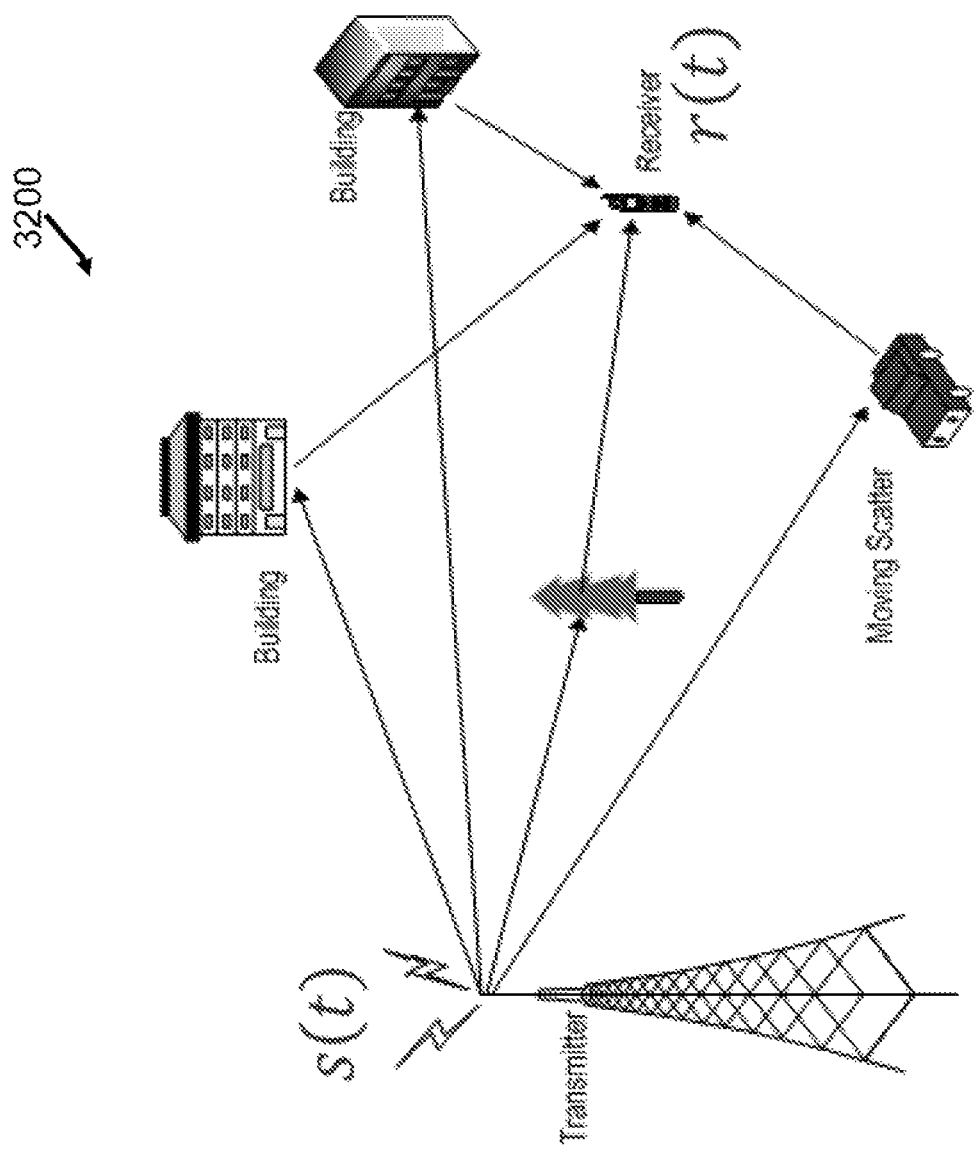

FIG. 32 shows an example communication network in which the disclosed technology can be embodied.

Figure 33:
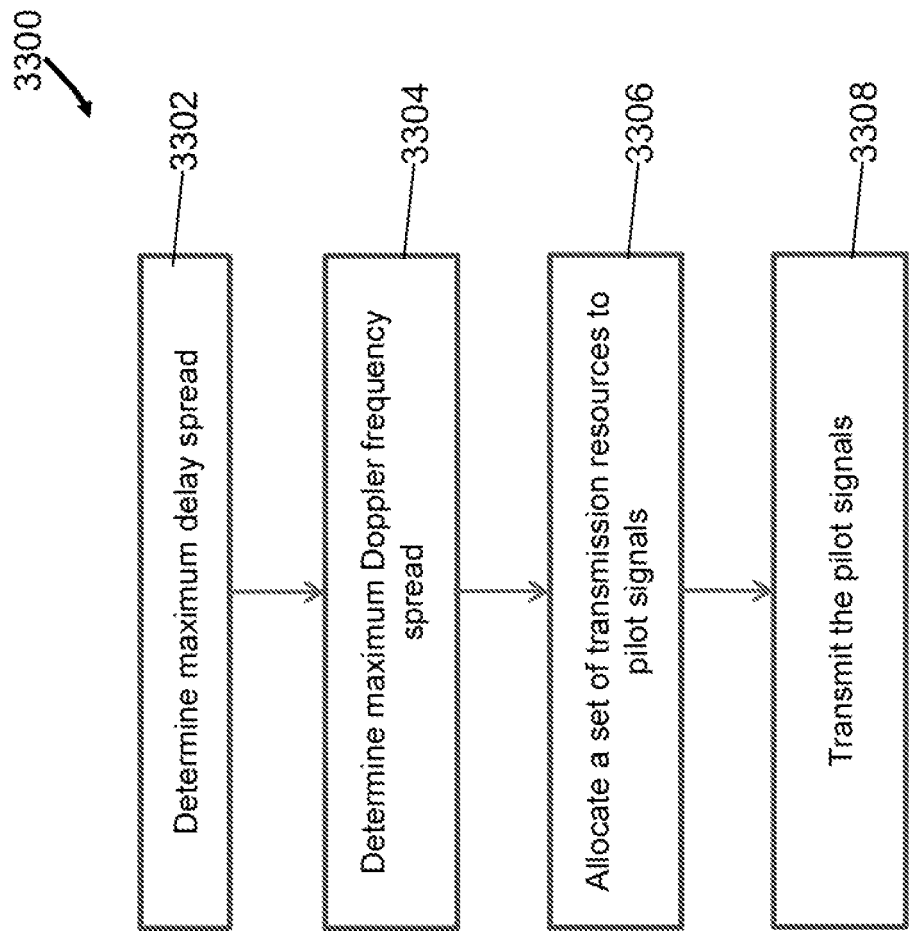

FIG. 33 shows a flowchart of an example method of wireless communication.

Figure 34:
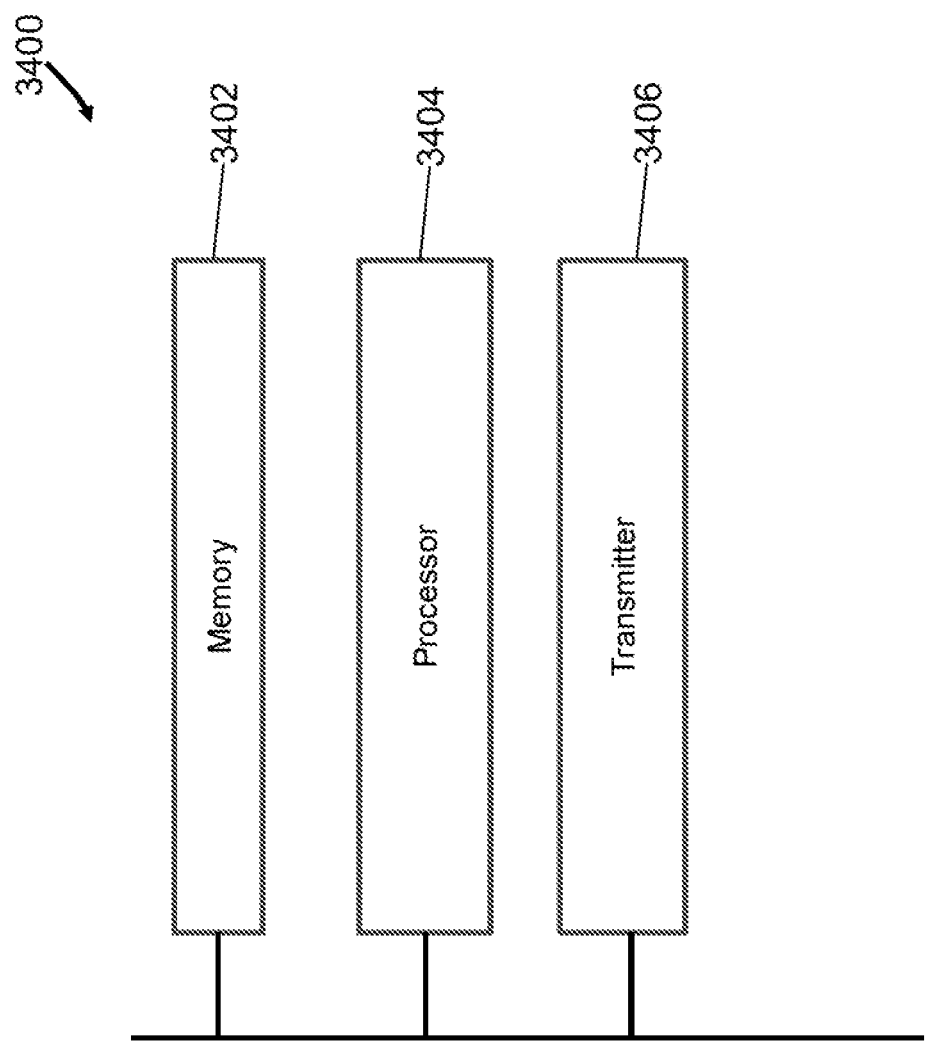

FIG. 34 is a block diagram of an example of a wireless communication apparatus.

Figure 35:
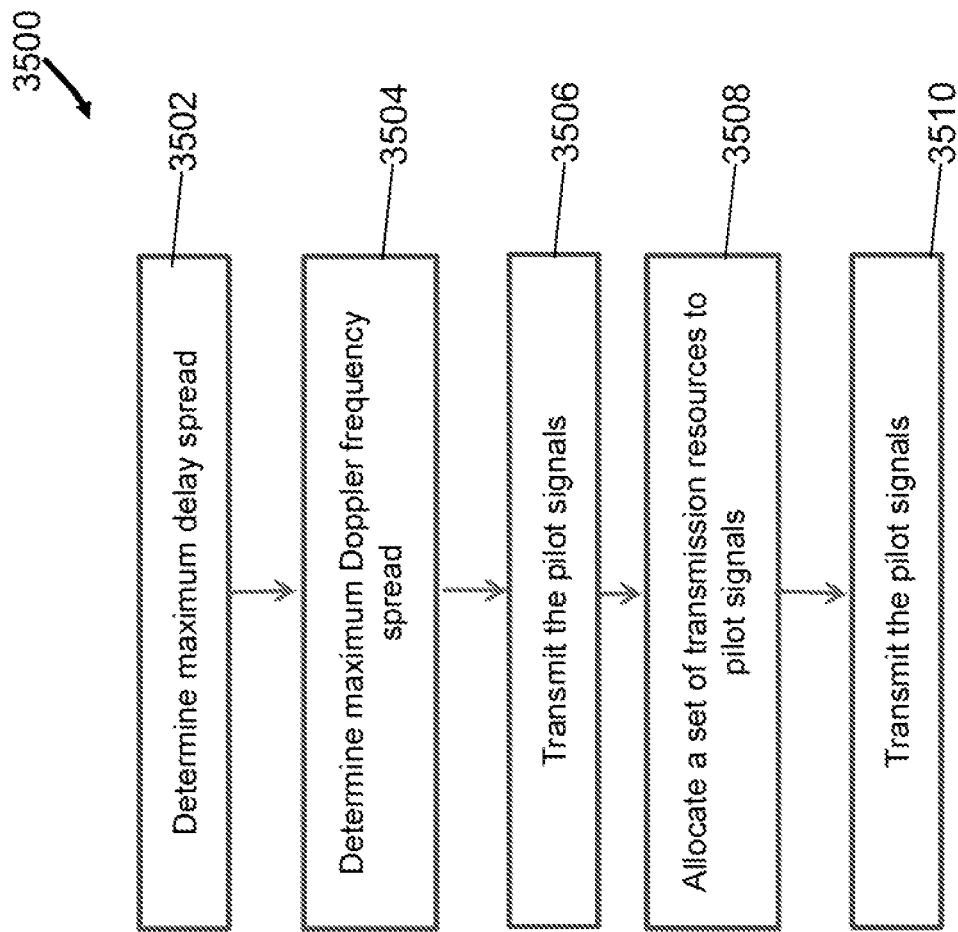

FIG. 35 shows a flowchart of an example method of wireless communication.

Figure 36:
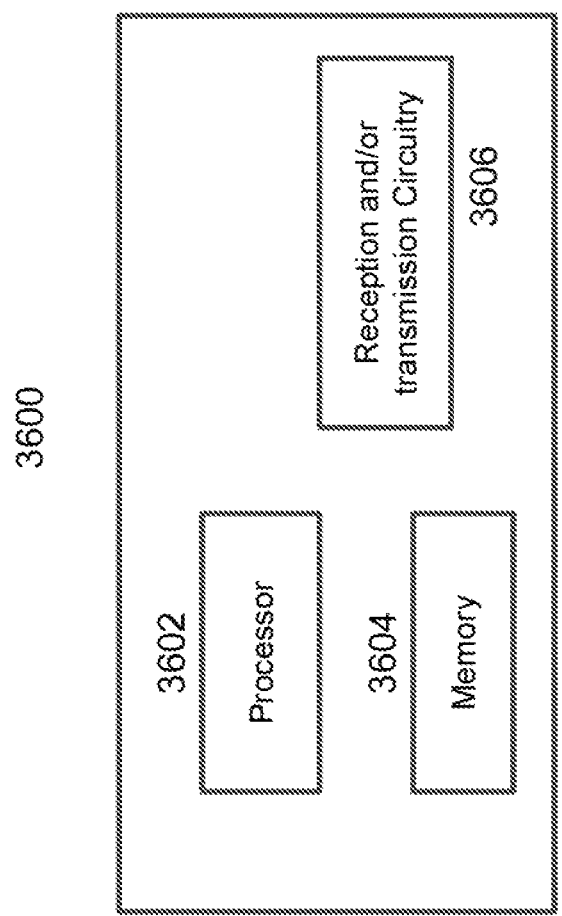

FIG. 36 is a block diagram of an example of a wireless communication apparatus that can be used for embodying some techniques disclosed in this patent document.

DETAILED DESCRIPTION

Section headings are used in this document to help improve readability and do not limit scope of the technology discussed in each section only to that section. Furthermore, for ease of explanation, a number of simplifying assumptions have been made. Although these simplifying assumptions are intended to help convey ideas, they are not intended to be limiting. Some of these simplifying assumptions are:

1. Introduction 4G wireless networks have served the public well, providing ubiquitous access to the internet and enabling the explosion of mobile apps, smartphones and sophisticated data intensive applications like mobile video. This continues an honorable tradition in the evolution of cellular technologies, where each new generation brings enormous benefits to the public, enabling astonishing gains in productivity, convenience, and quality of life.

Looking ahead to the demands that the ever increasing and diverse data usage is putting on the network, it is becoming clear to the industry that current 4G networks will not be able to support the foreseen needs in the near term future. The data traffic volume has been and continues to increase exponentially. AT&T reports that its network has seen an increase in data traffic of 100,000% in the period 2007-2015. Looking into the future, new applications like immersive reality, and remote robotic operation (tactile internet) as well as the expansion of mobile video are expected to overwhelm the carrying capacity of current systems. One of the goals of 5G system design is to be able to economically scale the network to 750 Gbps per sq. Km in dense urban settings, something that is not possible with today's technology.

Beyond the sheer volume of data, the quality of data delivery will need to improve in next generation systems. The public has become accustomed to the ubiquity of wireless networks and is demanding a wireline experience when untethered. This translates to a requirement of 50+ Mbps everywhere (at the cell edge), which will require advanced interference mitigation technologies to be achieved.

Another aspect of the quality of user experience is mobility. Current systems' throughput is dramatically reduced with increased mobile speeds due to Doppler effects which evaporate MIMO capacity gains. Future 5G systems aim to not only increase supported speeds up to 500 Km/h for high speed trains and aviation, but also support a host of new automotive applications for vehicle-to-vehicle and vehicle-to-infrastructure communications.

While the support of increased and higher quality data traffic is necessary for the network to continue supporting the user needs, carriers are also exploring new applications that will enable new revenues and innovative use cases. The example of automotive and smart infrastructure applications discussed above is one of several. Others include the deployment of public safety ultra-reliable networks, the use of cellular networks to support the sunset of the PSTN, etc. The biggest revenue opportunity however, is arguably the deployment of large number of internet connected devices, also known as the internet of things (IoT). Current networks however are not designed to support a very large number of connected devices with very low traffic per device.

In summary, current LTE networks cannot achieve the cost/performance targets required to support the above objectives, necessitating a new generation of networks involving advanced PHY technologies. There are numerous technical challenges that will have to be overcome in 5G networks as discussed next.

1.1 4G Technical Challenged

In order to enable machine-to-machine communications and the realization of the internet of things, the spectral efficiency for short bursts will have to be improved, as well as the energy consumption of these devices (allowing for 10 years operation on the equivalent of 2 AA batteries). In current LTE systems, the network synchronization requirements place a burden on the devices to be almost continuously on. In addition, the efficiency goes down as the utilization per UE (user equipment, or mobile device) goes down. The PHY requirements for strict synchronization between UE and eNB (Evolved Node B, or LTE base station) will have to be relaxed, enabling a re-designing of the MAC for IoT connections that will simplify transitions from idle state to connected state.

Another important use case for cellular IoT (CIoT) is deep building penetration to sensors and other devices, requiring an additional 20 dB or more of dynamic range. 5G CIoT solutions should be able to coexist with the traditional high-throughput applications by dynamically adjusting parameters based on application context.

The path to higher spectral efficiency points towards a larger number of antennas. A lot of research work has gone into full dimension and massive MIMO architectures with promising results. However, the benefits of larger MIMO systems may be hindered by the increased overhead for training, channel estimation and channel tracking for each antenna. A PHY that is robust to channel variations will be needed as well as innovative ways to reduce the channel estimation overhead.

Robustness to time variations is usually connected to the challenges present in high Doppler use cases such as in vehicle-to-infrastructure and vehicle-to-vehicle automotive applications. With the expected use of spectrum up to 60 GHz for 5G applications, this Doppler impact will be an order of magnitude greater than with current solutions. The ability to handle mobility at these higher frequencies would be extremely valuable.

1.2 OTFS Based Solution

OTFS is a modulation technique that modulates each information (e.g., QAM) symbol onto one of a set of two dimensional (2D) orthogonal basis functions that span the bandwidth and time duration of the transmission burst or packet. The modulation basis function set is specifically derived to best represent the dynamics of the time varying multipath channel.

OTFS transforms the time-varying multipath channel into a time invariant delay-Doppler two dimensional convolution channel. In this way, it eliminates the difficulties in tracking time-varying fading, for example in high speed vehicle communications.

OTFS increases the coherence time of the channel by orders of magnitude. It simplifies signaling over the channel using well studied AWGN codes over the average channel SNR. More importantly, it enables linear scaling of throughput with the number of antennas in moving vehicle applications due to the inherently accurate and efficient estimation of channel state information (CSI). In addition, since the delay-doppler channel representation is very compact, OTFS enables massive MIMO and beamforming with CSI at the transmitter for four, eight, and more antennas in moving vehicle applications. The CSI information needed in OTFS is a fraction of what is needed to track a time varying channel.

In deep building penetration use cases, one QAM symbol may be spread over multiple time and/or frequency points. This is a key technique to increase processing gain and in building penetration capabilities for CIoT deployment and PSTN replacement applications. Spreading in the OTFS domain allows spreading over wider bandwidth and time durations while maintaining a stationary channel that does not need to be tracked over time.

Loose synchronization: CoMP and network MIMO techniques have stringent clock synchronization requirements for the cooperating eNBs. If clock frequencies are not well synchronized, the UE will receive each signal from each eNB with an apparent "Doppler" shift. OTFS's reliable signaling over severe Doppler channels can enable CoMP deployments while minimizing the associated synchronization difficulties.

These benefits of OTFS will become apparent once the basic concepts behind OTFS are understood. There is a rich mathematical foundation of OTFS that leads to several variations; for example it can be combined with OFDM or with multicarrier filter banks. In this paper we navigate the challenges of balancing generality with ease of understanding as follows:

In Section 2 we start by describing the wireless Doppler multipath channel and its effects on multicarrier modulation.

In Section 3, we develop OTFS as a modulation that matches the characteristics of the time varying channel. We show OTFS as consisting of two processing steps:

A step that allows transmission over the time frequency plane, via orthogonal waveforms generated by translations in time and/or frequency. In this way, the (time-varying) channel response is sampled over points of the time-frequency plane.

A pre-processing step using carefully crafted orthogonal functions employed over the time-frequency plane, which translate the time-varying channel in the time-frequency plane, to a time-invariant one in the new information domain defined by these orthogonal functions.

In Section 4 we develop some more intuition on the new modulation scheme by exploring the behavior of the channel in the new modulation domain in terms of coherence, time and frequency resolution etc.

In Sections 5 and 6 we explore aspects of channel estimation in the new information domain and multiplexing multiple users respectively, while in Section 7 we address complexity and implementation issues.

In Sections 8, we provide some performance results and we put the OTFS modulation in the context of cellular systems, discuss its attributes and its benefits for 5G systems.

2. The Wireless Channel

The multipath fading channel is commonly modeled in the baseband as a convolution channel with a time varying impulse response $$r(t) = \int \tilde{h}(\tau,t)s(t-\tau)d\tau \quad (1)$$

where s(t) and r(t) represent the complex baseband channel input and output respectively and where $\tilde{h}(\tau,t)$ is the complex baseband time varying channel response.

This representation, while general, does not give us insight into the behavior and variations of the time varying impulse response. A more useful and insightful model, which is also commonly used for Doppler multipath doubly fading channels is $$r(t) = \iint h(\tau,v)e^{j2\pi v(t-\tau)}s(t-\tau)dvd\tau \quad (2)$$

In this representation, the received signal is a superposition of reflected copies of the transmitted signal, where each copy is delayed by the path delay τ, frequency shifted by the Doppler shift v and weighted by the time-invariant delay-Doppler impulse response h(τ,v) for that τ and v. In addition to the intuitive nature of this representation, Eq. (2) maintains the generality of Eq. (1). In other words it can represent complex Doppler trajectories, like accelerating vehicles, reflectors etc. This can be seen if we express the time varying impulse response as a Fourier expansion with respect to the time variable t $$\tilde{h}(\tau,t) = \int h(\tau,v)e^{j2\pi vt}dt \quad (3)$$

Substituting (3) in (1) we obtain Eq. (2) after some manipulation[1]. More specifically, we obtain $y(t)=\iint e^{j2\pi v\tau}h(\tau,v)e^{j2\pi v(t-\tau)}x(t-\tau)dvd\tau$ which differs from the

[1] More specifically we obtain $y(t)=\iint e^{j2\pi v\tau}h(\tau,v)e^{j2\pi v(t-\tau)}x(t-\tau)dvd\tau$ which differs from Error! Reference source not found. by an exponential factor; however, we can absorb the exponential factor in the definition of the impulse response h(τ,v) making the two representatives equivalent. above equations by an exponential factor; however, we can absorb the exponential factor in the definition of the impulse response h(τ,v) making the two representations equivalent.

Figure 1:
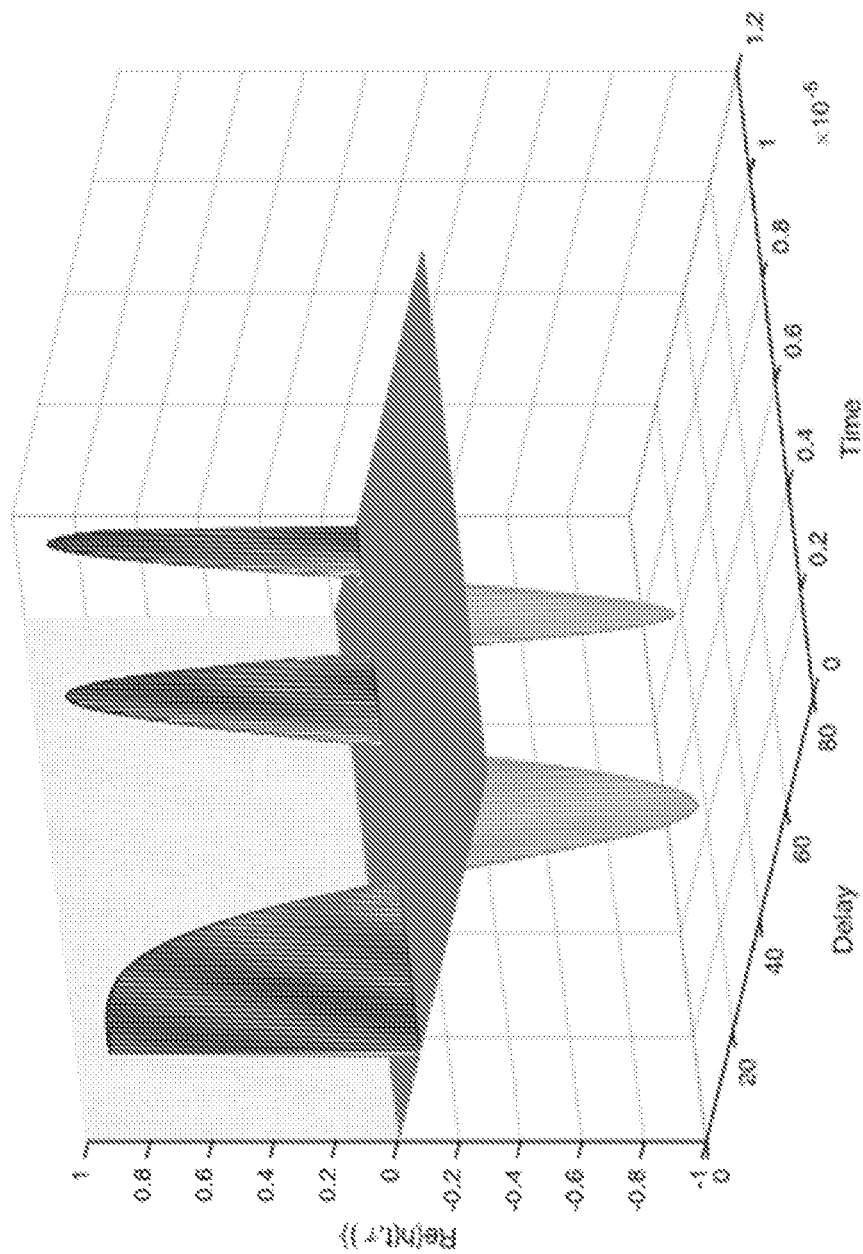
FIG. 1 shows an example trajectory of Time Varying Impulse Response for Accelerating Reflector.
Figure 2:
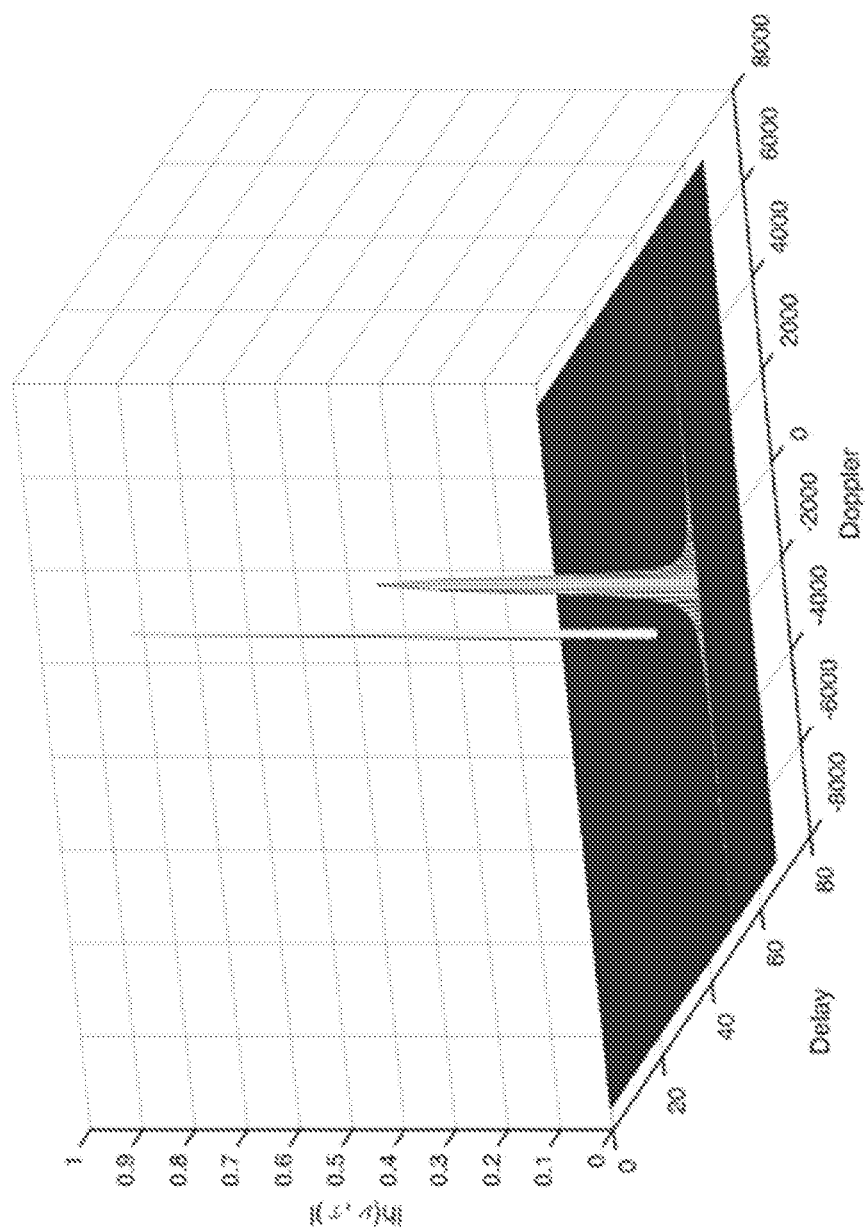
FIG. 2 shows an example of Delay-Doppler Representation for an Accelerating Reflector Channel.

As an example, FIG. 1 shows the time-varying impulse response for an accelerating reflector in the (τ,t) coordinate system, while FIG. 2 shows the same channel represented as a time invariant impulse response in the ($\tau$,v) coordinate system.

An important feature revealed by these two figures is how compact the ($\tau$,v) representation is compared to the ($\tau$,t) representation. This has important implications for channel estimation, equalization and tracking as will be discussed later.

Notice that while h($\tau$,v) is, in fact, time-invariant, the operation on s(t) is still time varying, as can be seen by the effect of the explicit complex exponential function of time in Eq. (2). The technical efforts in this paper are focused on developing a modulation scheme based on appropriate choice of orthogonal basis functions that render the effects of this channel truly time-invariant in the domain defined by those basis functions. Let us motivate those efforts with a high level outline of the structure of the proposed scheme here.

Let us consider a set of orthonormal basis functions $\phi_{\tau,v}(t)$ indexed by $\tau$,v which are orthogonal to translation and modulation, i.e., $$\phi_{\tau,v}(t-\tau_0) = \phi_{\tau+\tau_0,v}(t)$$

$$e^{j2\pi v_0 t}\phi_{\tau,v}(t) = \phi_{\tau,v-v_0}(t) \quad (4)$$

and let us consider the transmitted signal as a superposition of these basis functions $$s(t) = \iint x(\tau,v)\phi_{\tau,v}(t)d\tau dv \quad (5)$$

where the weights $x(\tau,v)$ represent the information bearing signal to be transmitted. After the transmitted signal of (5) goes through the time varying channel of Eq. (2) we obtain a superposition of delayed and modulated versions of the basis functions, which due to (4) results in $$r(t) = \iint h(\tau,v)e^{j2\pi v(t-\tau)}s(t-\tau)dvd\tau \quad (6)$$

$$= \iint \phi_{\tau,v}(t)\{h(\tau,v) * x(\tau,v)\}d\tau dv$$

where * denotes two dimensional convolution. Eq. (6) can be thought of as a generalization of the derivation of the convolution relationship for linear time invariant systems, using one dimensional exponentials as basis functions. Notice that the term in brackets can be recovered at the receiver by matched filtering against each basis function $\phi_{\tau,v}(t)$. In this way a two dimensional channel relationship is established in the ($\tau$,v) domain y($\tau$,v)=h($\tau$,v)*x($\tau$,v), where y($\tau$,v) is the receiver two dimensional matched filter output. Notice also, that in this domain the channel is described by a time invariant two-dimensional convolution.

A final different interpretation of the wireless channel will also be useful in what follows. Let us consider s(t) and r(t) as elements of the Hilbert space of square integrable functions $\mathcal{H}$. Then Eq. (2) can be interpreted as a linear operator on $\mathcal{H}$ acting on the input s(t), parametrized by the impulse response h($\tau$,v), and producing the output r(t)

$$r = \prod_h(s): \quad s(t) \in \mathcal{H} \xrightarrow{\Pi_h(\cdot)} r(t) \in \mathcal{H} \quad (7)$$

Notice that although the operator is linear, it is not time-invariant. In the no Doppler case, i.e., if h(v,$\tau$)=h(0,$\tau$)$\delta$(v), then Eq. (2) reduces to a time invariant convolution.

Also notice that while for time invariant systems the impulse response is parameterized by one dimension, in the time varying case we have a two dimensional impulse response. While in the time invariant case the convolution operator produces a superposition of delays of the input s(t), (hence the parameterization is along the one dimensional delay axis) in the time varying case we have a superposition of delay-and-modulate operations as seen in Eq. (2) (hence the parameterization is along the two dimensional delay and Doppler axes). This is a major difference which makes the time varying representation non-commutative (in contrast to the convolution operation which is commutative), and complicates the treatment of time varying systems.

The important point of Eq. (7) is that the operator $\Pi_h(\cdot)$ can be compactly parametrized in a two dimensional space h($\tau$,v), providing an efficient, time invariant description of the channel. Typical channel delay spreads and Doppler spreads are a very small fraction of the symbol duration and subcarrier spacing of multicarrier systems.

In the mathematics literature, the representation of time varying systems of (2) and (7) is called the Heisenberg representation [1]. It can actually be shown that every linear operator (7) can be parameterized by some impulse response as in (2).

3. OTFS Modulation Over the Doppler Multipath Channel

The time variation of the channel introduces significant difficulties in wireless communications related to channel acquisition, tracking, equalization and transmission of channel state information (CSI) to the transmit side for beamforming and MIMO processing. In this paper, we develop a modulation domain based on a set of orthonormal basis functions over which we can transmit the information symbols, and over which the information symbols experience a static, time invariant, two dimensional channel for the duration of the packet or burst transmission. In that modulation domain, the channel coherence time is increased by orders of magnitude and the issues associated with channel fading in the time or frequency domain in SISO or MIMO systems are significantly reduced.

Orthogonal Time Frequency Space (OTFS) modulation is comprised of a cascade of two transformations. The first transformation maps the two dimensional plane where the information symbols reside (and which we call the delay-Doppler plane) to the time frequency plane. The second one transforms the time frequency domain to the waveform time domain where actual transmitted signal is constructed. This transform can be thought of as a generalization of multicarrier modulation schemes.

Figure 3:
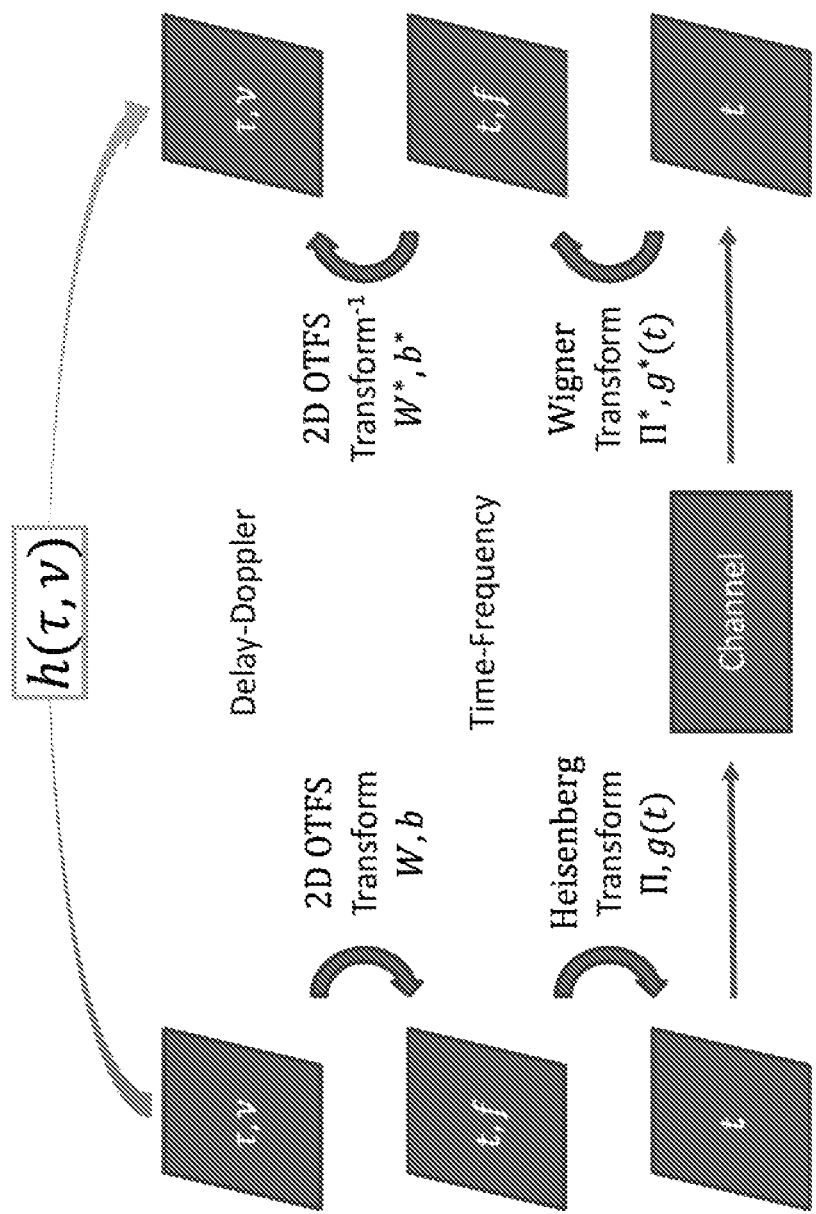
FIG. 3 depicts example Levels of Abstraction: Signaling over the (i) actual channel with a signaling waveform (ii) the time-frequency Domain (iii) the delay-Doppler Domain.
Figure 4:
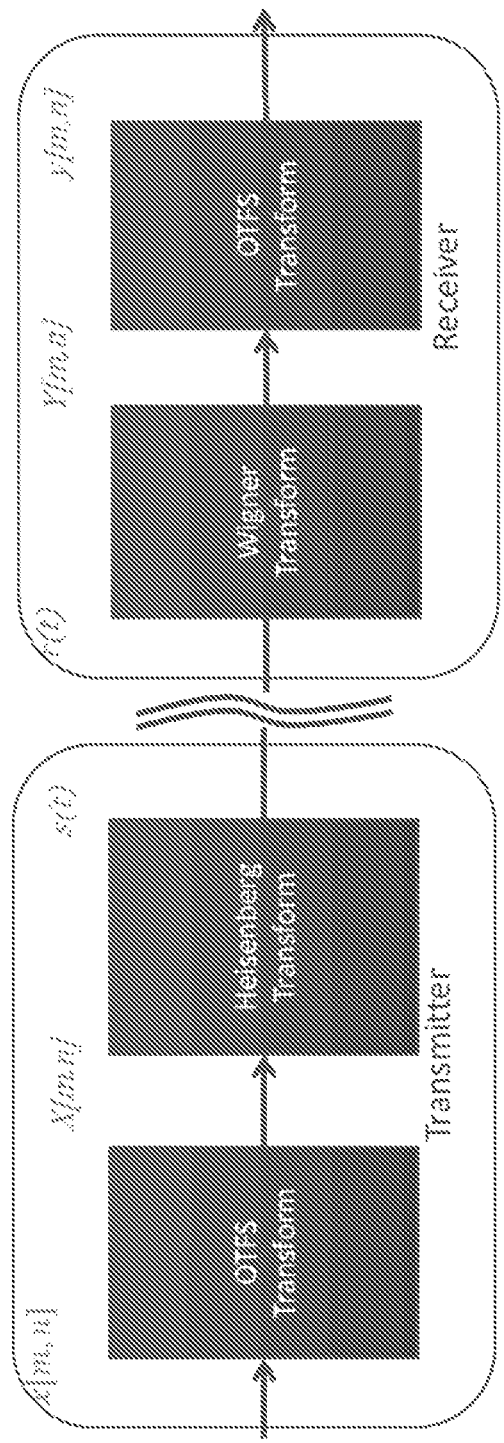
FIG. 4 shows examples of notation Used to Denote Signals at Various Stages of Transmitter and Receiver.

FIG. 3 provides a pictorial view of the two transformations that constitute the OTFS modulation. It shows at a high level the signal processing steps that are required at the transmitter and receiver. It also includes the parameters that define each step, which will become apparent as we further expose each step. Further, FIG. 4 shows a block diagram of the different processing stages at the transmitter and receiver and establishes the notation that will be used for the various signals.

We start our description with the transform which relates the waveform domain to the time-frequency domain.

3.1 The Heisenberg Transform

Our purpose in this section is to construct an appropriate transmit waveform which carries information provided by symbols on a grid in the time-frequency plane. Our intent in developing this modulation scheme is to transform the channel operation to an equivalent operation on the time-frequency domain with two important properties:

The channel is orthogonalized on the time-frequency grid.

The channel time variation is simplified on the time-frequency grid and can be addressed with an additional transform.

Fortunately, these goals can be accomplished with a scheme that is very close to well-known multicarrier modulation techniques, as explained next. We will start with a general framework for multicarrier modulation and then give examples of OFDM and multicarrier filter bank implementations.

Let us consider the following components of a time frequency modulation:

A lattice or grid on the time frequency plane, that is a sampling of the time axis with sampling period T and the frequency axis with sampling period $\Delta f$.

$$\Lambda = \{(nT, m\Delta f), n, m \in \mathbb{Z}\} \quad (8)$$

A packet burst with total duration NT secs and total bandwidth $M\Delta f$ Hz

A set of modulation symbols $X[n,m]$, $n=0, \ldots, N-1$, $m=0, \ldots, M-1$ we wish to transmit over this burst A transmit pulse $g_{tr}(t)$ with the property[2] of being orthogonal to translations by T and modulations by $\Delta f$

[2]This orthogonality property is required if the receiver uses the same pulse as the transmitter. We will generalize it to a bi-orthogonality property in later sections.

$$\begin{aligned}&<g_{tr}(t), g_{tr}(t-nT)e^{j2\pi m\Delta f(t-nT)}> = \\ &\int g^*_{tr}(t)g_{tr}(t-nT)e^{j2\pi m\Delta f(t-nT)}dt = \delta(m)\delta(n)\end{aligned} \quad (9)$$

Given the above components, the time-frequency modulator is a Heisenberg operator on the lattice $\Lambda$, that is, it maps the two dimensional symbols $X[n.m]$ to a transmitted waveform, via a superposition of delay-and-modulate operations on the pulse waveform $g_{tr}(t)$ $$s(t) = \sum_{m=-M/2}^{M/2-1} \sum_{n=0}^{N-1} X[n, m] g_{tr}(t - nT) e^{j2\pi m\Delta f(t-nT)} \quad (10)$$

More formally $$x = \prod_X (g_{tr}): \quad g_{tr}(t) \in \mathcal{H} \xrightarrow{\Pi_X(\cdot)} y(t) \in \mathcal{H} \quad (11)$$

where we denote by $\Pi_X(\cdot)$ the "discrete" Heisenberg operator, parameterized by discrete values $X[n,m]$.

Notice the similarity of (11) with the channel equation (7). This is not by coincidence, but rather because we apply a modulation effect that mimics the channel effect, so that the end effect of the cascade of modulation and channel is more tractable at the receiver. It is not uncommon practice; for example, linear modulation (aimed at time invariant channels) is in its simplest form a convolution of the transmit pulse g (t) with a delta train of QAM information symbols sampled at the Baud rate T.

$$s(t) = \sum_{n=0}^{N-1} X[n]g(t - nT) \quad (12)$$

In our case, aimed at the time varying channel, we convolve-and-modulate the transmit pulse (c.f. the channel Eq. (2)) with a two dimensional delta train which samples the time frequency domain at a certain Baud rate and subcarrier spacing.

The sampling rate in the time-frequency domain is related to the bandwidth and time duration of the pulse $g_{tr}(t)$ namely its time-frequency localization. In order for the orthogonality condition of (9) to hold for a frequency spacing $\Delta f$, the time spacing must be $T \geq 1/\Delta f$. The critical sampling case of $T = 1/\Delta f$ is generally not practical and refers to limiting cases, for example to OFDM systems with cyclic prefix length equal to zero or to filter banks with $g_{tr}(t)$ equal to the ideal Nyquist pulse.

Some examples are as follows:

Example 1: OFDM Modulation: Let us consider an OFDM system with M subcarriers, symbol length $T_{OFDM}$, cyclic prefix length $T_{CP}$ and subcarrier spacing $1/T_{OFDM}$. If we substitute in Equation (10) symbol duration $T = T_{OFDM} + T_{CP}$, number of symbols N=1, subcarrier spacing $\Delta f = 1/T_{OFDM}$ and $g_{tr}(t)$ a square window that limits the duration of the subcarriers to the symbol length T $$g_{tr}(t) = \begin{cases} 1/\sqrt{T - T_{CP}}, & -T_{CP} < T < T - T_{CP} \\ 0, & \text{else} \end{cases} \quad (13)$$

then we obtain the OFDM formula[3]

[3]Technically, the pulse of Eq. (13) is not orthonormal but is orthogonal to the receive filter (where the CP samples are discarded) as we will see shortly.

$$x(t) = \sum_{m=-M/2}^{M/2-1} x[n, m] g_{tr}(t) e^{j2\pi m\Delta ft} \quad (14)$$

Example 2: Single Carrier Modulation: Equation (10) reduces to single carrier modulation if we substitute M=1 subcarrier, T equal to the Baud period and $g_{tr}(t)$ equal to a square root raised cosine Nyquist pulse.

Example 3: Multicarrier Filter Banks (MCFB): Equation (10) describes a MCFB if $g_{tr}(t)$ is a square root raised cosine Nyquist pulse with excess bandwidth $\alpha$, T is equal to the Baud period and $\Delta f = (1+\alpha)/T$.

Expressing the modulation operation as a Heisenberg transform as in Eq. (11) may be counterintuitive. We usually think of modulation as a transformation of the modulation symbols $X[m,n]$ to a transmit waveform s(t). The Heisenberg transform instead, uses $X[m,n]$ as weights/parameters of an operator that produces s(t) when applied to the prototype transmit filter response $g_{tr}(t)$–c.f. Eq. (11). While counterintuitive, this formulation is useful in pursuing an abstraction of the modulation-channel-demodulation cascade effects in a two dimensional domain where the channel can be described as time invariant.

We next turn our attention to the processing on the receiver side needed to go back from the waveform domain to the time-frequency domain. Since the received signal has undergone the cascade of two Heisenberg transforms (one by the modulation effect and one by the channel effect), it is natural to inquire what the end-to-end effect of this cascade is. The answer to this question is given by the following result:

Proposition 1: Let two Heisenberg transforms as defined by Eqs. (7), (2) be parametrized by impulse responses $h_1(\tau, v)$, $h_2(\tau, v)$ and be applied in cascade to a waveform $g(t) \in \mathcal{H}$. Then $$\Pi_{h_2}(\Pi_{h_1}(g(t))) = \Pi_h(g(t)) \quad (15)$$

where $h(\tau,v) = h_2(\tau,v) \odot h_1(\tau,v)$ is the "twisted" convolution of $h_1(\tau,v)$, $h_2(\tau,v)$ defined by the following convolve-and-modulate operation $$h(\tau,v) = \iint h_2(\tau',v')h_1(\tau-\tau',v-v')e^{j2\pi v'(\tau-\tau')}d\tau'dv' \quad (16)$$

Proof: See Appendix 0.

Applying the above result to the cascade of the modulation and channel Heisenberg transforms of (11) and (7), we can show that the received signal is given by the Heisenberg transform $$r(t) = \Pi_f(g_{tr}(t)) + v(t) = \iint f(\tau,v)e^{j2\pi v(t-\tau)}g_{tr}(t-\tau)dvd\tau + v(t) \quad (17)$$

where $v(t)$ is additive noise and $f(\tau,v)$, the impulse response of the combined transform, is given by the twisted convolution of $X[n,m]$ and $h(\tau,v)$ $$f(\tau, v) = h(\tau, v) \odot X[n, m] = \sum_{m=-M/2}^{M/2-1}\sum_{n=0}^{N-1} X[n, m]h(\tau - nT, v - m\Delta f)e^{j2\pi(v-m\Delta f)nT} \quad (18)$$

This result can be considered an extension of the single carrier modulation case, where the received signal through a time invariant channel is given by the convolution of the QAM symbols with a composite pulse, that pulse being the convolution of the transmitter pulse and the channel impulse response.

With this result established we are ready to examine the receiver processing steps.

3.2 Receiver Processing and the Wigner Transform

Figure 5:
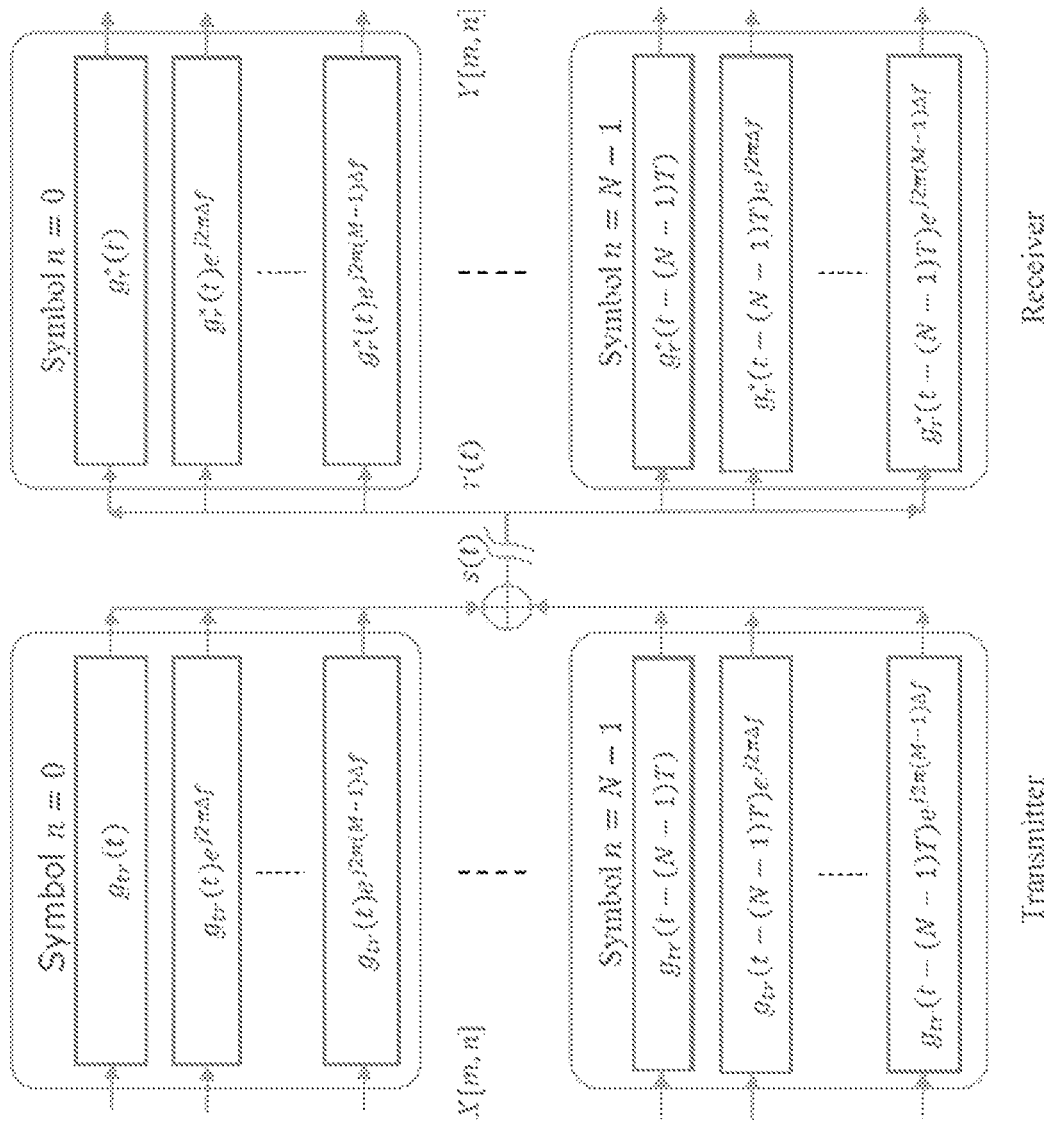
FIG. 5 depicts an example of a conceptual Implementation of the Heisenberg Transform in the Transmitter and the Wigner Transform in the Receiver.

Typical communication system design dictates that the receiver performs a matched filtering operation, taking the inner product of the received waveform with the transmitter pulse, appropriately delayed or otherwise distorted by the channel. In our case, we have used a collection of delayed and modulated transmit pulses, and we need to perform a matched filter on each one of them. FIG. 5 provides a conceptual view of this processing. On the transmitter, we modulate a set of M subcarriers for each symbol we transmit, while on the receiver we perform matched filtering on each of those subcarrier pulses. We define a receiver pulse $g_r(t)$ and take the inner product with a collection of delayed and modulated versions of it. The receiver pulse $g_r(t)$ is in many cases identical to the transmitter pulse, but we keep the separate notation to cover some cases where it is not (most notably in OFDM where the CP samples have to be discarded).

While this approach will yield the sufficient statistics for data detection in the case of an ideal channel, a concern can be raised here for the case of non-ideal channel effects. In this case, the sufficient statistics for symbol detection are obtained by matched filtering with the channel-distorted, information-carrying pulses (assuming that the additive noise is white and Gaussian). In many well designed multicarrier systems however (e.g., OFDM and MCFB), the channel distorted version of each subcarrier signal is only a scalar version of the transmitted signal, allowing for a matched filter design that is independent of the channel and uses the original transmitted subcarrier pulse. We will make these statements more precise shortly and examine the required conditions for this to be true.

FIG. 5 is only a conceptual illustration and does not point to the actual implementation of the receiver. Typically this matched filtering is implemented in the digital domain using an FFT or a polyphase transform for OFDM and MCFB respectively. In this paper we are rather more interested in the theoretical understanding of this modulation. To this end, we will consider a generalization of this matched filtering by taking the inner product $<g_r(t-\tau)e^{j2\pi v(t-\tau)}, r(t)>$ of the received waveform with the delayed and modulated versions of the receiver pulse for arbitrary time and frequency offset $(\tau,v)$. While this is not a practical implementation, it allows us to view the operations of FIG. 5 as a two dimensional sampling of this more general inner product.

Let us define the inner product $$A_{g_r,r}(\tau,v) = <g_r(t-\tau)e^{j2\pi v(t-\tau)}, r(t)> = \int g_r^*(t-\tau)e^{-j2\pi v(t-\tau)}r(t)dt \quad (19)$$

The function $A_{g_r,r}(\tau,v)$ is known as the cross-ambiguity function in the radar and math communities and yields the matched filter output if sampled at $\tau=nT$, $v=m\Delta f$ (on the lattice $\Lambda$), i.e., $$Y[n,m] = A_{g_r,r}(\tau,v)|_{\tau=nT,v=m\Delta f} \quad (20)$$

In the math community, the ambiguity function is related to the inverse of the Heisenberg transform, namely the Wigner transform. FIG. 5 provides an intuitive feel for that, as the receiver appears to invert the operations of the transmitter[4].

[4] More formally, if we take the cross-ambiguity or the transmit and receive pulses $A_{g_r,g_{tr}}(\tau,v)$, and use it as the impulse response of the Heisenberg operator, then we obtain the orthogonal cross-projection operator $$\Pi_{A_{g_r,g_{tr}}}(y(t)) = g_{tr}(t) <g_r(t), y(t)>$$

In words, the coefficients that come out of the matched filter, if used in a Heisenberg representation, will provide the best approximation to the original $y(t)$ in the sense of minimum square error.

The key question here is what the relationship is between the matched filter output $Y[n,m]$ (or more generally $Y(\tau,v)$) and the transmitter input $X[n,m]$. We have already established in (17) that the input to the matched filter $r(t)$ can be expressed as a Heisenberg representation with impulse response $f(\tau,v)$ (plus noise). The output of the matched filter then has two contributions $$Y(\tau,v) = A_{g_r,r}(\tau,v) = A_{g_r,[\Pi_f(g_{tr})+v]}(\tau,v) = A_{g_r,\Pi_f(g_{tr})}(\tau,v) = A_{g_r,v}(\tau,v) \quad (21)$$

The last term is the contribution of noise, which we will denote $V(\tau,v) = A_{g_r,v}(\tau,v)$. The first term on the right hand side is the matched filter output to the (noiseless) input comprising of a superposition of delayed and modulated versions of the transmit pulse. We next establish that this term can be expressed as the twisted convolution of the two dimensional impulse response $f(\tau,v)$ with the cross-ambiguity function (or two dimensional cross correlation) of the transmit and receive pulses.

The following theorem summarizes the key result.

Theorem 1: (Fundamental time-frequency domain channel equation). If the received signal can be expressed as $$\Pi_f(g_{tr}(t)) = \iint f(\tau,v)e^{j2\pi v(t-\tau)}g_{tr}(t-\tau)dvd\tau \quad (22)$$

Then the cross-ambiguity of that signal with the receive pulse $g_{tr}(t)$ can be expressed as $$A_{g_r,\Pi_f(g_{tr})}(\tau,v) = f(\tau,v) \odot A_{g_r,g_{tr}}(\tau,v) \quad (23)$$

Proof: See Appendix 0.

Recall from (18) that $f(\tau,v) = h(\tau,v) \odot X[n,m]$, that is, the composite impulse response is itself a twisted convolution of the channel response and the modulation sumbols.

Substituting $f(\tau,v)$ from (18) into (21) we obtain the end-to-end channel description in the time frequency domain $$Y(\tau, v) = A_{g_r, \Pi_r(g_{tr})}(\tau, v) + V(\tau, v) \quad (24)$$

$$= h(\tau, v) \odot X[n, m] \odot A_{g_r, g_{tr}}(\tau, v) + V(\tau, v)$$

where $V(\tau,v)$ is the additive noise term. Eq. (24) provides an abstraction of the time varying channel on the time-frequency plane. It states that the matched filter output at any time and frequency point $(\tau,v)$ is given by the delay-Doppler impulse response of the channel twist-convolved with the impulse response of the modulation operator twist-convolved with the cross-ambiguity (or two dimensional cross correlation) function of the transmit and receive pulses.

Evaluating Eq. (24) on the lattice $\Lambda$ we obtain the matched filter output modulation symbol estimates $$\hat{X}[m,n]=Y[n,m]=Y(\tau,v)|_{\tau=nT, v=m\Delta f} \quad (25)$$

In order to get more intuition on Equations (24), (25) let us first consider the case of an ideal channel, i.e., $h(\tau,v)=\delta(\tau)\delta(v)$. In this case by direct substitution we get the convolution relationship $$Y[n, m] = \sum_{m'=-M/2}^{M/2-1} \sum_{n'=0}^{N-1} X[n', m'] A_{g_r, g_{tr}}((n-n')T, (m-m')\Delta f) + V[m, n] \quad (26)$$

In order to simplify Eq. (26) we will use the orthogonality properties of the ambiguity function. Since we use a different transmit and receive pulses we will modify the orthogonality condition on the design of the transmit pulse we stated in (9) to a bi-orthogonality condition $$< g_{tr}(t),$$
$$g_r(t-nT)e^{j2\pi m\Delta f(t-nT)} >= \int g_{tr}^*(t)g_r(t-nT)e^{j2\pi m\Delta f(t-nT)}dt = \delta(m)\delta(n) \quad (27)$$

Under this condition, only one term survives in (26) and we obtain $$Y[n,m]=X[n,m]+V[n,m] \quad (28)$$

where $V[n,m]$ is the additive white noise. Eq. (28) shows that the matched filter output does recover the transmitted symbols (plus noise) under ideal channel conditions. Of more interest of course is the case of non-ideal time varying channel effects. We next show that even in this case, the channel orthogonalization is maintained (no intersymbol or intercarrier interference), while the channel complex gain distortion has a closed form expression.

The following theorem summarizes the result as a generalization of (28).

Theorem 2: (End-to-end time-frequency domain channel equation):

If $h(\tau,v)$ has finite support bounded by $(\tau_{max}, v_{max})$ and if $A_{g_r,g_{tr}}(\tau,v)=0$ for $\tau \in (nT-\tau_{max}, nT+\tau_{max})$, $v \in (m\Delta f-v_{max}, m\Delta f+v_{max})$, that is, the ambiguity function bi-orthogonality property of (27) is true in a neighborhood of each grid point $(m\Delta f, nT)$ of the lattice $\Lambda$ at least as large as the support of the channel response $h(\tau,v)$, then the following equation holds $$Y[n,m]=H[n,m]X[n,m]$$

$$H[n,m]=\iint h(\tau,v)e^{j2\pi vnT}e^{-j2\pi(v+m\Delta f)\tau}dvd\tau \quad (29)$$

If the ambiguity function is only approximately bi-orthogonal in the neighborhood of $\Lambda$ (by continuity), then (29) is only approximately true.

Proof: See Appendix 0.

Eq. (29) is a fundamental equation that describes the channel behavior in the time-frequency domain. It is the basis for understanding the nature of the channel and its variations along the time and frequency dimensions.

Some observations are now in order on Eq. (29). As mentioned before, there is no interference across $X[n,m]$ in either time n or frequency m.

The end-to-end channel distortion in the modulation domain is a (complex) scalar that needs to be equalized If there is no Doppler, i.e. $h(\tau,v)=h(\tau,0)\delta(v)$, then Eq. (29) becomes $$Y[n, m] = X[n, m] \int h(\tau, 0)e^{-j2\pi m\Delta f \tau}d\tau \quad (30)$$
$$= X[n, m]H(0, m\Delta f)$$

which is the well-known multicarrier result, that each subcarrier symbol is multiplied by the frequency response of the time invariant channel evaluated at the frequency of that subcarrier.

If there is no multipath, i.e. $h(\tau,v)=h(0,v)\delta(\tau)$, then Eq. (29) becomes $$Y[n,m]=X[n,m]\int h(v,0)e^{j2\pi vnT}d\tau \quad (31)$$

Notice that the fading each subcarrier experiences as a function of time nT has a complicated expression as a weighted superposition of exponentials. This is a major complication in the design of wireless systems with mobility like LTE; it necessitates the transmission of pilots and the continuous tracking of the channel, which becomes more difficult the higher the vehicle speed or Doppler bandwidth is.

We close this section with some examples of this general framework.

Figure 6:
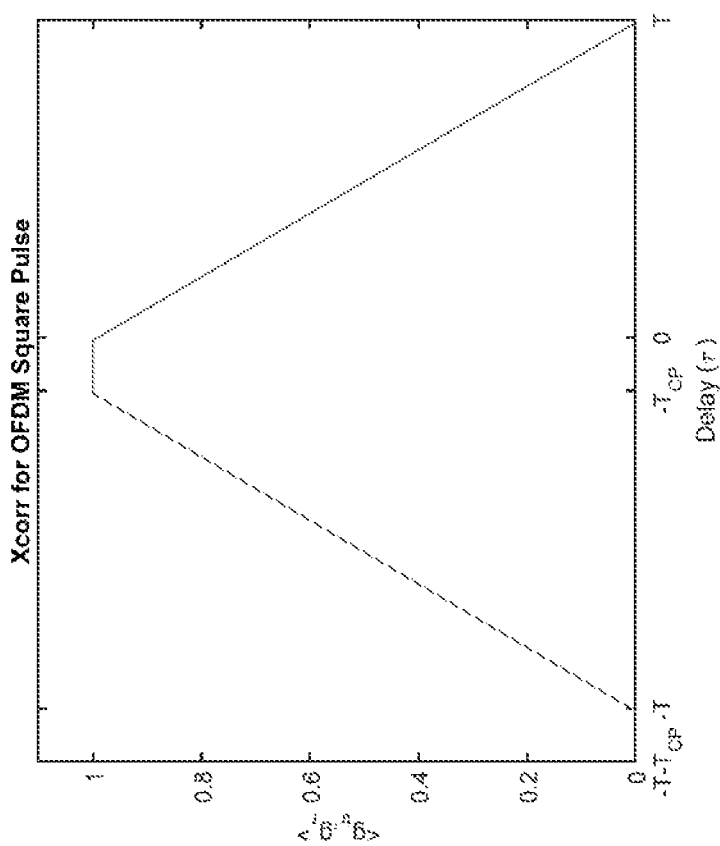
FIG. 6 shows an example of cross-correlation between $g_{tr}(t)$ and $g_r(t)$ for OFDM Systems.

Example 3: (OFDM modulation). In this case the fundamental transmit pulse is given by (13) and the fundamental receive pulse is $$g_r(t) = \begin{cases} 0 & -T_{CP} < t < 0 \\ \frac{1}{\sqrt{T-T_{CP}}} & 0 < t < T - T_{CP} \\ 0 & \text{else} \end{cases} \quad (32)$$

i.e., the receiver zeroes out the CP samples and applies a square window to the symbols comprising the OFDM symbol. It is worth noting that in this case, the bi-orthogonality property holds exactly along the time dimension. FIG. 6 shows the cross correlation between the transmit and receive pulses of (13) and (32). Notice that the cross correlation is exactly equal to one and zero in the vicinity of zero and ±T respectively, while holding those values for the duration of $T_{CP}$. Hence, as long as the support of the channel on the time dimension is less than $T_{CP}$ the bi-orthogonality condition is satisfied along the time dimension. Across the frequency dimension the condition is only approximate, as the ambiguity takes the form of a sinc function as a function of frequency and the nulls are not identically zero for the whole support of the Doppler spread.

Example 4: (MCFB modulation). In the case of multicarrier filter banks $g_{tr}(t)=g_r(t)=g(t)$. There are several designs for the fundamental pulse g(t). A square root raised cosine pulse provides good localization along the frequency dimension at the expense of less localization along the time dimension. If T is much larger than the support of the channel in the time dimension, then each subchannel sees a flat channel and the bi-orthogonality property holds approximately.

In summary, in this section we described the one of the two transforms that define OTFS. We explained how the transmitter and receiver apply appropriate operators on the fundamental transmit and receive pulses and orthogonalize the channel according to Eq. (29). We further saw via examples how the choice of the fundamental pulse affect the time and frequency localization of the transmitted modulation symbols and the quality of the channel orthogonalization that is achieved. However, Eq. (29) shows that the channel in this domain, while free of intersymbol interference, suffers from fading across both the time and the frequency dimensions via a complicated superposition of linear phase factors.

In the next section we will start from Eq. (29) and describe the second transform that defines OTFS; we will show how that transform defines an information domain where the channel does not fade in either dimension.

3.3 The 2D OTFS Transform

Notice that the time-frequency response H[n,m] in (29) is related to the channel delay-Doppler response h(τ,v) by an expression that resembles a Fourier transform. However, there are two important differences: (i) the transform is two dimensional (along delay and Doppler) and (ii) the exponentials defining the transforms for the two dimensions have opposing signs. Despite these difficulties, Eq. (29) points in the direction of using complex exponentials as basis functions on which to modulate the information symbols; and only transmit on the time-frequency domain the superposition of those modulated complex exponential bases. This is the approach we will pursue in this section.

This is akin to the SC-FDMA modulation scheme, where in the frequency domain we transmit a superposition of modulated exponentials (the output of the DFT preprocessing block). The reason we pursue this direction is to exploit Fourier transform properties and translate a multiplicative channel in one Fourier domain to a convolution channel in the other Fourier domain.

Given the difficulties of Eq. (29) mentioned above we need to develop a suitable version of Fourier transform and associated sampling theory results. Let us start with the following definitions:

Definition 1: Symplectic Discrete Fourier Transform: Given a square summable two dimensional sequence X[m, n]∈ℂ (Λ) we define $$x(\tau, v) = \sum_{m,n} X[n, m]e^{-j2\pi(vnT - \tau m\Delta f)} \tag{33}$$
$$\triangleq SDFT(X[n, m])$$

Notice that the above 2D Fourier transform (known as the Symplectic Discrete Fourier Transform in the math community) differs from the more well known Cartesian Fourier transform in that the exponential functions across each of the two dimensions have opposing signs. This is necessary in this case, as it matches the behavior of the channel equation.

Further notice that the resulting x(τ,v) is periodic with periods (1/Δf, 1/T). This transform defines a new two dimensional plane, which we will call the delay-Doppler plane, and which can represent a max delay of 1/Δf and a max Doppler of 1/T. A one dimensional periodic function is also called a function on a circle, while a 2D periodic function is called a function on a torus (or donut). In this case x(τ,v) is defined on a torus Z with circumferences (dimensions) (1/Δf, 1/T).

The periodicity of x(τ,v) (or sampling rate of the time-frequency plane) also defines a lattice on the delay-Doppler plane, which we will call the reciprocal lattice $$\Lambda^\perp = \left\{\left(m\frac{1}{\Delta f}, n\frac{1}{T}\right), n, m \in \mathbb{Z}\right\} \tag{34}$$

The points on the reciprocal lattice have the property of making the exponent in (33), an integer multiple of 2π.

The inverse transform is given by:

$$X[n,m] = \frac{1}{c}\int_0^{\frac{1}{\Delta f}}\int_0^{\frac{1}{T}} x(\tau, v)e^{j2\pi(vnT - \tau m\Delta f)}dv d\tau \triangleq SDFT^{-1}(x, (\tau, v)) \tag{35}$$

where c=TΔf.

We next define a sampled version of x(τ,v). In particular, we wish to take M samples on the delay dimension (spaced at 1/MΔf) and N samples on the Doppler dimension (spaced at 1/NT). More formally we define a denser version of the reciprocal lattice $$\Lambda_0^\perp = \left\{\left(m\frac{1}{M\Delta f}, n\frac{1}{NT}\right), n, m \in \mathbb{Z}\right\} \tag{36}$$

So that $\Lambda^\perp \subseteq \Lambda_0^\perp$. We define discrete periodic functions on this dense lattice with period (1/Δf, 1/T), or equivalently we define functions on a discrete torus with these dimensions $$Z_0^\perp = \left\{\left(m\frac{1}{M\Delta f}, n\frac{1}{NT}\right), m=0,\ldots,M-1, n=0,\ldots N-1,\right\} \tag{37}$$

These functions are related via Fourier transform relationships to discrete periodic functions on the lattice Λ, or equivalently, functions on the discrete torus $$Z_0 = \{(nT, m\Delta f), m=0,\ldots,M-1, n=0,\ldots N-1,\} \tag{38}$$

We wish to develop an expression for sampling Eq. (33) on the lattice of (37). First, we start with the following definition.

Definition 2: Symplectic Finite Fourier Transform: If $X_p[k,l]$ is periodic with period (N,M), then we define $$x_p[m,n] = \sum_{k=0}^{N-1}\sum_{l=-\frac{M}{2}}^{\frac{M}{2}-1} X_p[k,l]e^{-j2\pi\left(\frac{nk}{N} - \frac{ml}{M}\right)} \tag{39}$$
$$\triangleq SFFT(X[k,l])$$

Notice that $x_p[m,n]$ is also periodic with period [M,N] or equivalently, it is defined on the discrete torus $Z_0^\perp$. Formally, the SFFT(X[n,m]) is a linear transformation from $\mathbb{C}(Z_0) \to \mathbb{C}(Z_0^\perp)$.

Let us now consider generating $x_p[m,n]$ as a sampled version of (33), i.e., $$x_p[m,n] = x[m,n] = x(\tau,\nu)|_{\tau=\frac{m}{M\Delta f}, \nu=\frac{n}{NT}}.$$

Then we can show that (39) still holds where $X_p[m,n]$ is a periodization of X[n,m] with period (N,M)

$$X_p[n,m] = \sum_{l,k=-\infty}^{\infty} X[n-kN, m-lM] \qquad (40)$$

This is similar to the well-known result that sampling in one Fourier domain creates aliasing in the other domain.

The inverse discrete (symplectic) Fourier transform is given by $$X_p[n,m] = \frac{1}{MN} \sum_{l,k} x[l,k] e^{j2\pi\left(\frac{nk}{N} - \frac{ml}{M}\right)} \qquad (41)$$

$$\triangleq SFFT^{-1}(x[l,k])$$

where l=0, . . . ,M−1, k=0, . . . , N−1. If the support of X[n,m] is time-frequency limited to $Z_0$ (no aliasing in (40)), then $X_p[n,m]=X[n,m]$ for n,m∈$Z_0$, and the inverse transform (41) recovers the original signal.

In the math community, the SDFT is called "discrete" because it represents a signal using a discrete set of exponentials, while the SFFT is called "finite" because it represents a signal using a finite set of exponentials.

Arguably the most important property of the symplectic Fourier transform is that it transforms a multiplicative channel effect in one domain to a circular convolution effect in the transformed domain. This is summarized in the following proposition:

Proposition 2: Let $X_1[n,m] \in \mathbb{C}(Z_0)$, $X_2[n,m] \in \mathbb{C}(Z_0)$ be periodic 2D sequences. Then $$SFFT(X_1[n,m]*X_2[n,m])=SFFT(X_1[n,m]) \cdot SFFT(X_2[n,m]) \qquad (42)$$

where * denotes two dimensional circular convolution.
Proof: See Appendix 0.

With this framework established we are ready to define the OTFS modulation.

Discrete OTFS Modulation: Consider a set of NM QAM information symbols arranged on a 2D grid x[l,k], k=0, . . . , N−1, l=0, . . . , M−1 we wish to transmit. We will consider x[l,k] to be two dimensional periodic with period [N,M]. Further, assume a multicarrier modulation system defined by A lattice on the time frequency plane, that is a sampling of the time axis with sampling period T and the frequency axis with sampling period $\Delta f$ (c.f. Eq. (8)).

A packet burst with total duration NT secs and total bandwidth $M\Delta f$ Hz.

Transmit and receive pulses $g_{tr}(t)$, $g_{tr}(t) \in L_2(\mathbb{R})$ satisfying the bi-orthogonality property of (27).

A transmit windowing square summable function $W_{tr}[n,m] \in \mathbb{C}(\Lambda)$ multiplying the modulation symbols in the time-frequency domain A set of modulation symbols X[n,m], n=0, . . . , N−1, m=0, . . . , M−1 related to the information symbols x[k,l] by a set of basis functions $b_{k,l}[n,m]$ $$X[n,m] = \frac{1}{MN} W_{tr}[n,m] \sum_{k=0}^{N-1} \sum_{l=0}^{M-1} x[l,k] b_{k,l}[n,m] \qquad (43)$$

$$b_{k,l}[n,m] = e^{j2\pi\left(\frac{ml}{M} - \frac{nk}{N}\right)}$$

where the basis functions $b_{k,l}[n,m]$ are related to the inverse symplectic Fourier transform (c.f., Eq. (41))

Given the above components, we define the discrete OTFS modulation via the following two steps $$X[n,m]=W_{tr}[n,m]SFFT^{-1}(x[k,l])$$

$$s(t)=\Pi_X(g_{tr}(t)) \qquad (44)$$

The first equation in (44) describes the OTFS transform, which combines an inverse symplectic transform with a widowing operation. The second equation describes the transmission of the modulation symbols X[n,m] via a Heisenberg transform of $g_{tr}(t)$ parameterized by X[n,m]. More explicit formulas for the modulation steps are given by Equations (41) and (10).

While the expression of the OTFS modulation via the symplectic Fourier transform reveals important properties, it is easier to understand the modulation via Eq. (43), that is, transmitting each information symbol x[k,l] by modulating a 2D basis function $b_{k,l}[n,m]$ on the time-frequency plane.

Figure 7:
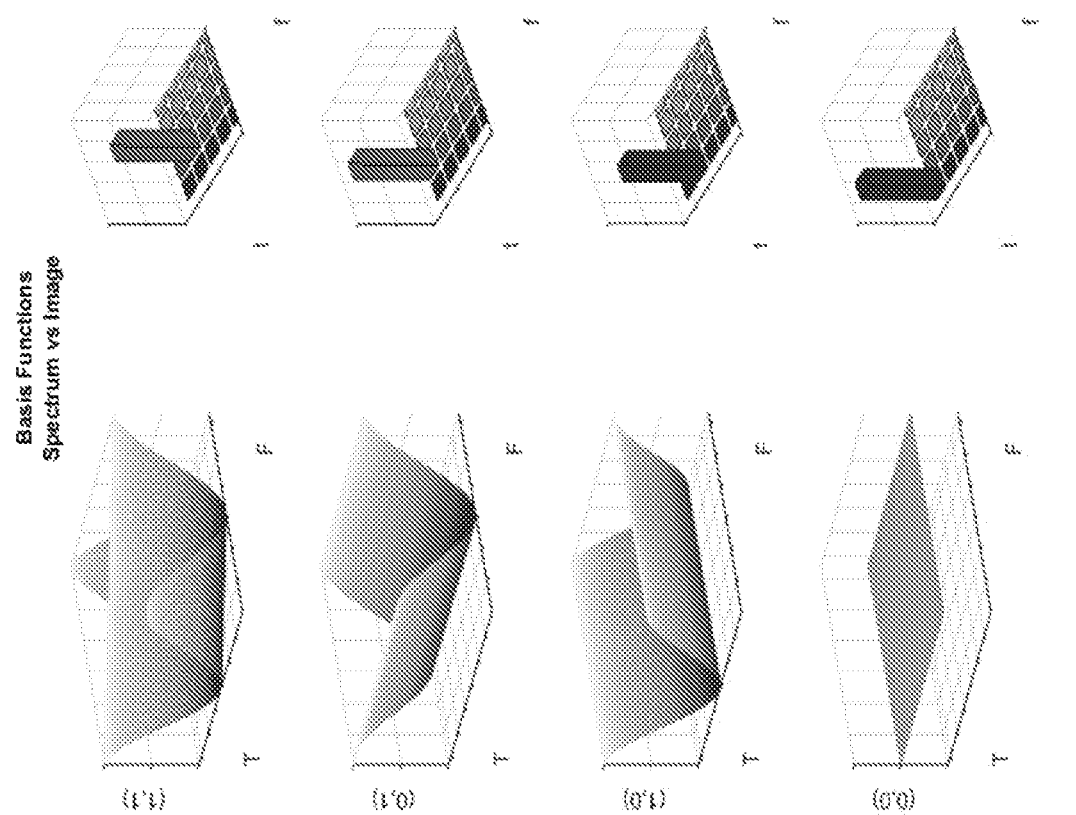
FIG. 7 shows an example of Information Symbols in the Information (Delay-Doppler) Domain (Right), and Corresponding Basis Functions in the Time-Frequency Domain (Left).

FIG. 7 visualizes this interpretation by isolating each symbol in the information domain and showing its contribution to the time-frequency modulation domain. Of course the transmitted signal is the superposition of all the symbols on the right (in the information domain) or all the basis functions on the left (in the modulation domain).

FIG. 7 uses the trivial window $W_{tr}[n,m]=1$ for all n=0, . . ., N−1, $$m = -\frac{M}{2}, \ldots \frac{M}{2} - 1$$

and zero else. This may seem superfluous but there is a technical reason for this window: recall that $SFFT^{-1}(x[k,l])$ is a periodic sequence that extends to infinite time and bandwidth. By applying the window we limit the modulation symbols to the available finite time and bandwidth. The window in general could extend beyond the period of the information symbols [M,N] and could have a shape different from a rectangular pulse. This would be akin to adding cyclic prefix/suffix in the dimensions of both time and frequency with or without shaping. The choice of window has implications on the shape and resolution of the channel response in the information domain as we will discuss later. It also has implications on the receiver processing as the potential cyclic prefix/suffix has to either be removed or otherwise handled as we see next.

Discrete OTFS Demodulation: Let us assume that the transmitted signal s(t) undergoes channel distortion according to (7), (2) yielding r(t) at the receiver. Further, let the receiver employ a receive windowing square summable function $W_r[n,m]$. Then, the demodulation operation consists of the following steps:

Matched filtering with the receive pulse, or more formally, evaluating the ambiguity function on Λ (Wigner transform) to obtain estimates of the time-frequency modulation symbols $$Y[n,m]=A_{g_r,y}(\tau,v)|_{\tau=nT,v=m\Delta f} \qquad (45)$$

windowing and periodization of Y [n,m]

$$Y_w[n, m] = W_r[n, m]Y[n, m] \qquad (46)$$

$$Y_p[n, m] = \sum_{k,l=-\infty}^{\infty} Y_w[n - kN, m - lM]$$

and applying the symplectic Fourier transform on the periodic sequence $Y_p[n,m]$ $$\hat{x}[l,k]=y[l,k]=\text{SFFT}(Y_p[n,m]) \qquad (47)$$

The first step of the demodulation operation can be interpreted as a matched filtering operation on the time-frequency domain as we discussed earlier. The second step is there to ensure that the input to the SFFT is a periodic sequence. If the trivial window is used, this step can be skipped. The third step can also be interpreted as a projection of the time-frequency modulation symbols on the orthogonal basis functions $$\hat{x}[l, k] = \sum_{m=0}^{M-1} \sum_{n=0}^{N-1} \hat{X}(n, m) b_{k,l}^*(n, m) \qquad (48)$$

$$b_{k,l}^*(n, m) = e^{-j2\pi\left(\frac{lm}{L}-\frac{kn}{K}\right)}$$

The discrete OTFS modulation defined above points to efficient implementation via discrete-and-periodic FFT type processing. However, it does not provide insight into the time and bandwidth resolution of these operations in the context of two dimensional Fourier sampling theory. We next introduce the continouse OTFS modulation and relate the more practical discrete OTFS as a sampled version of the continuous modulation.

Continuous OTFS Modulation: Consider a two dimensional periodic function $x(\tau,v)$ with period $[1/\Delta f, 1/T]$ we wish to transmit; the choice of the period may seem arbitrary at this point, but it will become clear after the discussion in the next section. Further, assume a multicarrier modulation system defined by A lattice on the time frequency plane, that is a sampling of the time axis with sampling period T and the frequency axis with sampling period $\Delta f$ (c.f. Eq. (8)).

Transmit and receive pulses $g_{tr}(t), g_{tr}(t) \in L_2(\mathbb{R})$ satisfying the bi-orthogonality property of (27)

A transmit windowing function $W_{tr}[n,m] \in \mathbb{C}(\Lambda)$ multiplying the modulation symbols in the time-frequency domain Given the above components, we define the continuous OTFS modulation via the following two steps $$X[n,m]=W_{tr}[n,m]\text{SDFT}^{-1}(x(\tau,v)) \qquad$$

$$s(t)=\Pi_X(g_{tr}(t)) \qquad (49)$$

The first equation describes the inverse discrete time-frequency symplectic Fourier transform [c.f. Eq. (35)] and the windowing function, while the second equation describes the transmission of the modulation symbols via a Heisenberg transform [c.f. Eq. (10)].

Continuous OTFS Demodulation: Let us assume that the transmitted signal s(t) undergoes channel distortion according to (7), (2) yielding r(t) at the receiver. Further, let the receiver employ a receive windowing function $W_r[n,m] \in \mathbb{C}(\Lambda)$. Then, the demodulation operation consists of two steps:

Evaluating the ambiguity function on Λ (Wigner transform) to obtain estimates of the time-frequency modulation symbols $$Y[n,m]=A_{g_r,y}(\tau,v)|_{\tau=nT,v=m\Delta f} \qquad (50)$$

Windowing and applying the symplectic Fourier transform on the modulation symbols $$\hat{x}(\tau,v)=\text{SDFT}(W_r[n,m]Y[n,m]) \qquad (51)$$

Notice that in (50), (51) there is no periodization of Y[n,m], since the SDFT is defined on aperiodic square summable sequences. The periodization step needed in discrete OTFS can be understood as follows. Suppose we wish to recover the transmitted information symbols by performing a continuous OTFS demodulation and then sampling on the delay-Doppler grid $$\hat{x}(l, k) = \hat{x}(\tau, v)|_{\tau=\frac{m}{M\Delta f}, v=\frac{n}{NT}}$$

Since performing a continuous symplectic Fourier transform is not practical we consider whether the same result can be obtained using SFFT. The answer is that SFFT processing will produce exactly the samples we are looking for if the input sequence is first periodized (aliased)—see also (39) (40).

We have now described all the steps of the OTFS modulation as depicted in FIG. 3. We have also discussed how the Wigner transform at the receiver inverts the Heisenberg transform at the transmitter [c.f. Eqs. (26), (28)], and similarly for the forward and inverse symplectic Fourier transforms. The key question is what form the end-to-end signal relationship takes when a non-ideal channel is between the transmitter and receiver. The answer to this question is addressed next.

3.4 Channel Equation in the OTFS Domain

The main result in this section shows how the time varying channel in (2), (7), is transformed to a time invariant convolution channel in the delay Doppler domain.

Proposition 3: Consider a set of NM QAM information symbols arranged in a 2D periodic sequence x[l,k] with period [M,N]. The sequence x[k,l] undergoes the following transformations:

It is modulated using the discrete OTFS modulation of Eq. (44).

It is distorted by the delay-Doppler channel of Eqs.(2), (7).

It is demodulated by the discrete OTFS demodulation of Eqs. (45), (47).

The estimated sequence $\hat{x}[l,k]$ obtained after demodulation is given by the two dimensional periodic convolution $$\hat{x}[l, k] \simeq \frac{1}{MN}\sum_{m=0}^{M-1}\sum_{n=0}^{N-1} x[m, n] h_w\left(\frac{l-m}{M\Delta f}, \frac{k-n}{NT}\right) \qquad (52)$$

of the input QAM sequence x[m,n] and a sampled version of the windowed impulse response $h_w(\cdot)$, $$h_w\left(\frac{l-m}{M\Delta f}, \frac{k-n}{NT}\right) = h_w(\tau', v')\big|_{\tau' = \frac{l-m}{M\Delta f}, v' = \frac{k-n}{NT}} \quad (53)$$

where $h_w(\tau', v')$ denotes the circular convolution of the channel response with a windowing function[5]

[5]To be precise, in the window $w(\tau, v)$ is circularly convolved with a slightly modified version of the channel impulse response $e^{-j2\pi v \tau} h(\tau, v)$ (by a complex exponential) as can be seen in the equation.

$$h_w(\tau', v') = \iint e^{-j2\pi v \tau} h(\tau, v) w(\tau' - \tau, v' - v) d\tau dv \quad (54)$$

where the windowing function $w(\tau, v)$ is the symplectic Fourier transform of the time-frequency window $W[n,m]$ $$w(\tau, v) = \sum_{m=0}^{M-1} \sum_{n=0}^{N-1} W[n,m] e^{-j2\pi(vnT - \tau m \Delta f)} \quad (55)$$

and where $W[n,m]$ is the product of the transmit and receive window.

$$W[n,m] = W_{tr}[n,m] W_r[n,m] \quad (56)$$

Proof: See Appendix 0.

In many cases, the windows in the transmitter and receiver are matched, i.e., $W_{tr}[n,m] = W_0[n,m]$ and $W_r[n,m] = W_0^*[n,m]$, hence $W[n,m] = |W_0[n,m]|^2$.

The window effect is to produce a blurred version of the original channel with a resolution that depends on the span of the frequency and time samples available as will be discussed in the next section. If we consider the rectangular (or trivial) window, i.e., $W[n,m] = 1$, $n = 0, \ldots, N-1$, $m = -M/2, \ldots, M/2-1$ and zero else, then its SDFT $w(\tau, v)$ in (55) is the two dimensional Dirichlet kernel with bandwidth inversely proportional to N and M.

There are several other uses of the window function. The system can be designed with a window function aimed at randomizing the phases of the transmitted symbols, akin to how QAM symbol phases are randomized in WiFi and Multimedia-Over-Coax communication systems. This randomization may be more important for pilot symbols than data carrying symbols. For example, if neighboring cells use different window functions, the problem of pilot contamination is avoided.

A different use of the window is the ability to implement random access systems over OTFS using spread spectrum/CDMA type techniques as will be discussed later.

4. Channel Time/Frequency Coherence and OTFS Resolution

In this section we examine certain OTFS design issues, like the choice of data frame length, bandwidth, symbol length and number of subcarriers. We study the tradeoffs among these parameters and gain more insight on the capabilities of OTFS technology.

Since OTFS is based on Fourier representation theory similar spectral analysis concepts apply like frequency resolution vs Fourier transform length, sidelobes vs windowing shape etc. One difference that can be a source of confusion comes from the naming of the two Fourier transform domains in the current framework.

OTFS transforms the time-frequency domain to the delay-Doppler domain creating the Fourier pairs: (i) time⇔Doppler and (ii) frequency⇔delay. The "spectral" resolution of interest here therefore is either on the Doppler or on the delay dimensions.

Figure 8:
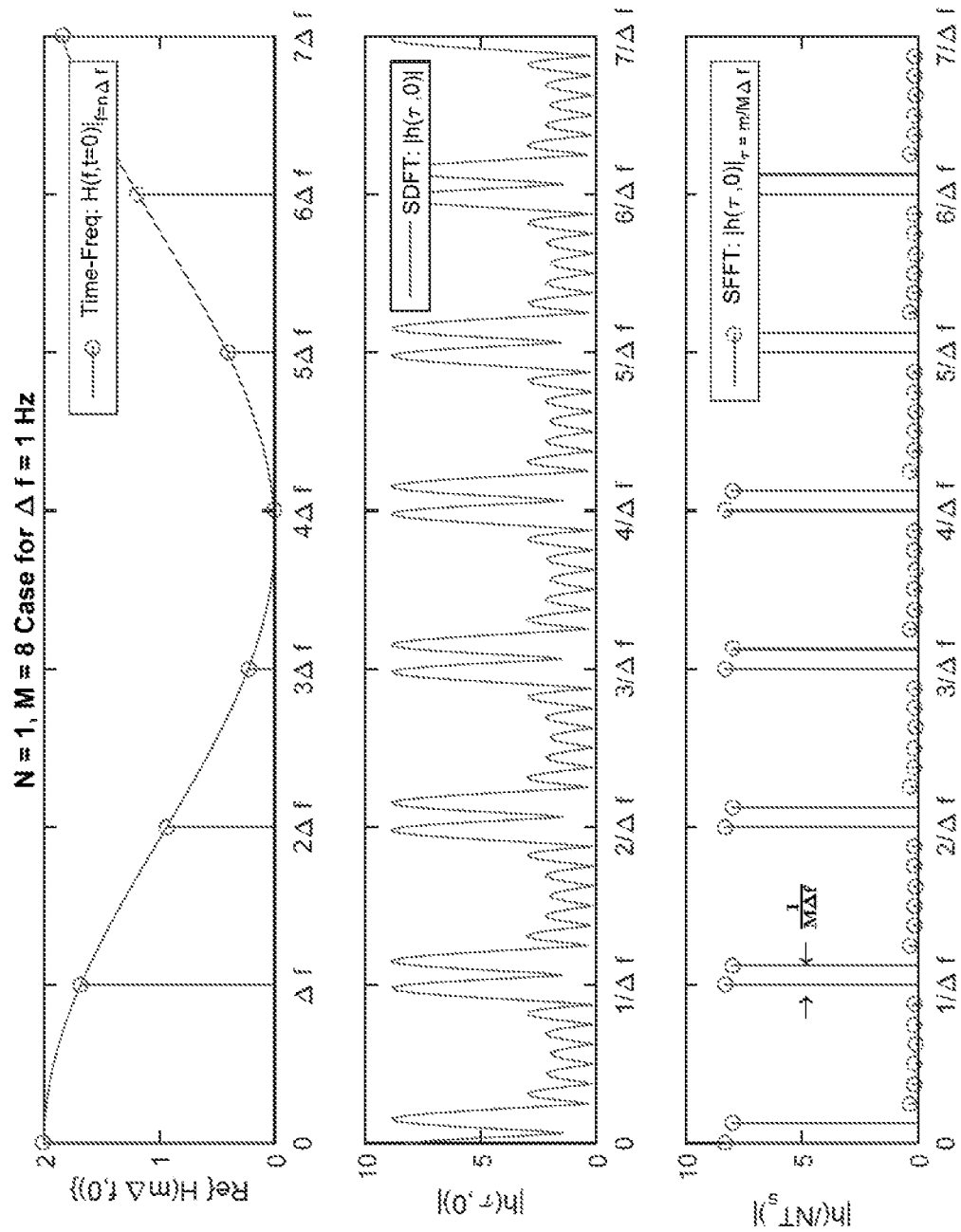
FIG. 8 shows a One Dimensional Multipath Channel Example: (i) Sampled Frequency Response at $\Delta f=1$ Hz (ii) Periodic Fourier Transform with Period $1/\Delta f=1$ sec (iii) Sampled Fourier Transform with Period $1/\Delta f$ and Resolution $1/M\Delta f$.

These issues can be easier clarified with an example. Let us consider a time-invariant multipath channel (zero Doppler) with frequency response $H(f,0)$ for all t. In the first plot of FIG. 8 we show the real part of $H(f,0)$ as well as a sampled version of it on a grid of M=8 subcarriers. The second plot of FIG. 8 shows the SDFT of the sampled $H(m\Delta f, 0)$, i.e., $h(\tau, 0)$ along the delay dimension. Notice that taking this frequency response to the "delay" domain reveals the structure of this multipath channel, that is, the existence of two reflectors with equal power in this example. Further, notice that the delay dimension of the SDFT is periodic with period $1/\Delta f$ as expected due to the nature of the discrete Fourier transform. Finally, in the third plot of FIG. 8 we show the SFFT of the frequency response, which as expected is a sampled version of the SDFT of the second plot. Notice that the SFFT has M=8 points in each period $1/\Delta f$ leading to a resolution in the delay domain of $1/M\Delta f = 1/BW$.

In the current example, the reflectors are separated by more than $1/M\Delta f$ and are resolvable. If they were not, then the system would experience a flat channel within the bandwidth of observation, and in the delay domain the two reflectors would have been blurred into one.

Figure 9:
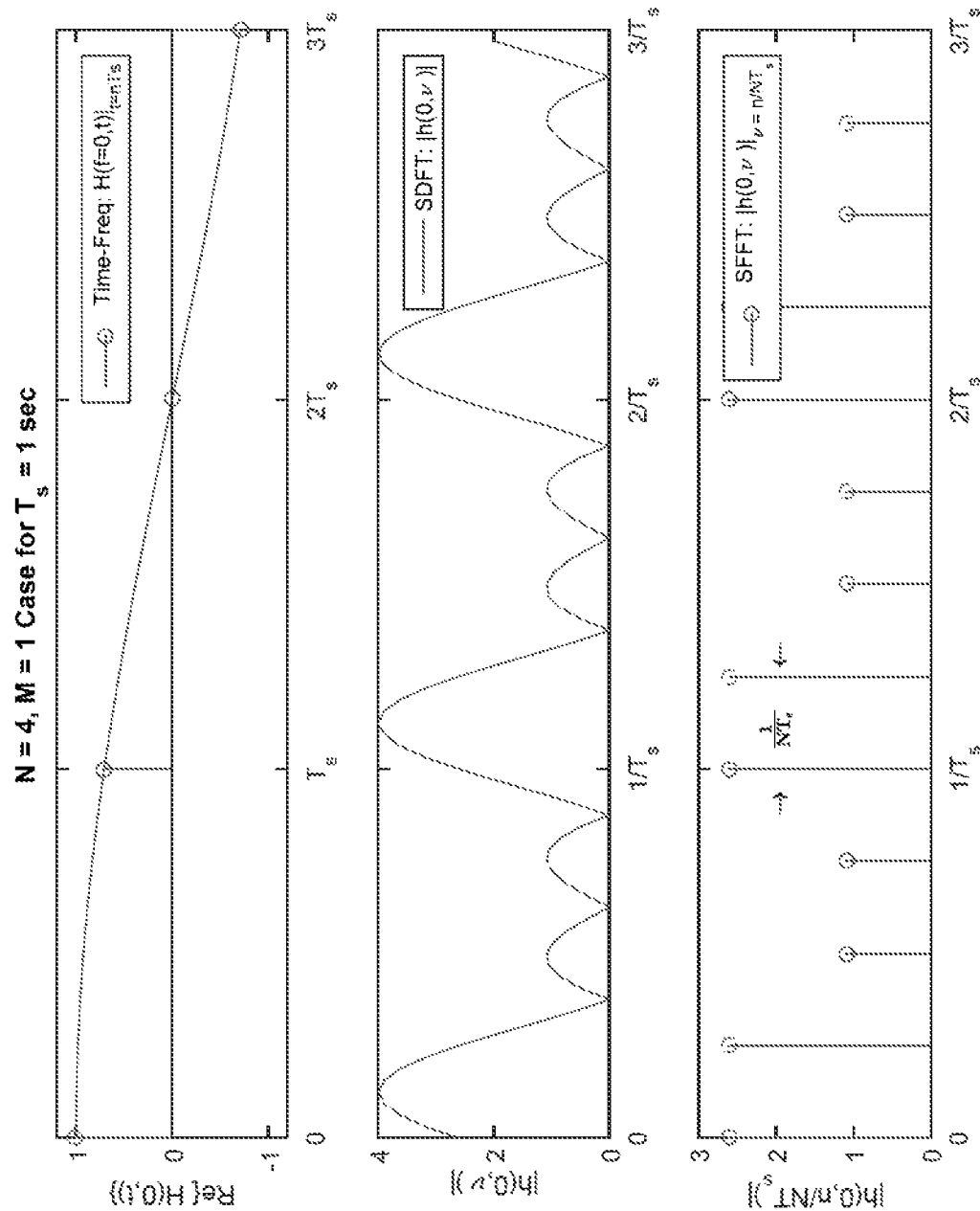
FIG. 9 shows a One Dimensional Doppler Channel Example: (i) Sampled Frequency Response at $T_s=1$ sec (ii) Periodic Fourier Transform with Period $1/T_s=1$ Hz (iii) Sampled Fourier Transform with Period $1/T_s$ and Resolution $1/NT_s$.

FIG. 9 shows similar results for a flat Doppler channel with time varying frequency response $H(0,t)$ for all $f$. The first plot shows the the response as a function of time, while the second plot shown the SDFT along the Doppler dimension. Finally the third plot shows the SFFT, that is the sampled version of the transform. Notice that the SDFT is periodic with period $1/T$ while the SFFT is periodic with period $1/T$ and has resolution of $1/NT$.

The conclusion one can draw from FIG. 9 is that as long as there is sufficient variability of the channel within the observation time NT, that is as long as reflectors have Doppler frequency difference larger than $1/NT$, the OTFS system will resolve these reflectors and will produce an equivalent channel in the delay-Doppler domain that is not fading. In other words, OTFS can take a channel that inherently has a coherence time of only T and produce an equivalent channel in the delay Doppler domain that has coherence time NT. This is an important property of OTFS as it can increase the coherence time of the channel by orders of magnitude and enable MIMO processing and beamforming under Doppler channel conditions.

Figure 10:
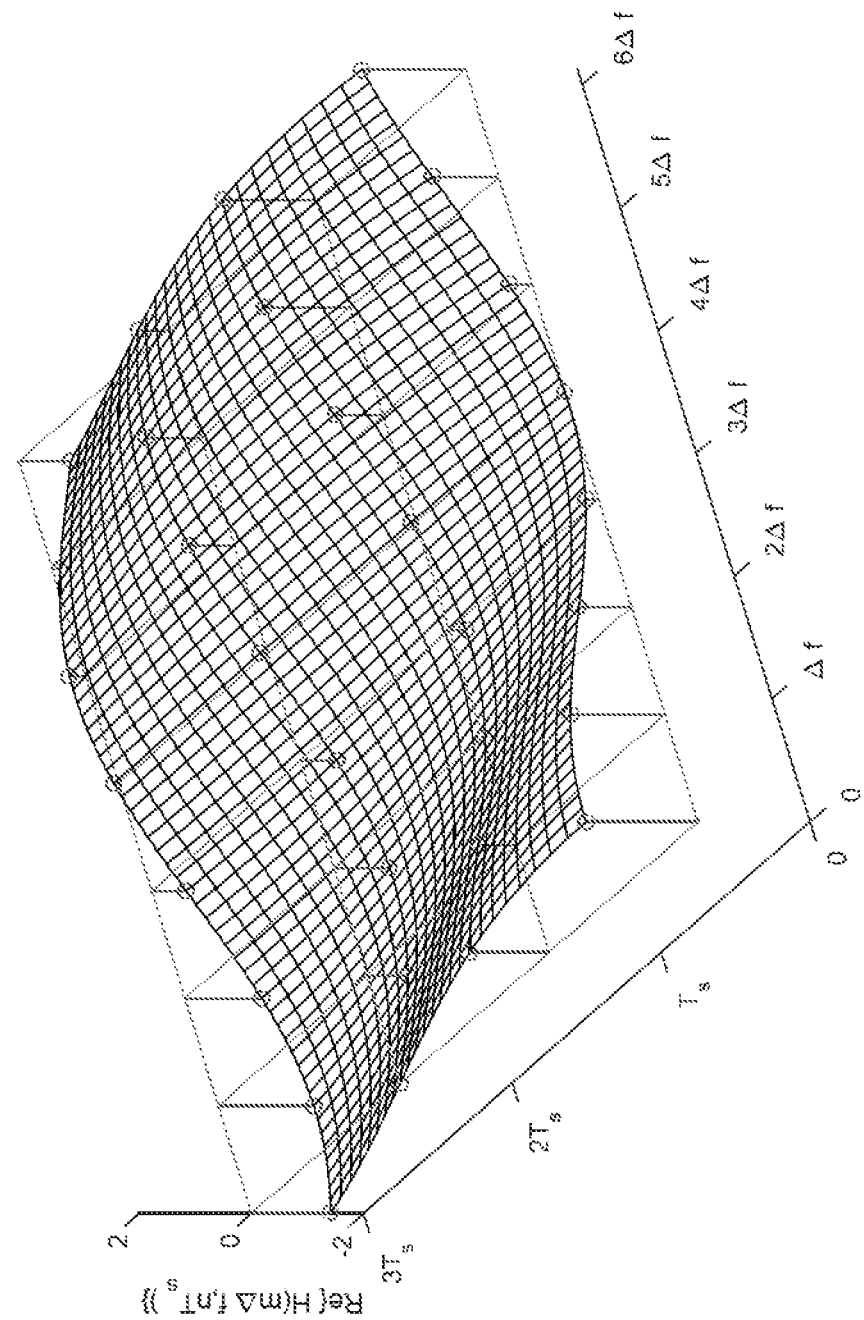
FIG. 10 depicts an example of a time-Varying Channel Response in the Time-Frequency Domain
Figure 11:
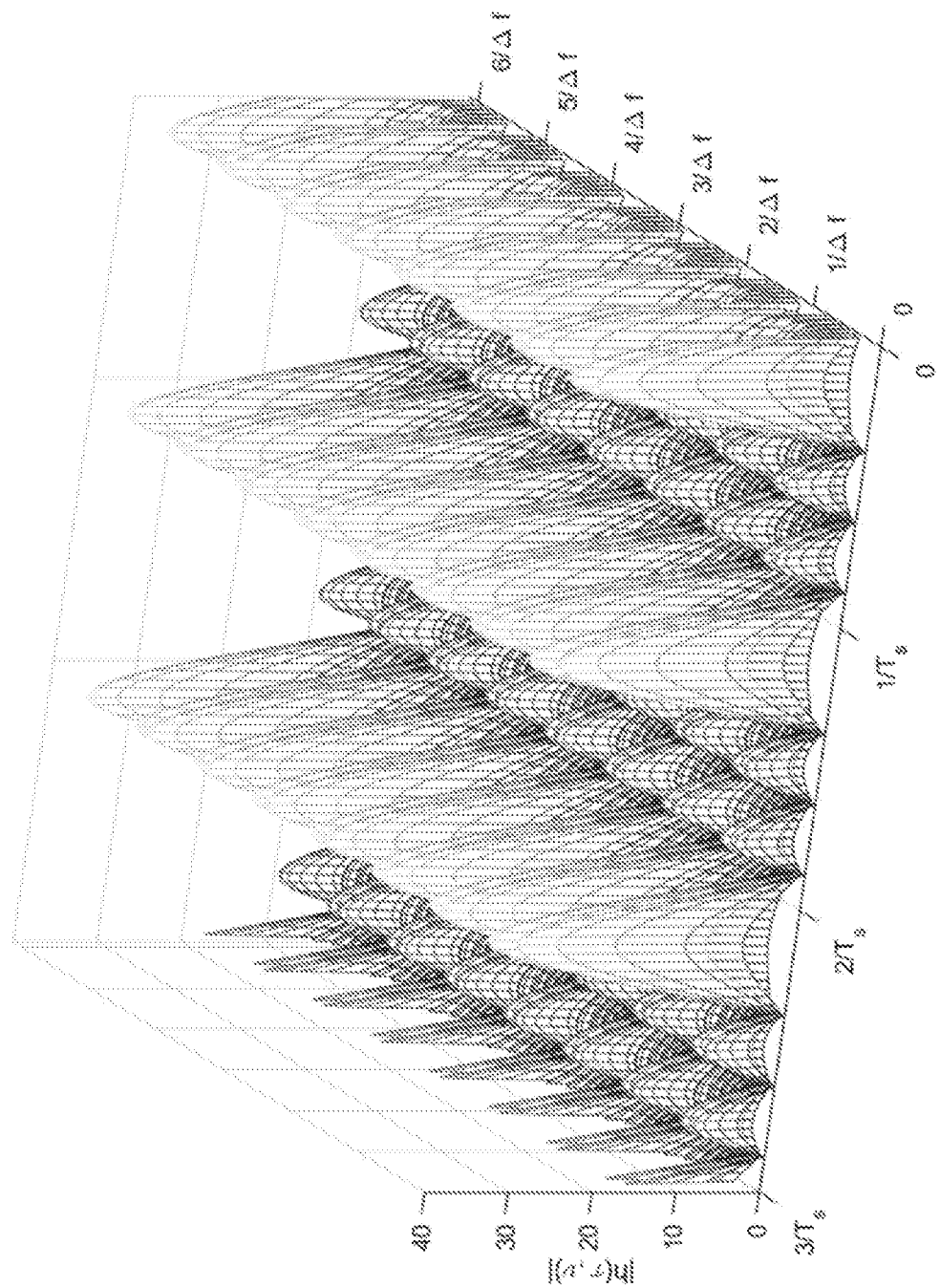
FIG. 11 depicts an example SDFT of Channel response—$(\tau,v)$ Delay-Doppler Domain.

The two one-dimensional channel examples we have examined are special cases of the more general two-dimensional channel of FIG. 10. The time-frequency response and its sampled version are shown in this figure, where the sampling period is $(T, \Delta f)$. FIG. 11 shows the SDFT of this sampled response which is periodic with period $(1/T, 1/\Delta f)$, across the Doppler and delay dimensions respectively.

Let us now examine the Nyquist sampling requirements for this channel response. $1/T$ is generally on the order of $\Delta f$ (for an OFDM system with zero length CP it is exactly $1/T = \Delta f$) so the period of the channel response in FIG. 11 is approximately $(\Delta f, T)$, and aliasing can be avoided as long as the support of the channel response is less than $\pm \Delta f/2$ in the Doppler dimension and $\pm T/2$ in the delay dimension.

Figure 12:
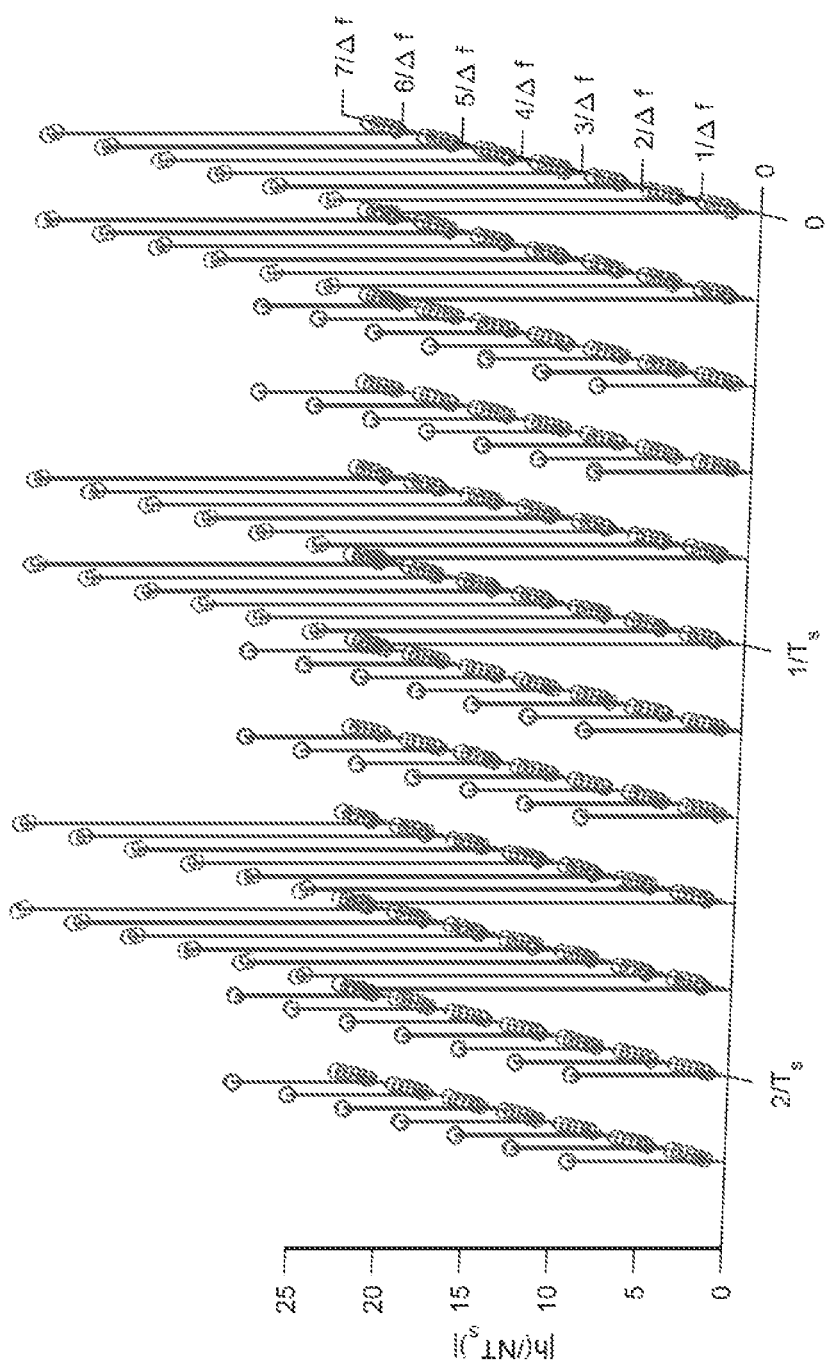
FIG. 12 depicts an example SFFT of Channel Response—Sampled $(\tau,v)$ Delay-Doppler Domain.

FIG. 12 shows the SFFT, that is, the sampled version of FIG. 11. The resolution of FIG. 11 is $1/NT, 1/M\Delta f$ across the Doppler and delay dimensions respectively.

Figure 13:
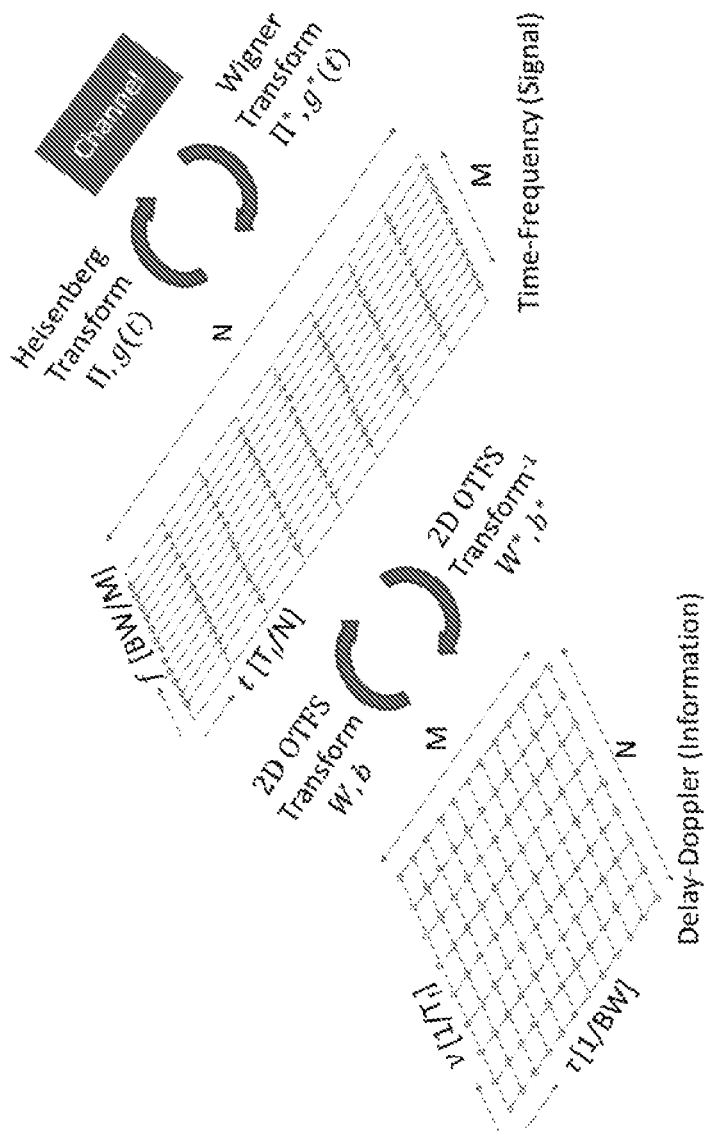
FIG. 13 depicts an example of Transformation of the Time-Frequency Plane to the Doppler-Delay Plane.

We summarize the sampling aspects of the OTFS modulation in FIG. 13. The OTFS modulation consists of two steps shown in this figure:

A Heisenberg transform translates a time-varying convolution channel in the waveform domain to an orthogonal but still time varying channel in the time frequency domain. For a total bandwidth BW and M subcarriers the frequency resolution is $\Delta f=BW/M$. For a total frame duration $T_f$ and N symbols the time resolution is $T=T_f/N$.

A SFFT transform translates the time-varying channel in the time-frequency domain to a time invariant one in the delay-Doppler domain. The Doppler resolution is $1/T_f$ and the delay resolution is $1/BW$.

The choice of window can provide a tradeoff between main lobe width (resolution) and side lobe suppression, as in classical spectral analysis.

5 Channel Estimation in the OTFS Domain

There is a variety of different ways a channel estimation scheme could be designed for an OTFS system, and a variety of different implementation options and details. In the section we will only present a high level summary and highlight the key concepts.

Figure 14:
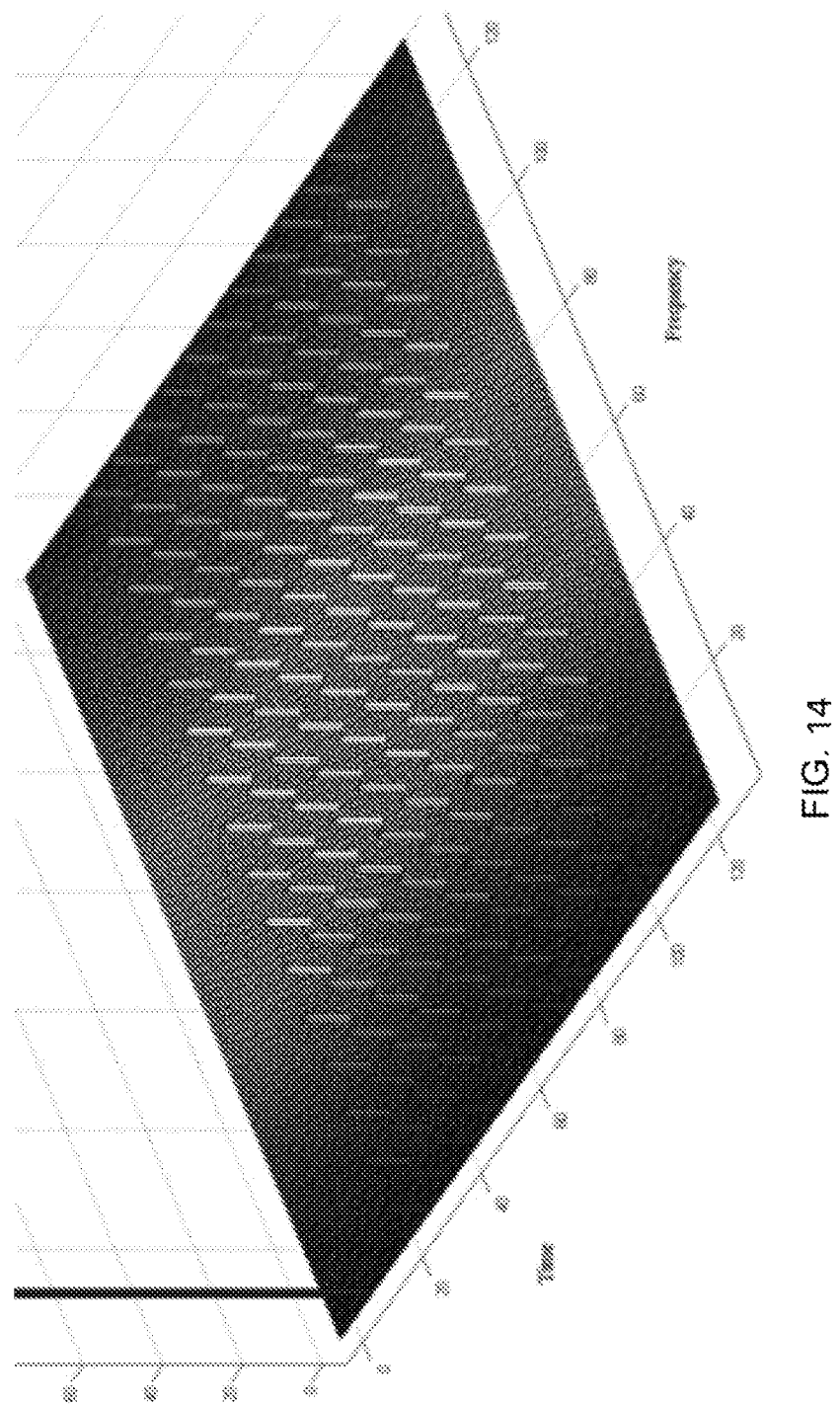
FIG. 14 depicts an example of a Discrete Impulse in the OTFS Domain Used for Channel Estimation.

A straightforward way to perform channel estimation entails transmitting a soudning OTFS frame containing a discrete delta function in the OTFS domain or equivalently a set of unmodulated carriers in the time frequency domain. From a practical standpoint, the carriers may be modulated with known, say BPSK, symbols which are removed at the receiver as is common in many OFDM systems. This approach could be considered an extension of the channel estimation symbols used in WiFi and Multimedia-Over-Coax modems. FIG. 14 shows an OTFS symbol containing such an impulse.

This approach may however be wasteful as the extend of the channel response is only a fraction of the full extend of the OTFS frame $(1/T, 1/\Delta f)$. For example, in LTE systems $1/T \approx 15$ KHz while the maximum Doppler shift $f_{d,max}$ is typically one to two orders of magnitude smaller. Similarly $1/\Delta f \approx 67$ usec, while maximum delay spread $\tau_{max}$ is again one to two orders of magnitude less. We therefore can have a much smaller region of the OTFS frame devoted to channel estimation while the rest of the frame carries useful data. More specifically, for a channel with support $(\pm f_{d,max}, \pm \tau_{max})$ we need an OTFS subframe of length $(2f_{d,max}/T, 2\tau_{max}/\Delta f)$.

In the case of multiuser transmission, each UE can have its own channel estimation subframe positioned in different parts of the OTFS frame. This is akin to multiplexing of multiple users when transmitting Uplink Sounding Reference Signals in LTE. The difference is that OTFS benefits from the virtuous effects of its two dimensional nature. For example, if $\tau_{max}$ is 5% of the extend of the delay dimension and $f_{d,max}$ is 5% of the Doppler dimension, the channel estimation subframe need only be 5%×5%=0.25% of the OTFS frame.

Notice that although the channel estimation symbols are limited to a small part of the OTFS frame, they actually sound the whole time-frequency domain via the corresponding basis functions associated with these symbols.

A different approach to channel estimation is to devote pilot symbols on a subgrid in the time-frequency domain. This is akin to CRS pilots in downlink LTE subframes. The key question in this approach is the determination of the density of pilots that is sufficient for channel estimation without introducing aliasing. Assume that the pilots occupy the subgrid $(n_0 T, m_0 \Delta f)$ for some integers $n_0, m_0$. Recall that for this grid the SDFT will be periodic with period $(1/n_0 T, 1/m_0 \Delta f)$. Then, applying the aliasing results discussed earlier to this grid, we obtain an alias free Nyquist channel support region of $(\pm f_{d,max}, \pm \tau_{max})=(\pm 1/2n_0 T, \pm 1/2m_0 \Delta f)$. The density of the pilots can then be determined from this relation given the maximum support of the channel. The pilot subgrid should extend to the whole time-frequency frame, so that the resolution of the channel is not compromised.

6 OTFS-Access: Multiplexing More than One User

There is a variety of ways to multiplex several uplink or downlink transmissions in one OTFS frame. This is a rich topic whose full treatment is outside the scope of this paper. Here we will briefly review the following multiplexing methods:

Multiplexing in the OTFS delay-Doppler domain
Multiplexing in the time-frequency domain
Multiplexing in the code spreading domain
Multiplexing in the spatial domain Multiplexing in the Delay-Doppler Domain: This is the most natural multiplexing scheme for downlink transmissions. Different sets of OTFS basis functions, or sets of information symbols or resource blocks are given to different users. Given the orthogonality of the basis functions, the users can be separated at the UE receiver. The UE need only demodulate the portion of the OTFS frame that is assigned to it.

Figure 15:
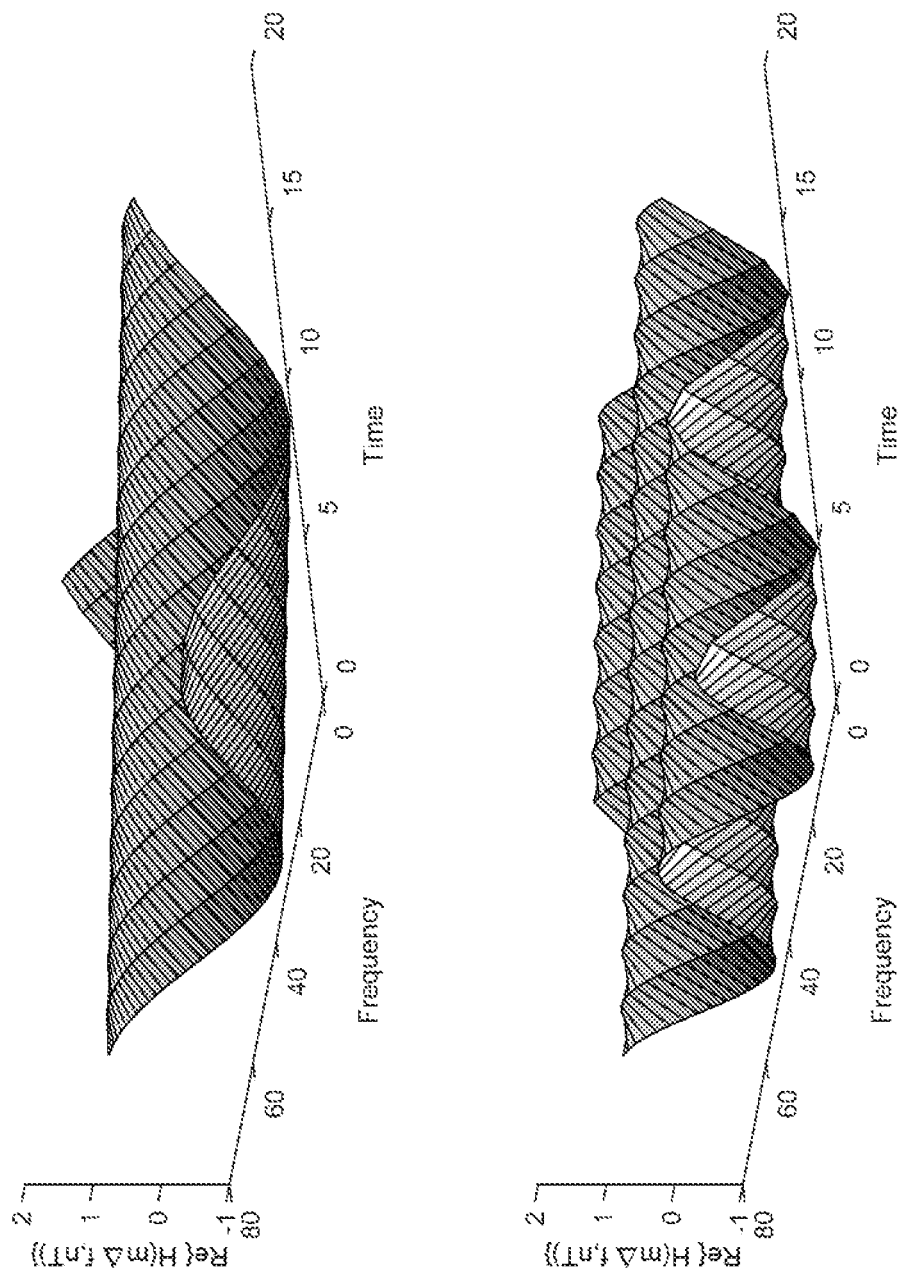
FIG. 15 shows an example of Different Basis Functions, Assigned to Different Users, Span the Whole Time-Frequency Frame.

This approach is similar to the allocation of PRBs to different UEs in LTE. One difference is that in OTFS, even a small subframe or resource block in the OTFS domain will be transmitted over the whole time-frequency frame via the basis functions and will experience the average channel response. FIG. 15 illustrates this point by showing two different basis functions belonging to different users. Because of this, there is no compromise on channel resolution for each user, regardless of the resource block or subframe size.

In the uplink direction, transmissions from different users experience different channel responses. Hence, the different subframes in the OTFS domain will experience a different convolution channel. This can potentially introduce inter-user interference at the edges where two user subframes are adjacent, and would require guard gaps to eliminate it. In order to avoid this overhead, a different multiplexing scheme can be used in the uplink as explained next.

Figure 16:
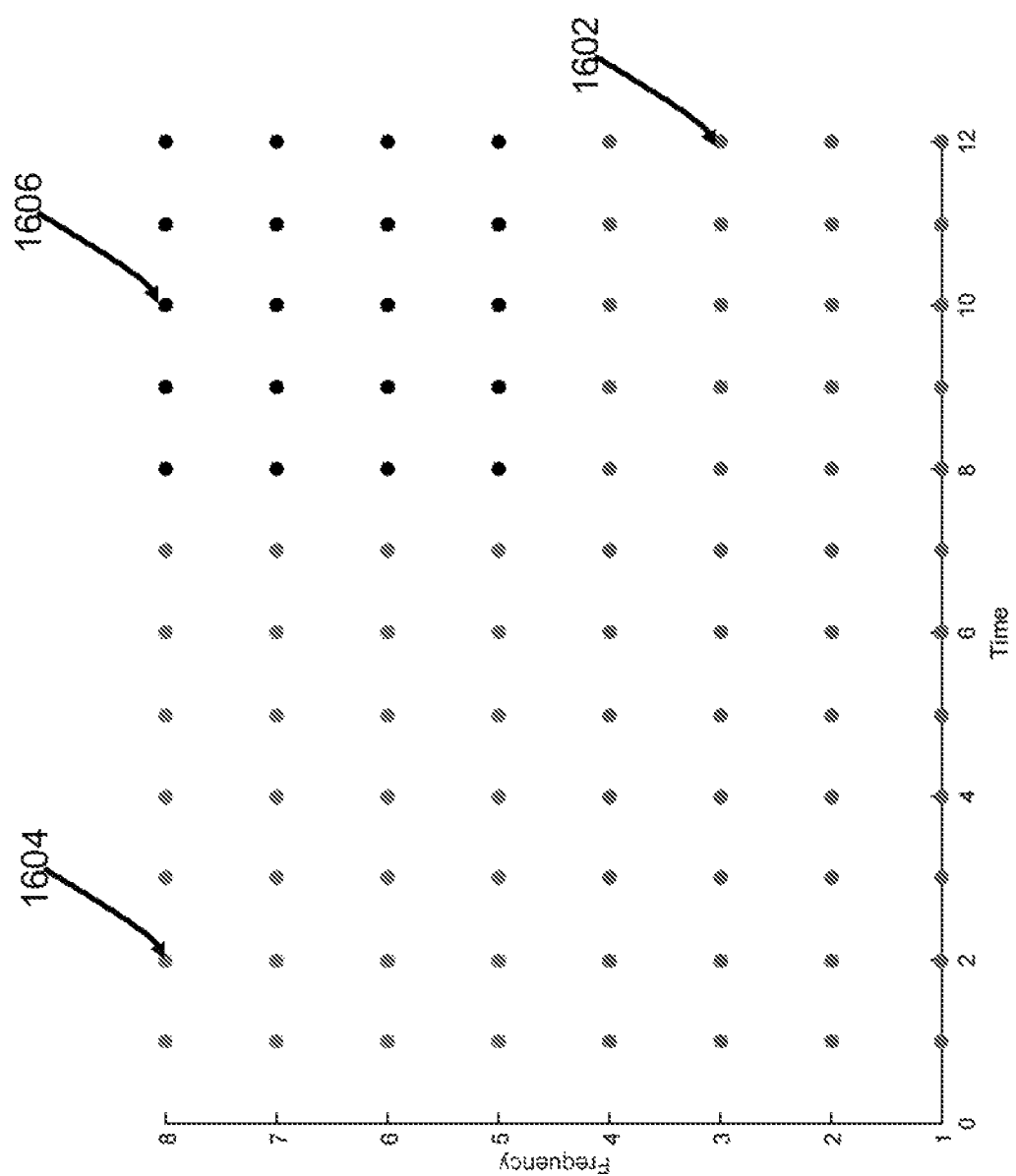
FIG. 16 shows an example embodiment of multiplexing three users in the Time-Frequency Domain.

Multiplexing in the Time-Frequency Domain: In this approach, resource blocks or subframes are allocated to different users in the time-frequency domain. FIG. 16 illustrates this for a three user case. In this figure, User 1 (blue, 1602) occupies the whole frame length but only half the available subcarriers. Users 2 and 3 (red, 1604, and black, 1606, respectively) occupy the other half subcarriers, and divide the total length of the frame between them.

Notice that in this case, each user employs a slightly different version of the OTFS modulation described in Section 3. One difference is that each user i performs an SFFT on a subframe $(N_i, M_i)$, $N_i \leq N$, $M_i \leq M$. This reduces the resolution of the channel, or in other words reduces the extent of the time-frequency plane in which each user will experience its channel variation. On the other side, this also gives the scheduler the opportunity to schedule users in parts of the time-frequency plane where their channel is best.

Figure 17:
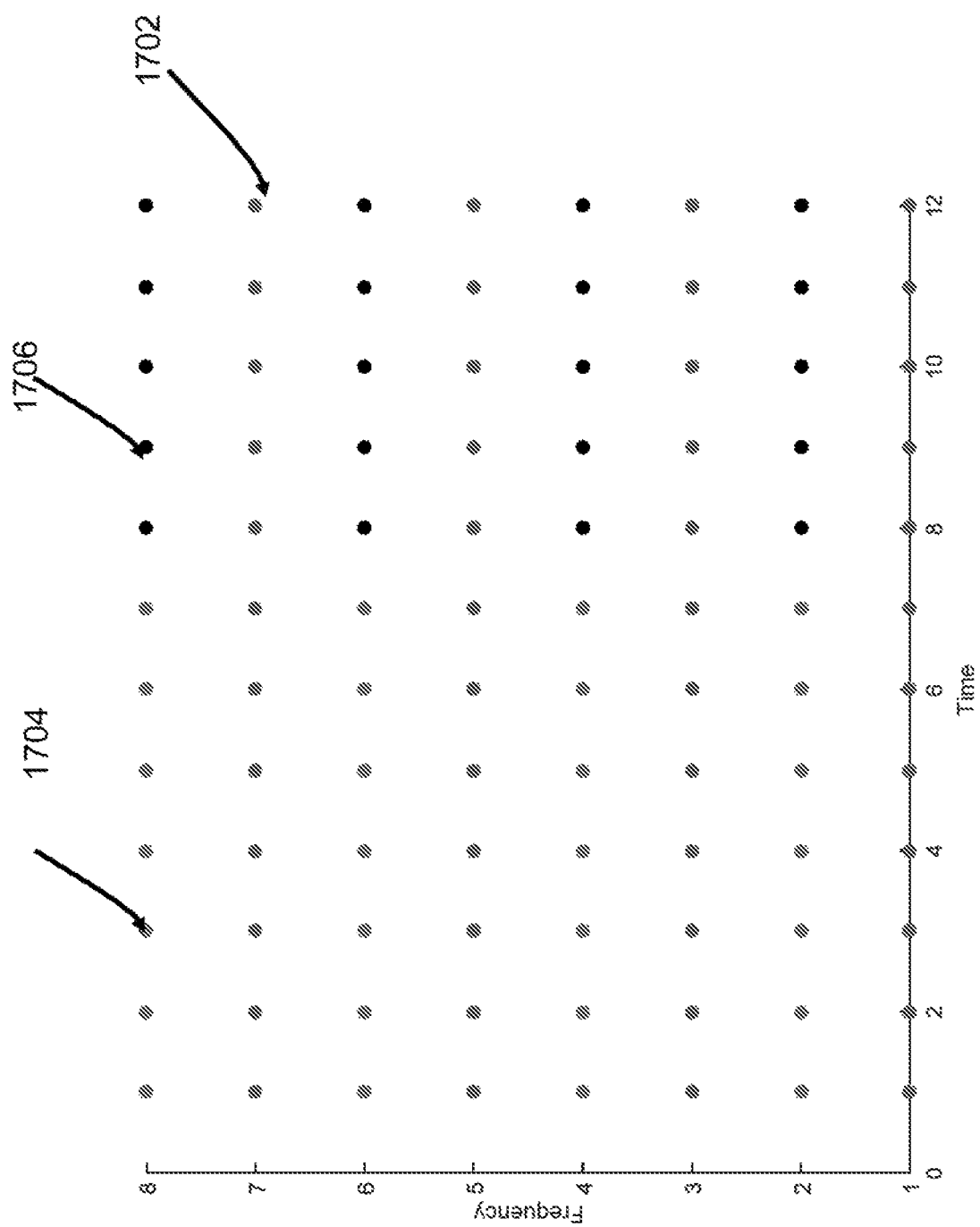
FIG. 17 shows an example embodiment of Multiplexing three users in the Time-Frequency Domain with Interleaving.

If we wish to extract the maximum diversity of the channel and allocate users across the whole time-frequency frame, we can multiplex users via interleaving. In this case, one user occupies a subsampled grid of the time-frequency frame, while another user occupies another subsampled grid adjacent to it. FIG. 17 shows the same three users as before but interleaved on the subcarrier dimension. Of course, interleaving is possible in the time dimension as well, and/or in both dimensions. The degree of interleaving, or subsampling the grip per user is only limited by the spread of the channel that we need to handle.

Multiplexing in the Time-Frequency Spreading Code Domain: Let us assume that we wish to design a random access PHY and MAC layer where users can access the network without having to undergo elaborate RACH and other synchronization procedures. There have been several discussions on the need for such a system to support Internet of Things (IoT) deployments. OTFS can support such a system by employing a spread-spectrum approach. Each user is assigned a different two-dimensional window function that is designed as a randomizer. The windows of different users are designed to be nearly orthogonal to each other and nearly orthogonal to time and frequency shifts. Each user then only transmits on one or a few basis functions and uses the window as a means to randomize interference and provide processing gain. This can result in a much simplified system that may be attractive for low cost, short burst type of IoT applications.

Multiplexing in the Spatial Domain: Finally, like other OFDM multicarrier systems, a multi-antenna OTFS system can support multiple users transmitting on the same basis functions across the whole time-frequency frame. The users are separated by appropriate transmitter and receiver beam-forming operations. A detailed treatment of MIMO-OTFS architectures however is outside the scope of this paper.

7. Implementation Issues

OTFS is a novel modulation technique with numerous benefits and a strong mathematical foundation. From an implementation standpoint, its added benefit is the compatibility with OFDM and the need for only incremental change in the transmitter and receiver architecture.

Recall that OTFS consists of two steps. The Heisenberg transform (which takes the time-frequency domain to the waveform domain) is already implemented in today's systems in the form of OFDM/OFDMA. In the formulation of this paper, this corresponds to a prototype filter g(t) which is a square pulse. Other filtered OFDM and filter bank variations have been proposed for 5G, which can also be accommodated in this general framework with different choices of g(t).

Figure 18:
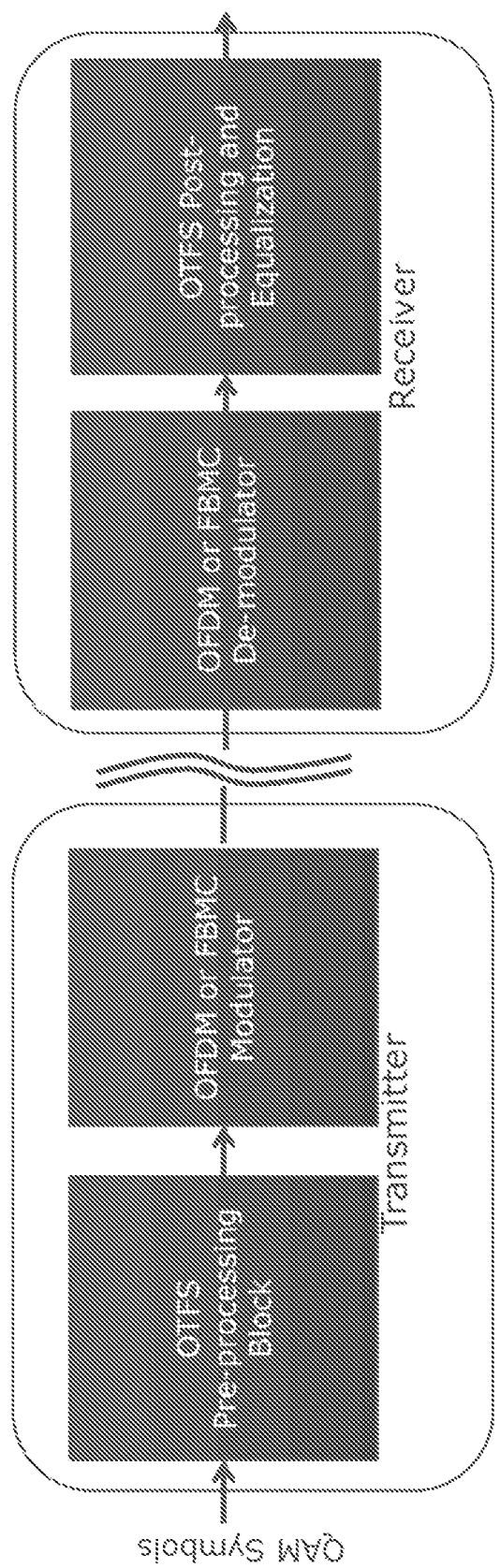
FIG. 18 shows an example of an OTFS architecture block diagram.

The second step of OTFS is the two dimensional Fourier transform (SFFT). This can be thought of as a pre- and post-processing step at the transmitter and receiver respectively as illustrated in FIG. 18. In that sense it is similar, from an implementation standpoint, to the SC-FDMA pre-processing step.

From a complexity comparison standpoint, we can calculate that for a frame of N OFDM symbols of M subcarriers, SC-FDMA adds N DFTs of M point each (assuming worse case M subcarriers given to a single user). The additional complexity of SC-FDMA is then NM $\log_2(M)$ over the baseline OFDM architecture. For OTFS, the 2D SFFT has complexity NM $\log_2(NM)$=NM $\log_2(M)$+NM $\log_2(N)$, so the term NM $\log_2(N)$ is the OTFS additional complexity compared to SC-FDMA. For an LTE subframe with M=1200 subcarriers and N=14 symbols, the additional complexity is 37% more compared to the additional complexity of SC-FDMA Notice also that from an architectural and implementation standpoint, OTFS augments the PHY capabilities of an existing LTE modem architecture and does not introduce co-existence and compatibility issues.

8. Example Benefits of OTFS Modulation

The OTFS modulation has numerous benefits that tie into the challenges that 5G systems are trying to overcome. Arguably, the biggest benefit and the main reason to study this modulation is its ability to communicate over a channel that randomly fades within the time-frequency frame and still provide a stationary, deterministic and non-fading channel interaction between the transmitter and the receiver. In the OTFS domain all information symbols experience the same channel and same SNR.

Further, OTFS best utilizes the fades and power fluctuations in the received signal to maximize capacity. To illustrate this point assume that the channel consists of two reflectors which introduce peaks and valleys in the channel response either across time or across frequency or both. An OFDM system can theoretically address this problem by allocating power resources according to the waterfilling principle. However, due to practical difficulties such approaches are not pursued in wireless OFDM systems, leading to wasteful parts of the time-frequency frame having excess received energy, followed by other parts with too low received energy. An OTFS system would resolve the two reflectors and the receiver equalizer would employ coherent combining of the energy of the two reflectors, providing a non-fading channel with the same SNR for each symbol. It therefore provides a channel interaction that is designed to maximize capacity under the transmit assumption of equal power allocation across symbols (which is common in existing wireless systems), using only standard AWGN codes.

In addition, OTFS provides a domain in which the channel can be characterized in a very compact form. This has significant implications for addressing the channel estimation bottlenecks that plague current multi-antenna systems and can be a key enabling technology for addressing similar problems in future massive MIMO systems.

One benefit of OTFS is its ability to easily handle extreme Doppler channels. We have verified in the field 2×2 and 4×4, two and four stream MIMO transmission respectively in 90 Km/h moving vehicle setups. This is not only useful in vehicle-to-vehicle, high speed train and other 5G applications that are Doppler intensive, but can also be an enabling technology for mm wave systems where Doppler effects will be significantly amplified.

Further, OTFS provides a natural way to apply spreading codes and deliver processing gain, and spread-spectrum based CDMA random access to multicarrier systems. It eliminates the time and frequency fades common to multicarrier systems and simplifies the receiver maximal ratio combining subsystem. The processing gain can address the challenge of deep building penetration needed for IoT and PSTN replacement applications, while the CDMA multiple access scheme can address the battery life challenges and short burst efficiency needed for IOT deployments.

Last but not least, the compact channel estimation process that OTFS provides can be essential to the successful deployment of advanced technologies like Cooperative Multipoint (Co-MP) and distributed interference mitigation or network MIMO.

Appendix 0

Proof of Proposition 1: Let $$g_1(t)=\iint h_1(\tau,v)e^{j2\pi v(t-\tau)}g(t-\tau)dvd\tau \quad (57)$$

$$g_2(t)=\iint h_2(\tau,v)e^{j2\pi v(t-\tau)}g_1(t-\tau)dvd\tau \quad (58)$$

Substituting (58) into (57) we obtain after some manipulation $$g_2(t)=\iiint f(\tau,v)e^{j2\pi v(t-\tau)}g(t-\tau)dvd\tau \quad (59)$$

with $f(\tau,v)$ given by (16).

Proof of Theorem 1: The theorem can be proven by straightforward but tedious substitution of the left hand side of (23); by definition $$A_{g_r, \Pi_f(g_{tr})}(\tau, v) = g_r(t-\tau)e^{j2\pi v t}, \Pi_f(g_{tr}) > \qquad (60)$$

$$= \int g_r^*(t-\tau)e^{-j2\pi v t} \Pi_f(g_{tr}(t))dt$$

$$= \int g_r^*(t-\tau)e^{-j2\pi v t} \int\int f(\tau', v')e^{j2\pi v'(t-\tau')}g_{tr}$$

$$(t-\tau')dv'd\tau'dt$$

By changing the order of integration and the variable of integration (t−τ')→t we obtain $$A_{g_r, \Pi_f(g_{tr})}(\tau, v) = \int\int f(\tau', v')e^{j2\pi v'(t-\tau')} \int g_r^*(t-\tau)g_{tr} \qquad (61)$$

$$(t-\tau')e^{-j2\pi v t}dt\,dv'd\tau'$$

$$= \int\int f(\tau', v')e^{j2\pi v'(t-\tau')} A_{g_r, g_{tr}}(\tau-\tau', v-v')$$

$$e^{-j2\pi v'(\tau-\tau')}dv'd\tau'$$

where $$A_{g_r,g_{tr}}(\tau-\tau', v-v') = \int g_r^*(t-(\tau-\tau'))g_{tr}(t)e^{-j2\pi(v-v')t-(\tau-\tau')}dt \qquad (62)$$

Notice that the right second line of (61) is exactly the right hand side of (23), which is what we wanted to prove.

Proof of Theorem 2: Substituting into (23) and evaluating on the lattice Λ we obtain:

$$\hat{X}[m,n] = \qquad (63)$$

$$\sum_{m'=-\frac{M}{2}}^{\frac{M}{2}-1} \sum_{n'=0}^{N-1} X[m', n'] \times \int\int h(\tau-nT, v-m\Delta f) A_{g_r,g_{tr}}(nT-\tau,$$

$$m\Delta f - v)e^{j2\pi v(nT-\tau)t} + V[m,n]$$

Using the bi-orthogonality condition in (63) only one term survives in the right hand side and we obtain the desired result of (29).

Proof of Proposition 2: Based on the definition of SFFT, it is not hard to verify that a delay translates into a linear phase $$SFFT(X_2[n-k, m-l]) = SFFT(X_2[n,m])e^{-j2\pi\left(\frac{nk}{N} - \frac{ml}{M}\right)} \qquad (64)$$

Based on this result we can evaluate the SFFT of a circular convolution $$SFFT\left(\sum_{k=0}^{N-1}\sum_{l=-\frac{M}{2}}^{\frac{M}{2}-1} X_1[k,l]X_2[(n-k)\bmod N, (-l)\bmod M]\right) = \qquad (65)$$

$$\sum_{k=0}^{N-1}\sum_{l=-\frac{M}{2}}^{\frac{M}{2}-1} X_1[k,l]SFFT(X_2[n,m])e^{-j2\pi\left(\frac{nk}{N} - \frac{ml}{M}\right)} =$$

$$SFFT(X_1[n,m])SFFT(X_2[n,m])$$

yielding the desired result.

Proof of Proposition 3: We have already proven that on the time-frequency domain we have a multiplicative frequency selective channel given by (29). This result, combined with the interchange of convolution and multiplication property of the symplectic Fourier transform [c.f. Proposition 1 and Eq. (42)] leads to the desired result.

In particular, if we substitute Y(n,m) in the demodulation equation (48) from the time-frequency channel equation (29) and X[n,m] in (29) from the modulation equation (43) we get a (complicated) end-to-end expression $$\hat{x}[k,l] = \frac{1}{MN}\sum_{k'=0}^{N-1}\sum_{l'=0}^{M-1} x[k',l'] \int\int h(\tau,v)e^{-j2\pi v\tau} \times \times \left[\sum_{m=0}^{L-1}\sum_{n=0}^{K-1} W(n,m)e^{-j2\pi nT\left(\frac{k-k'}{NT}-v\right)}e^{j2\pi m\Delta f\left(\frac{l-l'}{M\Delta f}-\tau\right)}\right]dvd\tau \qquad (66)$$

Recognizing the factor in brackets as the discrete symplectic Fourier transform of W(n,m) we have $$\hat{x}[k,l] = \frac{1}{MN} \qquad (67)$$

$$\sum_{k'=0}^{N-1}\sum_{l'=0}^{M-1} x[k',l'] \int\int h(\tau,v)e^{-j2\pi v\tau} w\left(\frac{l-l'}{M\Delta f}-\tau, \frac{k-k'}{NT}-v\right)dvd\tau$$

Further recognizing the double integral as a convolution of the channel impulse response (multiplied by an exponential) with the transformed window we obtain $$\hat{x}[k,l] = \frac{1}{MN}\sum_{k'=0}^{N-1}\sum_{l'=0}^{M-1} x[k',l']h_w\left(\frac{l-l'}{M\Delta f}-\tau, \frac{k-k'}{NT}-v\right) \qquad (68)$$

which is the desired result.

9. Reference Signals

Unless otherwise specifically mentioned, the terms reference signals and pilot signals are used interchangeably in the present document.

9.1 The OTFS-Based Reference Signals

Assume the time-frequency (t-f) lattice defined by the following discrete points:

$$\Lambda_{t,f}{}^D = \mathbb{Z}dt \oplus \mathbb{Z}df = \{(Kdt, Ldf): K, L \in \mathbb{Z}\} \qquad (69)$$

Where dt (in sec) and df (in Hz) are the physical distances between the lattice points in the time and frequency dimensions respectfully, and K and L are integers[6]. We will call this lattice the data lattice as most of the points on this lattice will be occupied by data samples. The reference signals (pilots) will occupy a subset of the data lattice. When the pilot samples occupy a regular subset of the data lattice they form a regular (coarser) pilot lattice defined by:

$$\Lambda_{t,f}{}^P = \mathbb{Z}Ndt \oplus \mathbb{Z}Mdf\, N, M \in \mathbb{Z}_{\geq 1} \qquad (70)$$

[6]In OFDM terminology, df may be the subcarrier spacing and dt may be the OFDM symbol time.

As an example, for N=14, M=2, the t-f plane will look as shown in FIG. 19.

As shown in this document, the data lattice (69) is associated, through the symplectic Fourier transform, with a Delay-Doppler (τ,v) torus which has the following delay and Doppler circumferences respectively:

$$C_\tau^D = 1/df, \quad C_v^D = 1/dt$$

The Delay-Doppler torus associated with the (coarser) pilot lattice (70) is a torus with the following smaller circumferences $$C_\tau^P = 1/(Mdf), C_v^P = 1/(Ndt)$$

It can be shown that a 2-D function x(τ,v) on the continuous Delay-Doppler torus associated with the t-f lattice defined in (69) can be transformed to a 2-D discrete function X[i,j] on the t-f lattice using an inverse symplectic discrete Fourier transform defined as $$X[i,j] = SDFT^{-1}(x(\tau,v)) \triangleq \frac{1}{dtdf} \int_0^{\frac{1}{df}} \int_0^{\frac{1}{dt}} x(\tau,v) e^{j2\pi(vidt - \tau jdf)} dv\, d\tau \quad (71)$$

If the $p^{th}$ pilot $x_p(\tau,v)$ is chosen as the delta function $\delta(\tau_p, v_p)$ on the Delay-Doppler torus, then the representation of this pilot on the time-frequency lattice defined in (69) will be $$X_p[i,j] = \frac{1}{dtdf} e^{j2\pi(v_p idt - \tau_p jdf)} i,j \in \mathbb{Z} \quad (72)$$

Figure 20:
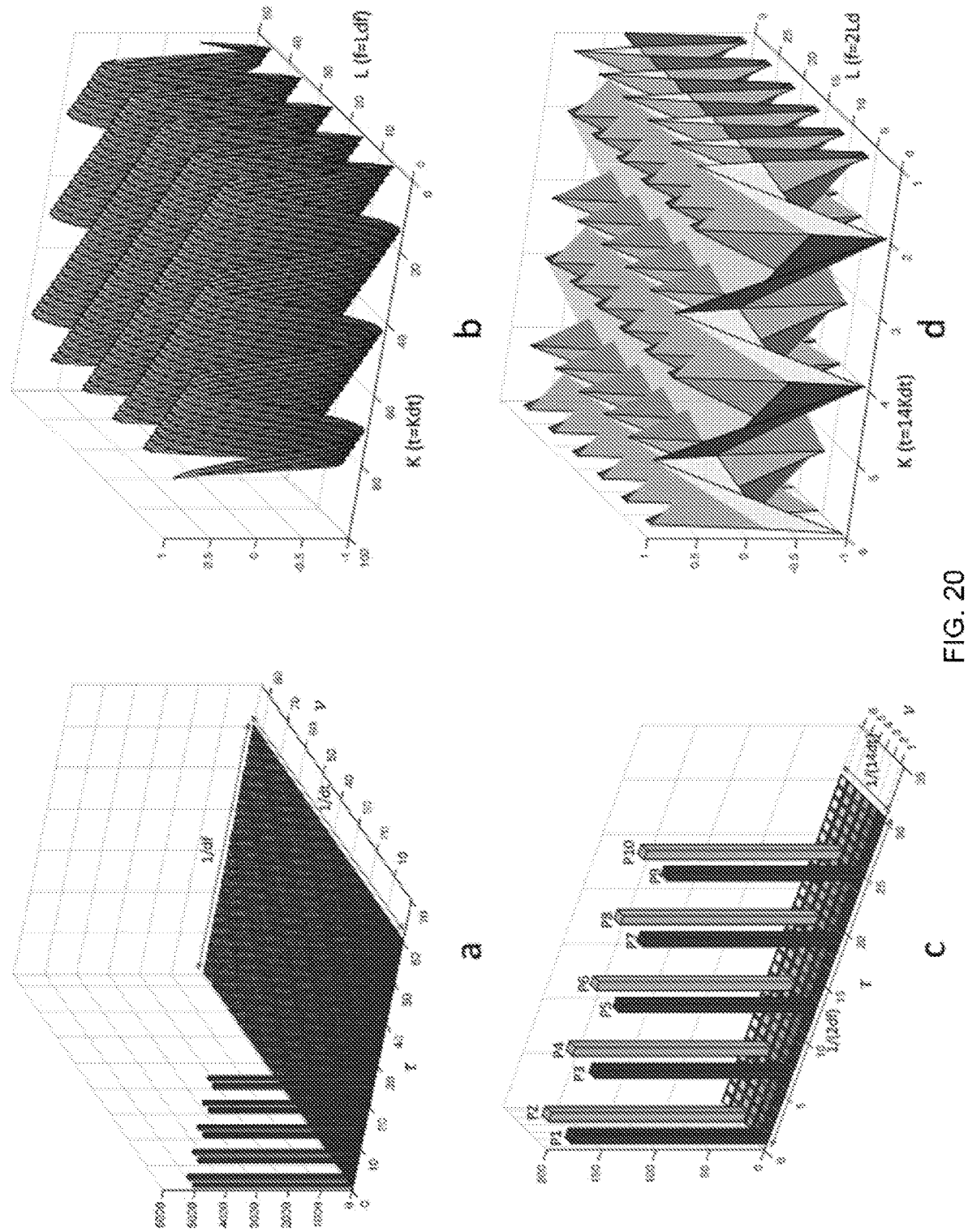
FIG. 20 shows examples of OTFS based pilots. [a] shows 10 pilots on the Delay-Doppler plane associated with the data plane, [b] shows the samples of the real portion of $$P3 = \delta\left(\frac{0.1}{df}, \frac{0.0357}{dt}\right)$$

FIG. 20 shows an example of positioning 10 OTFS-based pilots on the Delay-Doppler plane and how one of the pilots look after it goes through the inverse symplectic discrete Fourier transform (71).

Each OTFS-based reference signal is a delta function placed on the Delay-Doppler torus at a different point $(\tau_p, v_p)$. The sum of these delta functions is then transformed to the t-f plane using the inverse symplectic discrete Fourier transform, and a subset of the samples in the t-f plane are selected to be transmitted. Stated differently, an OTFS-based reference signal is a symplectic exponential which is restricted to a subset of points on the data lattice.

If P pilots are sent using a subset of the data lattice which forms a regular lattice as represented in (70), the t-f samples of the n pilots will be:

$$X[i,j] = \frac{1}{dtdf} \sum_{p=1}^{P} e^{j2\pi(v_p idt - \tau_p jdf)} i = kN, j = lM; k, l \in \mathbb{Z} \quad (73)$$

Where N and M are fixed positive integers representing the size of the coarser pilot lattice.

When the pilot samples in the t-f plane form a regular lattice, the number of pilots that can be packed in that lattice can be calculated from the circumferences of the torus associated with the pilot lattice and the maximum delay and Doppler spreads of the channels that each of the pilots is expected to experience. To avoid leakage between the pilots, the maximum number of pilots that can be packed in each dimension is the circumference of the torus divided by the maximum spread. Noting the delay and Doppler spreads as $\Delta_\tau$ and $\Delta_v$ respectively, the maximum number of pilots that can be packed in each of the dimensions is:

$$N_{max\_\tau}^P = \lfloor C_\tau^P/\Delta_\tau \rfloor$$

$$N_{max\_v}^P = \lfloor C_v^P/\Delta_v \rfloor \quad (74)$$

As an example, for channels with average maximum delay spread of 5 μs and a maximum Doppler frequency of 50 Hz (maximum Doppler spread of 100 Hz), a torus with a delay circumference of $C_\tau^P = 67$ μs and Doppler circumference of $C_v^P = 200$ Hz can support up to 13 pilots in the delay dimension and 2 pilots in the Doppler dimension, for a total of 26 pilots. How close a system can get to the maximum achievable pilot packing will depend on the pilot observation window. A finite observation window of the pilots translates to convolving the pilots in the Delay-Doppler plane with the symplectic Fourier transform of the window (which, in the case of a rectangular window, is a two-dimensional sinc function). Hence, a larger observation window will result in lower leakage between the received pilots, which will enable:

improved accuracy of the channel estimation and

Tighter packing of pilots, up to the maximum number stated in (74) for infinitely large window.

Note that staggering the pilots (e.g., not placing them on a rectangular grid in the Delay-Doppler plane) may improve the separation between the pilots and hence could provide better, or denser, packing. FIG. 21 shows an example of staggered pilots. As can be seen from the figure, all the even pilots are staggered. An example of how staggering the LTE UL DM reference signals can improve the channel estimation is shown in the present document.

9.2 Reference Signal Packing

Packing orthogonal OTFS-based pilots can be done using one of the following schemes:

Delay-Doppler Pilot Packing (DDPP): Arranging the pilots in the Delay-Doppler plane keeping the distances large enough to minimize the leakage of the received pilots onto each other after going through the worst case delay and Doppler shifts of the channels each of the pilots may experience, and taking into consideration the impact of the (sub) sampling of the pilots in the t-f domain, and the pilot observation window.

Time-Frequency Pilot Packing (TFPP): Assigning for each pilot (with no overlap) a coarse enough lattice that can support the relevant channel (with a regular pilot lattice, the circumferences of the associated torus have to be larger than the largest expected delay and Doppler shifts through the channel).

Mixed Pilot Packing (MPP): A combination of DDPP and TFPP.

OTFS-based pilots can be packed very efficiently, and hence can support the simultaneous transmission of a very large number of orthogonal pilots without using a significant percentage of the channel capacity.

Here are a few pilot packing examples:

Example 1 (DDPP)

Assume the following:
Data lattice parameters (LTE numerology):
dt = 1/14 ms
df = 15 kHz
Channel parameters:
Delay spread: 5 μs (ETU)
Max Doppler frequency: 50 Hz (100 Hz spread)
If we chose a pilot lattice with N=28 (Ndt=2 ms) and M=1, as shown in FIG. 22, the circumferences of the pilot torus will be $$C_\tau^P = 66.67 \text{ us}, \quad C_v^P = 500 \text{ Hz}$$

The maximum number of pilots that can be supported in this configuration is 13×5=65. This is by placing 13 pilots in the delay dimension of the torus (spaced 5.13 µs apart) and 5 replicas of these pilots in the Doppler dimension of the torus (spaced 100 Hz apart). In practice with 10 MHz channel bandwidth and allowing for a reasonable size window in the time dimension this configuration can support at least 40 pilots (10×4).

Example 2 (TFPP)

For the same data lattice as in Example 1 assume the following channel parameters:
Delay spread: 5 µs (ETU)
Max Doppler frequency: 200 Hz (400 Hz spread)
If we split the pilot lattice of Example 1 into 12 different pilot lattices represented by the different color diamonds in FIG. 23, then each of these pilot lattices will have N=28 (Ndt=2 ms) and M=12 (Md$f$=180 KHz). The circumferences of all the tori associated with these lattices will be:

$$C_\tau^P = 5.56 \text{ us}, C_\nu^P = 500 \text{ Hz}$$

As can be seen from the circumferences, each pilot lattice can support only a single pilot, for a total of 12 pilots that can be supported by the 12 pilot lattices of FIG. 23.

Example 3 (MPP)

If we split the lattice of Example 1 into two lattices as shown in FIG. 24, each of the lattices will have Ndt=2 ms and Md$f$=30 kHz. The tori associated with the two lattices will both have the following circumferences:

$$C_\tau^P = 33.33 \text{ µs}, C_\nu^P = 500 \text{ Hz}$$

Assuming the same channel parameters as in Example 1, the maximum number of pilots that can be supported by each of these tori is 6×5=30 for a total of 60 pilots on the two lattices. A practical number with 10 MHz channel bandwidth and a reasonable size window in the time dimension is expected to be 40 (4×5×2) or 50 (5×5×2) pilots.

Another example of MPP is shown later in the document.
The advantage of using DDPP is that it provides:
More flexibility in supporting different channel delay and Doppler spreads. With DDPP the pilots can be placed anywhere on the continuous torus whereas when multiplexing the pilots in the time-frequency plane the options are limited to using discrete lattices.
Lower latency than TFPP when the pilots are used for demodulating data, since in TFPP the lattice used for each pilot is coarser, and hence the average time between the data and the last pilot used for interpolation (the pilot following the data) is larger.

TFPP has an advantage when trying to use a short pilot observation window as an equivalent quality of the channel estimation as is achieved with DDPP can be achieved with TFPP using a shorter observation window.

9.3 Potential Use of OTFS Based Reference Signals in LTE

To support massive MIMO using channel reciprocity, all active UEs need to send pilots on the UL, so that the eNodeB can predict the channel for pre-coding its DL transmissions to these UEs. This requires supporting a large number of pilots.

One way to support a large number of pilots is to send OTFS-based reference signals using the resources allocated to the Sounding Reference Signals (SRSs). The SRSs in the LTE system are transmitted on the last symbol of the UL sub-frame. In TDD mode the SRSs can be scheduled with the shortest configuration period being 5 sub-frames (5 ms).

With this configuration, the SRSs use a pilot lattice with N=70, M=1 (see section 9.1). The torus associated with this lattice has the following delay and Doppler circumferences respectfully:

$$C_\tau^P = 66.67 \text{ µs}, C_\nu^P = 200 \text{ Hz}$$

Assuming, as an example, an ETU channel with maximum Doppler frequency of up to 10 Hz, the maximum number of pilots that can be supported on this lattice is 13×10=130. With a practical finite observation window, the number of pilots that can be supported with good enough channel prediction of 5 ms (the distance between the pilots) into the future will be smaller, but is still expected to be very large.

9.4 Examples of Reference Signals for 5G Communications

The proposed structure of the reference signals supports pre-coding of the downlink (DL) transmissions using channel reciprocity in the presence of time varying channels. We refer to pre-coding as a generalized beamforming scheme for supporting multi-layer transmission in a MIMO system.

For the 5G reference signals it is proposed:
To dedicate a subset of the time-frequency data lattice to reference signals
To use the OTFS-based reference signals described in section 9.1.
To scramble the reference signals by multiplying their time-frequency samples by 2-D chirp sequences (e.g. 2-D Zadoff-Chu), for the purpose of limiting the inter-cell interference between the reference signals. The 2-D sequences will have a much richer selection of sequences with good cross correlation characteristics than single dimension sequences.
To pack all the reference signals (pilots) required for the operation of the system on the lattice dedicated to the reference signals (except maybe for demodulation reference signals, when needed, that could be sent with the data).
To have the eNodeB (base station) transmit the DL reference signals continuously on the dedicated time-frequency DL pilot lattice.
To have each UE (subscriber device) transmit its uplink (UL) reference signals on the dedicated UL pilot lattice before the eNodeB starts to pre-code its transmissions to the UE.

Separating the pilots from the data enables starting the transmission of the pilots before the data transmission starts, which enables the receiver to use a large pilot observation window resulting in higher channel observation resolution. The higher channel observation resolution enables:
A better channel estimation
A better pilot packing (due to reduced leakage between the received pilots)
Improved predictability of the channel, which will improve the precoding in the presence of Doppler spreads,
all without impacting data transmission latency.

To enable using the channel reciprocity for pre-coding, the channel response information has to be current during the DL transmission time. To achieve that, the eNodeB has to receive pilots from all active UEs on a regular basis so that the eNodeB has an up to date channel information whenever it needs to transmit to a UE. It can be shown that using the proposed pilot lattice that meets the conditions in (74) with a long enough observation window, provides good channels prediction that can be used for pre-coding.

The number of pilots that need to be supported in the UL is equal to the number of active UEs in a cell and at the edges of the neighboring cells (to minimize interference between pilots and to allow support of interference cancelation in the DL) times the number of spatially multiplexed layers per UE. For the purpose of pilot transmissions, an active UE will be a UE that started sending or receiving data (alternatively it can be the time it wakes up to start sending or receiving data). At that point the UE will start sending the pilots. Until the eNodeB collects enough pilots from the UE to support pre-coding the eNodeB will send data to that UE without pre-coding. Also, to limit the number of UEs that need to send pilots continuously, the support for pre-coding per UE can be configurable. In that case the UE could send demodulation pilots only with the data.

To support pre-coding on the DL, the proposal is to have the active UEs transmit their pilots on a regular basis. This will allow the eNodeB to collect a history of pilot information from all the active UEs. When a packet needs to be transmitted to a specific UE, the eNodeB can use the pilot history of the specific UE to calculate the pre-coder, and apply it to the transmitted packet. In addition to using the pilots for pre-coding DL transmissions, the eNodeB can use the regularly transmitted UL pilots to estimate the channel for demodulating packets transmitted on the UL. Using pilot history will also help improve the separation of the desired pilot from the other pilots and the quality of the channel estimation for demodulating the received signal. It is assumed that the transmissions on the UL are either not pre-coded or that the eNodeB has knowledge of the pre-coders used.

In the DL, assuming the pre-coding is good enough, the UEs will not need demodulation reference signals (DM RSs) on the pre-coded layers. With that assumption, the eNodeB will only need to send reference signals on the spatial layers that do not use pre-coding. Hence the number of pilots on the DL will be much smaller than on the UL. The proposal is to send all the DL pilots on a regular basis. These pilots will be used by the UE both as DM RSs (for the non pre-coded transmissions) and for measuring the Observed Time Difference Of Arrival (OTDOA). If it is perceived that DM reference signals are still needed after the pre-coding, then the DM reference signals can be sent with the data.

The number of pilots that need to be supported in the DL is equal to the number of non pre-coded layers per cell times the number of neighboring cells. This is to prevent the pilots from interfering with the pilots of the neighboring cells and to support measuring the OTDOA.

9.4.1 Downlink Reference Signals

For the LTE numerology it is proposed to use a pilot lattice with N=28 and M=1. This will support up to 40 pilots for ETU channels with average maximum Doppler frequency of 50 Hz (ETU-50), as shown in Example 1 in section 9.2. If a smaller number of pilots are needed this lattice will support higher Doppler spreads (e.g. with 20 pilots it can support a maximum Doppler frequency of 100 Hz) and vice versa.

If the subcarrier spacing changes to 150 KHz, the data lattice parameters will be:

dt=1/140 ms
df=150 KHz

This numerology also supports 40 pilots for ETU-50 channels using the same pilot lattice (N=28, M=1). In this case all the pilots will be packed in the Doppler dimension.

The DL pilots will be transmitted continuously on the pilot lattice. The UEs should collect a long enough history of the pilots to support good enough channel estimation for the purpose of receiving non pre-coded (data or control) transmissions from the eNodeB, and for improving the measured TOA.

9.4.2 Uplink Reference Signals

For the LTE numerology it is proposed to use one or more adjacent pilot lattices with N=28 and M=1, and/or one or more adjacent pilot lattices with N=14 and M=1. Each of the first lattices will support up to 40 pilots for ETU-50 (as shown in Example 1 in section 9.2), and each of the second lattices will support 80 pilots. A good example is using one lattice with N=28, M=1 and one lattice with N=14,M=1, in combination with a DL pilot lattice of N=28, M=1. This example, demonstrated in FIG. 25, supports 120 UL pilots and 40 DL pilots for ETU channels with an average Doppler frequency of 50 Hz. FIG. 26 shows the representation of 40 equally spaced pilots on the Delay-Doppler plane that is associated with the pilot lattice of N=28, M=1.

The pilot structure of FIG. 25 supports both symmetric and asymmetric DL/UL transmissions. Note that with this pilot structure a switching guard period (GP) is required after every DL sub-frame. Hence, the more asymmetric the transmissions are the more switching guard periods (GPs) will be required. If the downlink-to-uplink switch-point periodicity is N sub-frames, then (N−1) GPs will be required per N sub-frames.

The pilot structure of FIG. 25 adds overhead of 14.3% (2/14) for supporting 160 pilots. This is an overhead of 0.09% per pilot. Note that this overhead per pilot depends on the delay and Doppler spreads of the channels. The number of supported pilots in this pilot configuration will be doubled and the overhead per pilot will be cut by half for a maximum Doppler frequency of 25 Hz (instead of 50 Hz).

9.5 Comparison with LTE Pilot Packing

As shown in section 9.4.2, the reference signal structure proposed in section 9.3 can accommodate 40 pilots on the DL and 120 pilots on the UL, all supporting an ETU-50 channel. The DL pilots use 3.6% of the total PHY resources (data lattice), and the UL pilots occupy 10.7% of the total PHY resources.

In LTE, the cell specific reference signals occupy 14.3% of the DL PHY resources. With these reference signals LTE supports up to 4 non pre-coded DL spatial layers. On the UL, to support 8 spatial layers, the UEs can be configured (in TDD mode) to send SRSs with a configuration period of 5 ms. In this mode, to support ETU channels, a total of 8 SRSs can be supported. These SRSs occupy 1.43% of the UL PHY resources. These reference signals can't support any significant Doppler spread in ETU channels.

The following Table 1 shows a summary of the comparison between the proposed reference signals and the LTE reference signals. Note that for supporting lower Doppler channels than shown in the table for the OTFS RSS, the number of OTFS RSs could either be increased proportionally to the decrease in the Doppler spread or the overhead could decrease proportionally. As an example, for ETU-5 channels the overhead of the OTFS RSs could decrease 10 times (to around 0.02% per RS) while still supporting 140 pilots on the DL and 20 pilots on the UL.

TABLE 1

| Parameter | LTE RSs | OTFS RSs | Comments |
| --- | --- | --- | --- |
| # of DL non pre-coded RSs | 4 | 40 | |
| # of UL non pre-coded SRSs | 8 | 120 | Assuming SRSs configuration period is 5 ms |

TABLE 1-continued

| Parameter | LTE RSs | OTFS RSs | Comments |
|---|---|---|---|
| Overhead DL RSs (from DL portion) | 14.3% (3.6% per RS) | 7.1% (0.18% per RS) | Assuming symmetric UL/DL |
| Overhead UL SRSs (from UL portion) | 1.43% (0.18% per RS) | 21.4% (0.18% per RS) | Assuming symmetric UL/DL |
| Supported channels | ETU, no Doppler | ETU-50 | |

Appendix A—Mathematical Background

A function g of a discrete variable ndt where n∈ℤ (the set of integer numbers) and dt∈ℝ (the set of real numbers) is a function on the one dimensional lattice $\Lambda_t = \mathbb{Z} dt = \{ndt: n \in \mathbb{Z}, dt \in \mathbb{R}\}$. It is well known that the Fourier transform of the discrete function g(ndt) is a continuous periodic function with period 1/dt. The discrete Fourier transform transforms the function g(ndt) to a continuous function G($f$) that resides on $f=[0,1/dt)$. Since the discrete Fourier transform translates a multiplication of two functions on the lattice $\Lambda_t$ to a circular convolution, it is convenient to refer to G($f$) as residing on a circle with a circumference of 1/dt.

Similar to the one dimensional case, it can be shown that the discrete symplectic Fourier transform (a twisted version of the two dimensional discrete Fourier transform) transforms a function g of two discrete variables to a function of two continuous periodic variables. Assume that the function g resides on the following lattice:

$$\Lambda_{t,f} = \mathbb{Z} dt \oplus \mathbb{Z} df = \{(ndt, mdf): n,m \in \mathbb{Z}, dt, df \in \mathbb{R}\} \quad (75)$$

The discrete symplectic Fourier transform of g(ndt,md$f$) is given by:

$$SF(g)(\tau, v) = G(\tau, v) = dt df \cdot \sum_{n,m} e^{-2\pi j(vndt - \tau mdf)} g(ndt, ndf) \quad (76)$$

The function G(τ,v) resides on a two-dimensional plane τ×v=[0,1/d$f$)×[0,1/dt) or equivalently on a torus with circumferences 1/d$f$ in the x dimension and 1/dt in the v dimension. This torus is referred to as the torus associated with the lattice $\Lambda_{t,f}$. An example is depicted in FIG. 27.

Appendix B—Effect of Staggering the LTE UL DM Reference Signals

The uplink demodulation reference signals in LTE are defined by the time-domain cyclic shift τ(λ) of the base sequence $r_{uv}(k)$ according to $$r_{uv}(mL_{RS}+k,\tau) = w_m(\lambda) e^{j\tau(\lambda)k} r_{uv}(k) | 0 \le k \le L_{RS}-1, m=0,1 \quad (77)$$

Where $L_{RS}$ is the length of the reference signal sequence (in number of subcarriers), λ is the spatial layer index, $[w_0(\lambda) \ w_1(\lambda)] = [\pm 1 \ \pm 1]$ is the Orthogonal Cover Code (OCC), and $r_{uv}(k)$ is the base (Zadoff-Chu) sequence. The term $e^{j\tau(\lambda)k}$ represents the layer dependent cyclic shift which separates the pilots of the different layers. For rank 4 UL transmission the 4 UL reference signals can be represented in the Delay-Doppler plane as shown in FIG. 28. As can be seen from FIG. 28, all 4 reference signals have the same Doppler shift. Staggering the reference signals as shown in FIG. 29 enables better estimation of the channel when using a small number of PRBs (small observation window) as shown in FIG. 30.

Appendix C MPP Examples

Using the same numerology and channel parameters of example 1 in section 9.2, chose the lattice points as shown in FIG. 31. The red columns form the same torus as in example 1 and can support a maximum of 65 pilots. The remaining red points can be viewed as 13 coarse lattices, each with N=28 and M=12. The circumferences of torus associated with this lattice are $$C_\tau^P = 5.56 \text{ us}, \ C_v^P = 500 \text{ Hz}$$

This torus supports 1×5 pilots, so the total number of pilots that can be supported by these 13 coarse lattices is 5×13=65. Hence the total maximum number of pilots that can be supported by the pilots' sample points in FIG. 31 is 130. A more practical number is 40 on the first lattice (same as in Example 1) and 4×13=52 on the coarser lattices, for a total of 92 pilots.

For the same example we can partition the pilots' sample points differently, into 25 lattices with N=28 and M=12. Each such lattice supports a maximum of 1×5 pilots for a total of 5×25=125 pilots and a more practical number of 4×25=100 pilots.

FIG. 32 shows an example communication network in which the disclosed technology can be embodied. The network 3200 may include a base station transmitter that transmits wireless signals s(t) (downlink signals) to one or more receivers r(t) which may be located in a variety of locations, including inside or outside a building and in a moving vehicle. The receivers may transmit uplink transmissions to the base station, typically located near the wireless transmitter.

FIG. 33 shows a flowchart of an example method 3300 of wireless communication. The method 3300 includes the following operations: (3302) determining a maximum delay spread for a transmission channel, (3304) determining a maximum Doppler frequency spread for the transmission channel, (3306) allocating a set of transmission resources in a time-frequency domain to a number of pilot signals based on the maximum delay spread and the maximum Doppler frequency spread, and (3308) transmitting the pilot signals over a wireless communication channel using transmission resources. Various examples and options are disclosed in the present document, in particular, in Section 9.

In some embodiments, each pilot signal may correspond to a delta function in the delay-Doppler domain.

In some embodiments, the allocating operation 3306 may include staggering transmission resources for the number of pilots with respect to each other such that at least some pilots occupy transmission resources that do not occur on a rectangular grid in the delay-Doppler domain. In some embodiments, every other pilot signal position may be staggered from n original position on the rectangular grid. For example, in various embodiments, all even-numbered (or odd-numbered) pilot signals may be staggered.

In some embodiments, the set of transmission resources in the time-frequency domain occupied by any given pilot signal corresponds to a lattice comprising time instances uniformly distributed along a time axis and having a first step size and frequencies uniformly distributed along a frequency axis and having a second step size. It will be understood that the step sizes in the time-frequency domain are different from frequency domain spacing of pilot signals.

In some embodiments, the set of transmission resources in the time-frequency domain occupied by the pilot signal correspond to a lattice comprising time instances non-uniformly distributed along a time axis.

In some embodiments, the set of transmission resources in the time-frequency domain occupied by at least one pilot signal correspond to a lattice comprising frequencies that are non-uniformly distributed along a frequency axis.

In some embodiments, the set of transmission resources in the time-frequency domain occupied by at least one pilot signal are non-overlapping with another set of resources in the time-frequency domain over which user data is transmitted by the wireless communication device.

In some embodiments, the operation 3308 of transmitting includes transmitting the pilot signal to a given user equipment prior to transmitting data to the user equipment.

In some embodiments, the pilot signals may be generated by scrambling a basis signal using a two-dimensional (2-D) chirp sequence. In some embodiments, the pilot signals may be generated by cyclically shifting by a different amount a root 2-D Zadoff-Chu sequence. The shift may be performed in the time domain and/or in the frequency domain.

In some embodiments, the transmission 3308 may be performed on a continuous basis from the transmitter to a user equipment, regardless of there is data transmission going on from the transmitter to the UE. In some embodiments, data may be pre-coded prior to the transmission.

In some embodiments, each pilot signal generated by the wireless device using the method 3300 may occupy non-overlapping and distinct transmission resources.

In some embodiments, the wireless communication device includes a base station, the method 3300 further including generating at least two pilot signals occupying two sets of transmission resources are non-overlapping in the delay-Doppler domain. In some embodiments, the at least two pilot signals use non-overlapping delay domain resources. In some embodiments, the at least two pilot signals use non-overlapping Doppler-domain resources.

In some embodiments, the wireless communication device includes a user equipment, and wherein the set of transmission resources are specified to the wireless communication device in a upper layer message.

FIG. 34 is a block diagram of an example of a wireless communication apparatus 3400 that includes a memory 3402 for storing instructions, a processor 3404 and a transmitter 3406. The transmitter 3406 is communicatively coupled with the processor 3404 and the memory 3402. The memory 3402 stores instructions for the processor 3404 to generate a pilot signal according to the methods described here (e.g., method 3300 and method 3500). The transmitter 3404 transmits the pilot signal over a wireless communication channel using transmission resources that are designated for pilot signal transmission.

FIG. 35 shows a flowchart of an example method 3500 of wireless communication. The method 3500 includes the following operations: determining (3502) a maximum delay spread for a transmission channel, determining (3504) a maximum Doppler frequency spread for the transmission channel, determining (3506) a number of pilot signals that can be transmitted using a set of two-dimensional transmission resources at least based on the maximum delay spread and the maximum Doppler frequency spread, allocating (3508) the set of transmission resources from a two-dimensional set of resources to the number of pilot, and transmitting (3510) the pilot signals over a wireless communication channel using transmission resources. Various examples and options are disclosed in the present document, in particular, in Section 9.

In some embodiments, the operation 3506 may include determining the number of pilot signals based on one or more of a number of receivers to send the pilot signals to, a number of transmission layers used for transmissions to the receivers, a number of receivers that are also transmitting pilot signals, and possible interference from another cell's pilot signals. As previously described, a target observation window may be determined in the time-frequency domain based on the desired resolution and observation time.

In some embodiments, pilot signals may be staggered. Some examples are shown and described with respect to FIG. 29 and FIG. 30. The staggering may be achieve by re-locating pilots from a position on a grid to a position along one of the dimensions (time or frequency) to maximize the separation from the non-staggered pilots.

FIG. 36 is a block diagram of an example of a wireless communication apparatus that can be used for embodying some techniques disclosed in this patent document. The apparatus 3600 may be used to implement method 3300 or 3500. The apparatus 3600 includes a processor 3602, a memory 3604 that stores processor-executable instructions and data during computations performed by the processor. The apparatus 3600 includes reception and/or transmission circuitry 3606, e.g., including radio frequency operations for receiving or transmitting signals.

It will be appreciated that various techniques are disclosed for pilot packing in an OTFS-based communication network.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A wireless communication method, implemented by a wireless communication device, comprising:
   determining a maximum delay spread for a transmission channel;
   determining a maximum Doppler frequency spread for the transmission channel;
   allocating, based on the maximum delay spread and the maximum Doppler frequency spread, a set of transmission resources in a time-frequency domain to a number of pilot signals in the time-frequency domain; and
   transmitting the pilot signals over a wireless communication channel using transmission resources, wherein each of the pilot signals corresponds to a delta function in a delay-Doppler domain based on applying a symplectic transform to the pilot signals.

2. The method of claim 1, wherein the allocating the set of transmission resources includes:
   staggering transmission resources for the number of pilot signals with respect to each other such that at least some of the pilot signals occupy transmission resources that do not occur on a rectangular grid in the delay-Doppler domain.

3. The method of claim 2, wherein the staggering includes staggering every other pilot signal.

4. The method of claim 1, wherein the set of transmission resources in the time-frequency domain occupied by any given pilot signal corresponds to a lattice comprising time instances uniformly distributed along a time axis and having a first step size and frequencies uniformly distributed along a frequency axis and having a second step size.

5. The method of claim 1, wherein the set of transmission resources in the time-frequency domain occupied by the pilot signal correspond to a lattice comprising time instances non-uniformly distributed along a time axis.

6. The method of claim 1, wherein the set of transmission resources in the time-frequency domain occupied by at least one pilot signal correspond to a lattice comprising frequencies that are non-uniformly distributed along a frequency axis.

7. The method of claim 1, wherein the set of transmission resources in the time-frequency domain occupied by at least one pilot signal is non-overlapping with another set of resources in the time-frequency domain over which user data is transmitted by the wireless communication device.

8. The method of claim 1, wherein the transmitting the pilot signal includes transmitting the pilot signal to a given user equipment prior to transmitting data to the user equipment.

9. The method of claim 1, wherein the generating the pilot signal includes:
   scrambling a basis signal using a two-dimensional (2-D) chirp sequence.

10. The method of claim 1, wherein each pilot signal corresponds to a different cyclic shift in a time domain and/or a frequency domain of a root 2-D Zadoff-Chu sequence.

11. The method of claim 1, wherein the transmitting the pilot signal is performed continuously, regardless of data transmissions.

12. The method of claim 1, wherein the wireless communication device includes a base station, the method further including pre-coding data prior to data transmissions, and generating at least two pilot signals occupying two sets of transmission resources non-overlapping in the time-frequency domain.

13. The method of claim 12, further including:
   individually transmitting the at least two pilot signals to two different user equipment at time instances that are non-overlapping with each other.

14. The method of claim 12, further including:
   individually transmitting the at least two pilot signals from two different user equipment at time instances that are non-overlapping with each other.

15. The method of claim 12, wherein the at least two pilot signals use non-overlapping delay domain resources or non-overlapping Doppler domain resources.

16. The method of claim 1, wherein the wireless communication device includes a user equipment, and wherein the set of transmission resources are specified to the wireless communication device in a upper layer message.

17. A wireless communication method, implemented by a wireless communication device, comprising:
- determining a maximum delay spread for a transmission channel;
- determining a maximum Doppler frequency spread for the transmission channel;
- determining, based on the maximum delay spread and the maximum Doppler frequency spread, a number of pilot signals in a time-frequency domain that can be transmitted using a set of two-dimensional transmission resources;
- allocating the set of two-dimensional transmission resources to the number of pilot signals; and
- allocating the set of two-dimensional transmission resources to the number of pilot signals; and
- transmitting the pilot signals over a wireless communication channel using the set of two-dimensional transmission resources, wherein each of the pilot signals corresponds to a delta function in a delay-Doppler domain based on applying a symplectic transform to the pilot signals.

18. The method of claim 17, wherein the determining the number of pilot signals further includes determining the number of pilot signals based on one or more of a number of receivers to send the pilot signals to, a number of transmission layers used for transmissions to the receivers, a number of receivers that are also transmitting pilot signals, and possible interference from another cell's pilot signals.

19. The method of claim 17, wherein the allocating the set of two-dimensional transmission resources to the number of pilot signals includes determining an observation window in the time-frequency domain for the pilot signals.

20. The method of claim 17, wherein the allocating the set of two-dimensional transmission resources includes:
- staggering transmission resources for the number of pilot signals with respect to each other such that at least some of the pilot signals occupy transmission resources that do not occur on a rectangular grid in the delay-Doppler domain.

21. The method of claim 20, wherein the staggering is performed by shifting locations of staggered pilot signals from non-staggered pilot signals to maximize a distance in a dimension of the shift.

22. A wireless communication apparatus, comprising:
- a memory storing instructions;
- a processor; and
- a transmitter communicatively coupled to the memory and the processor; wherein the memory stores instructions for causing the processor to implement a method, comprising:
  - determining a maximum delay spread for a transmission channel;
  - determining a maximum Doppler frequency spread for the transmission channel;
  - allocating, based on the maximum delay spread and the maximum Doppler frequency spread, a set of transmission resources in a time-frequency domain to a number of pilot signals in the time-frequency domain; and
  - transmitting the pilot signals over a wireless communication channel using the set of transmission resources, wherein each of the pilot signals corresponds to a delta function in a delay-Doppler domain based on applying a symplectic transform to the pilot signals.

23. The apparatus of claim 22, wherein the set of transmission resources in the time-frequency domain occupied by any given pilot signal corresponds to a lattice comprising time instances uniformly distributed along a time axis and having a first step size and frequencies uniformly distributed along a frequency axis and having a second step size.

24. A wireless communication apparatus comprising a processor configured to implement a method comprising:
- determining a maximum delay spread for a transmission channel;
- determining a maximum Doppler frequency spread for the transmission channel;
- determining, based on the maximum delay spread and the maximum Doppler frequency spread, a number of pilot signals in a time-frequency domain that can be transmitted using a set of two-dimensional transmission resources;
- allocating the set of two-dimensional transmission resources to the number of pilot signals; and
- transmitting the pilot signals over a wireless communication channel using the set of two-dimensional transmission resources, wherein each of the pilot signals corresponds to a delta function in a delay-Doppler domain based on applying a symplectic transform to the pilot signals.

* * * * *

UNITED STATES PATENT AND TRADEMARK OFFICE
CERTIFICATE OF CORRECTION

PATENT NO. : 10,666,314 B2
APPLICATION NO. : 16/079509
DATED : May 26, 2020
INVENTOR(S) : Ronny Hadani et al.

It is certified that error appears in the above-identified patent and that said Letters Patent is hereby corrected as shown below:

In the Specification

In Column 6, after Line 60, footnote 1, delete "Error! Reference source not found." and insert -- (2) --, In Column 7, Lines 38-40, Equation (6), delete "$\int\int \phi_{\tau,v}(t\{h(\tau,v)*x(\tau,v)\}d\tau dv$" and insert -- $\iint \phi_{\tau,v}(t)\{h(\tau,v)*x(\tau,v)\}d\tau dv$ --, In Column 7, Lines 61-63, Equation (7), delete "$r = \prod_h(s): s(t) \in \mathcal{H} \xrightarrow{\Pi_h(\cdot)} r(t) \in \mathcal{H}$" and insert -- $r = \Pi_h(s): s(t) \in \mathcal{H} \xrightarrow{\Pi_h(\cdot)} r(t) \in \mathcal{H}$ --, In Column 9, Lines 17-18, Equation (8), delete "$\Lambda=\{(nT,m\Delta f),n,m\in\mathbb{Z}\}$" and insert -- $\Lambda = \{(nT, m\Delta f), n, m \in \mathbb{Z}\}$ --, In Column 18, Line 27, delete "widowing" and insert -- windowing --, In Column 19, Line 45, delete "continouse" and insert -- continuous --, In Column 22, Line 4, delete "easier" and insert -- easily --, In Column 22, Line 29, delete "the the" and insert -- the --, Signed and Sealed this
Ninth Day of February, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,666,314 B2

In Column 23, Line 21, delete "soudning" and insert -- soundning --,

In Column 25, Line 39, delete "can can" and insert -- can --,

In Column 27, Line 5, Equation (60), delete

"$A_{g_r, \Pi_f(g_{tr})}(\tau, v) = g_r(t - \tau)e^{j2\pi vt}, \Pi_f(g_{tr}) >$" and insert -- $A_{g_r, \Pi_f(g_{tr})}(\tau, v) = < g_r(t - \tau)e^{j2\pi vt}, \Pi_f(g_{tr}) >$ --, In Column 27, Line 20, Equation (61), delete "$= \int \int f(\tau', v')e^{j2\pi v'(t-\tau')} A_{g_r, g_{tr}}(\tau - \tau', v - v') \, e^{-j2\pi v'(\tau-\tau')} \, dv' \, d\tau'$" and insert -- $= \iint f(\tau', v')e^{j2\pi v'(\tau-\tau')} A_{g_r, g_{tr}}(\tau - \tau', v - v')e^{j2\pi v'(\tau-\tau')} dv' d\tau'$ --, In Column 28, Line 51, Equation (69), delete "$\Lambda_{t,f}^D = \mathbb{Z} dt \oplus \mathbb{Z} df = \{(Kdt, Ldf) : K, L \in \mathbb{Z}\}$" and insert -- $\Lambda_{t,f}^D = \mathbb{Z}dt \oplus \mathbb{Z}df = \{(Kdt, Ldf): K, L \in \mathbb{Z}\}$ --, In Column 28, Line 61, Equation (70), delete "$\Lambda_{t,f}^P = \mathbb{Z} Ndt \oplus \mathbb{Z} Mdf \, N, M \in \mathbb{Z} \geq 1$" and insert -- $\Lambda_{t,f}^P = \mathbb{Z}Ndt \oplus \mathbb{Z}Mdf \, N, M \in \mathbb{Z} \geq 1$ --, In Column 35, Line 20, delete "$f = [0, 1/dt).$" and insert -- $f = (0, 1/dt).$ --, In Column 35, Line 31, Equation (75), delete "$\Lambda_{t,f} = \mathbb{Z} dt \oplus \mathbb{Z} df = \{(ndt, mdf): n, m \in \mathbb{Z}, dt, df \in \mathbb{R}\}$" and insert -- $\Lambda_{t,f} = \mathbb{Z}dt \oplus \mathbb{Z}df = \{(ndt, mdf): n, m \in \mathbb{Z}, dt, df \in \mathbb{R}\}$ --, In Column 35, Line 41, delete "$\tau \times v = [0, 1/df) \times [0, 1/dt).$" and insert -- $\tau \times v = (0, 1/df) \times (0, 1/dt)$ --, In Column 35, Line 42, delete "x" and insert -- $\tau$ --, In the Claims In Column 40, Line 67, in Claim 16, delete "a upper layer" and insert -- an upper layer --, In Column 41, Lines 12-15, in Claim 17, delete "allocating the set of two-dimensional transmission resources to the number of pilot signals; and allocating the set of two-dimensional transmission resources to the number of pilot signals; and" and insert -- allocating the set of two-dimensional transmission resources to the number of pilot signals; and --.